United States Patent [19]
Bedard et al.

[11] 4,425,628
[45] Jan. 10, 1984

[54] CONTROL MODULE FOR ENGERGY MANAGEMENT SYSTEM

[75] Inventors: James F. Bedard; Scott E. Cutler; Charles W. Eichelberger, all of Schenectady, N.Y.; Edward B. Miller, West Warwick, R.I.; Salvatore F. Nati, Jr., Syracuse, N.Y.

[73] Assignee: General Electric Company, Schenectady, N.Y.

[21] Appl. No.: 267,328

[22] Filed: May 26, 1981

[51] Int. Cl.$^3$ .............................................. G06F 15/20
[52] U.S. Cl. .................................................... 364/900
[58] Field of Search ................ 364/900 MS File, 492, 364/493; 315/291, 294, 312, DIG. 4

[56] References Cited

U.S. PATENT DOCUMENTS

| | | | |
|---|---|---|---|
| 4,213,182 | 7/1980 | Eichelberger et al. | 315/312 X |
| 4,217,646 | 8/1980 | Caltagirone et al. | 364/900 X |
| 4,293,915 | 10/1981 | Carpenter et al. | 364/493 |

*Primary Examiner*—Thomas M. Heckler
*Attorney, Agent, or Firm*—Nathan D. Herkamp; Philip L. Schlamp; Fred Jacob

[57] ABSTRACT

A control module for controlling at least one variable-power-consuming load responsive to data input from local and/or remote locations, utilizes a controller microcomputer having an output setting the gain of a variable gain amplifier. The variable gain amplifier operates on a substantially-constant output of an oscillator to provide, on a cycle-by-cycle or long-term basis, a periodic waveform of controlled amplitude to the at least one load. The amplitude of the waveform sets the energy consumption/output of the load. Another data bus facilitates connection of local control means to a control module interface providing local control information to the controller microcomputer, while a third data bus is dedicated to communication with a remote central controller, if used. The control module includes circuitry for allowing a unique local address to be set for a particular control module, to which unique address the control module responds when a plurality of such control modules are connected in parallel to a central controller. A fourth data bus connects local sensors, such a photocells, thermistors and the like, through analog-to-digital conversion circuitry to the controller microcomputer, to facilitate control of the local loads responsive to local ambient conditions. The maximum level of the load(s) connected to a control module may be programmably established such that this maximum level can not be exceeded by local and/or remote commands, until the maximum level is altered.

92 Claims, 45 Drawing Figures

CONTROL MODULE FOR ENGERGY MANAGEMENT SYSTEM

BACKGROUND OF THE INVENTION

The present invention concerns apparatus for controlling energy-consuming loads, and more particularly, a novel control module for controlling at least one load of variable power consumption, responsive to data input from local and/or remote locations.

Conservation of energy is particularly desirable in this day and age. The ability to control the output level of an energy-consuming load, whether from the load location or from a remote location, facilitates many economic advantages. Specifically, the ability to set, from a central facility, the output of each of a plurality of light sources, located in various locations in one or more buildings, is highly desirable. With the advent of variable-output gas-discharge lamps, such mercury-vapor discharge fluorescent lamps and associated electronic ballast, it is desirable to provide a system for controlling, from a local, one or more remote and/or a central location, the output of each individual one of a multiplicity of such energy-conserving lamps.

One method for providing a variable, or "dimmable", output level from a fluorescent lamp is described and claimed in co-pending application Ser. No. 177,835 and one embodiment of an inverter-ballast utilizing the method therein described for control of fluorescent lamp output light level, is described and claimed in co-pending U.S. patent application Ser. No. 177,942 both filed on Aug. 14, 1980 assigned to the assignee of the present invention, and incorporated herein by reference in their entirety. Further, in co-pending U.S. patent application Ser. No. 242,782, filed Mar. 11, 1981, now U.S. Pat. No. 4,345,200 assigned to the assignee of the present invention, and incorporated herein in its entirety by reference, there is described and claimed an input circuit for providing, to the ballast/lamp combination of the aforementioned applications, both an on/off control signal and an output level control signal, responsive to the magnitude of a single D.C. voltage; the D.C. voltage may be provided by conversion, after appropriate electrical isolation, of the amplitude of a periodic A.C. waveform.

Centralized control systems, for remotely controlling each of a multiplicity of loads at various ones of a plurality of locations, are described and claimed in U.S. Pat. No. 4,213,182, issued July 15, 1980; in co-pending U.S. patent applications Ser. No. 323,745, filed Nov. 20, 1981; U.S. patent application Ser. No. 324,372, filed Nov. 23, 1981; U.S. patent application Ser. No. 324,640, filed Nov. 24, 1981; U.S. patent application Ser. No. 326,116, filed Nov. 30, 1981; U.S. patent application Ser. No. 325,031, filed Nov. 25, 1981; U.S. patent application Ser. No. 479,048, filed Mar. 25, 1983; in U.S. patent No. 4,367,414, issued Jan. 4, 1983; and in co-pending U.S. Pat. application Ser. No. 267,328 filed on even date herewith, all assigned to the assignee of the present invention and incorporated herein in their entirety by reference. Further, various cost-effective apparatus for local control of the light output level of such a ballast/lamp combination, requiring manual "dimming" adjustments at the local location and incapable of centralized control, are described and claimed in co-pending U.S. patent applications Ser. Nos. 235,191, filed Feb. 17, 1981, and 242,780, filed Mar. 11, 1981 assigned to the assignee of the present invention and incorporated herein in their entirety by reference.

It is desirable, as previously mentioned, to be able to control each of several energy-consuming loads to a selected one of a plurality of discrete levels either in a centralized control system or in a "stand-alone" system (wherein each lamp is locally controlled either individually or in a small group of simultaneously controlled lamps). A common, low-cost control module receiving the central-controller or local-control-apparatus information and directly controlling the output of the associated load is therefore highly desirable. It is also highly desirable to provide control of a load automatically responsive to local parameters, such as the intensity of ambient lighting (whereby energy consumption may be reduced when ambient light is sufficiently bright for local activity levels) and to set maximum users cannot exceed such load limitations.

BRIEF DESCRIPTION OF THE INVENTION

In accordance with the invention, a control module for a load (e.g. energy) management system includes a controller microcomputer, having a central processing unit (CPU), a read-only memory (ROM) storing a common firmware program, a random-access memory (RAM) and an input-output (I/O) section. Outputs of the controller microcomputer are utilized to set the gain of a variable gain amplifier to provide a periodic waveform of controllable amplitude, set on either a cycle-by-cycle or long-term basis, from an oscillator to a first data bus. The first data bus signal controls the condition (e.g. energy consumption/output) of at least one load associated with a control module. A local control interface circuit is connected to a second data bus for receiving local control information from local control apparatus, such as wall switches and the like, and formats the local control interface information for input to the controller microcomputer. A third data bus allows local analog output sensors, such as photocells, thermistors and the like, to be connected to an analog-to-digital converter. The digital representations of the analog sensor output are provided to the controller microcomputer to facilitate the control of the at least one load in accordance with ambient conditions. An address-designation circuit is connected to the controller microcomputer to establish a unique address for a control module, when a plurality of such control modules are connected to a remote central controller in parallel across a fourth control module data bus, such that only the one properly addressed control module responds to a control controller data transmission.

In one presently preferred embodiment, the fourth data bus to and from the central controller is interfaced to the control module controller microcomputer through a bidirectional interface circuit. A multiplex circuit is utilized to selectively connect a selected one of the address-designation circuit, the analog-to-digital converter output(s) and the local control interface outputs to common data inputs of the controller microcomputer.

Accordingly, it is an object of the present invention to provide a novel control module for a load system capable of controlling the condition (e.g. energy consumption/output) of at least one associated load responsive to at least one of remote and local data inputs.

It is another object of the present invention to provide novel methods of controlling the condition (e.g.

the consumption/output) of at least one load responsive to remote and/or local data inputs.

These and other objects of the present invention will become apparent upon consideration of the following detailed description, when read in conjunction with the drawings.

DETAILED DESCRIPTION OF THE INVENTION

Figure 1:
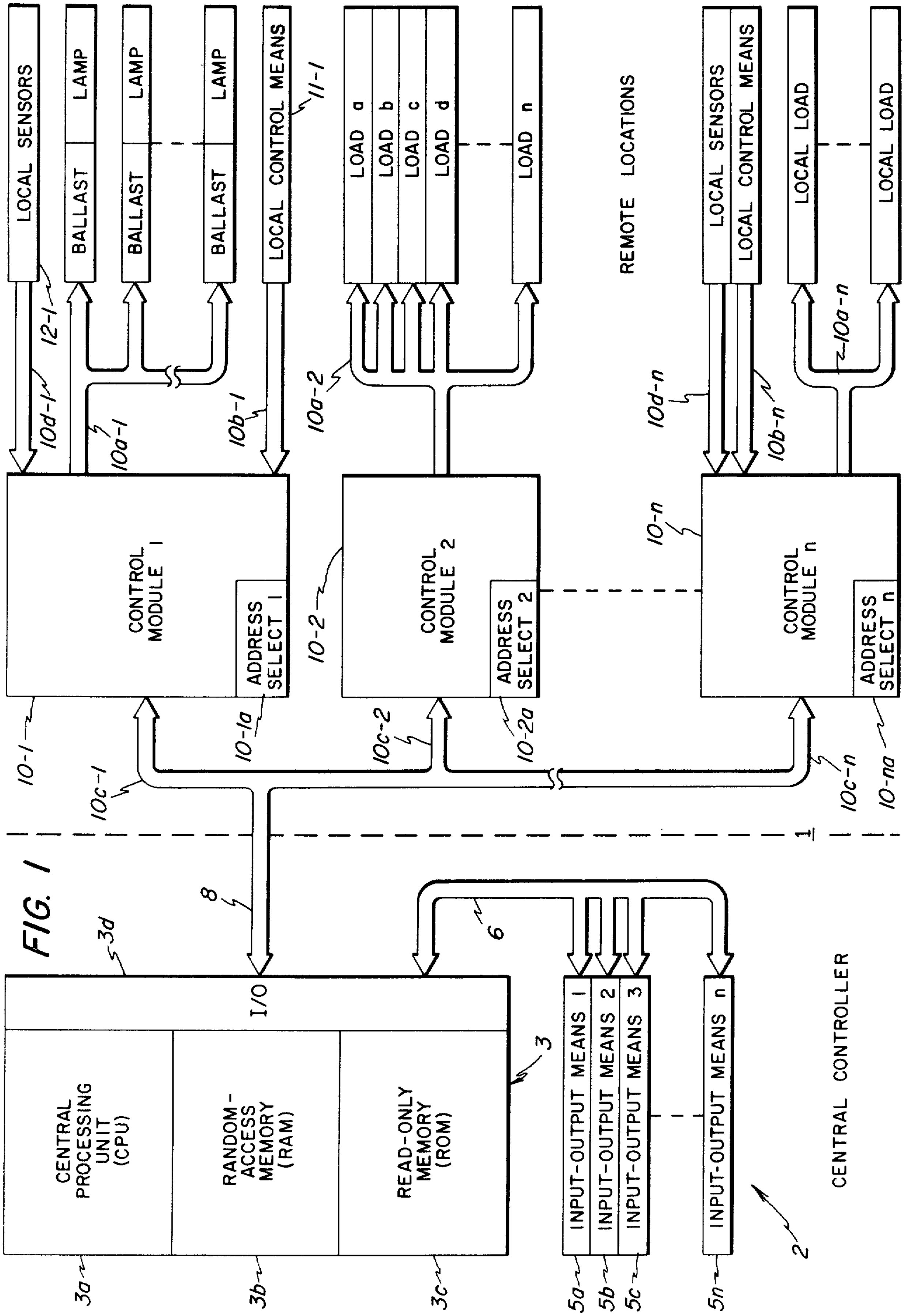
FIG. 1 is a schematic block diagram of an energy management system in which a plurality of loads are individually controlled by each of a plurality of control modules each receiving local and remote-central-location load control information.

Referring initially to FIG. 1, one presently preferred embodiment of an energy management system 1 includes a central controller 2 for controlling a plurality of loads generally at locations remote from the central controller. The central controller itself includes a central computer apparatus 3, which may be a microcomputer, minicomputer, main-frame computer and the like, having a central processing bit (CPU) 3*a*, utilized with both random-access memory (RAM) means 3*b*, read-only memory (ROM) means 3*c* and input-output transmission I/O means 3*d*. As is well-known in the art, one or more-input output means 5, such as printers, graphic display units, and the like, are connected to the central controller computing apparatus via a bus 6. Thus, n input-output means 5*a*–5*n* can be connected to provide data and instructions to, or receive information from, computer 3. Computing apparatus 3 is also connected, at the I/o means 3*d*, via a bidirectional bus 8, to at least one, and generally several, remote locations at which the various loads are located. Bus 8 may be any known bus means, including coaxial cable, twisted wire pair, optical fiber, radio communications link and the like.

At each of the remote locations, a control module 10 is connected to at least one load by means of a control data bus 10*a*. Illustratively, each of the loads may be a ballast and fluorescent lamp combination of the type disclosed and claimed in aforementioned pending applications Ser. No. 177,835 and 177,942, with or without the circuitry as disclosed and claimed in copending applications U.S. Ser. No. 242,782, and U.S. Ser. No. 242,783, now U.S. Pat. No. 4,376,969, which are incorporated herein by reference in their entirety. Each control module 10 receives load control data both from a local control means 11, via a local control means data bus 10*b*, and from the central facility via a central controller data bus 10*c* which is an extension of the central facility I/O bus 8. The control module may also receive data from local sensors 12 via another data bus 10*d*. Each controol module has a portion thereof specifying an address for the control module, whereby individual ones of a plurality of modules can be individually addressed and the load(s) attached thereto can be controlled from the central facility. Thus, a first control module 10-1 includes its own address select portion 10-1*a*, and has a control data output bus 10*a*-1 connected to a plurality of associated loads, e.g. ballast-lamp combinations. The first control module has connected thereto an associated local control means 11-1 and associated local sensors 12-1, for providing local information from the associated remote location, and also has a central facility data bus extension 10*c*-1 connected thereto. Similarly, a second control module 10-2 has its own address select portion 10-2*a*, in which is set an address different then the address set in the address select portion 10-1*a* of the first control module. Control module 10-2 communicates with associated loads via control data bus 10*a*-2, responsive to central facility information provided on central controller data bus 10*c*-2. The illustrated second control module 10-2 is not connected to local control or local sensor means, and is illustratively configured only for remote control from the central location. Other control modules and other remote locations may be centrally and locally controlled, or only centrally controlled, as required in a system configured for a particular usage.

Figure 1A:
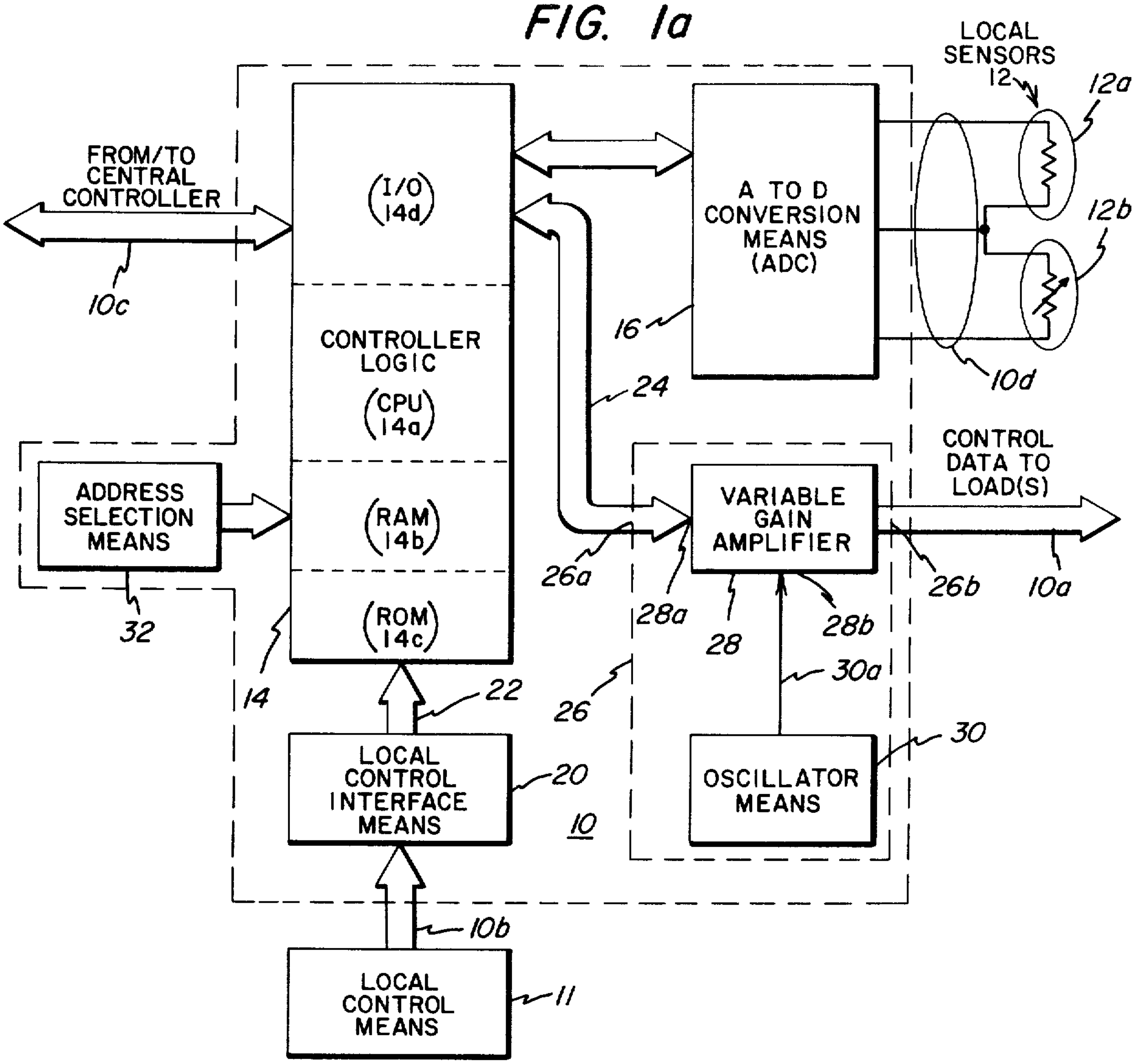
FIG. 1*a* is a schematic block diagram of a control module receiving both local and remote-central-location load control information for controlling the output condition level of at least one associated load, in accordance with the principles of the present invention.

Referring now to FIG. 1*a*, control module 10 provides load output, or energy-consumption, control information to at least one associated load (not shown in this Figure) by means of at least one output data bus 10*a*. In this illustrative embodiment, the load is an input control-ballast-lamp combination, such as formed by a combination of the apparatus described and claimed in the aforementioned patent applications 177,942 and 242,782. Control module 10 may receive control information from either a local control means 11, via an input data bus 10*b* or from the central controller (of FIG. 1), via the central controller data bus 10*c*, illustratively of the bidirectional type, also allowing information to be transmitted from control module 10 to the remote central controller. It should be understood that the term "data bus", as used herein, is any information-signal path, regardless of the nature or type of signal or information carried. Control module 10 receives, via another input data bus 10*d*, analog information from at least one local-ambient-condition sensor means 12, which may include a photocell 12*a* (for sensing local ambient light conditions), a thermister 12*b* (for sensing local ambient temperature conditions) and the like.

Control module 10 includes a controller logic means 14, such as a microcomputer; in one presently preferred embodiment, microcomputer 14 is an INTEL 8748 and the like. Control logic means 14 may thus include a central processing unit (CPU) 14*a*, a random-access memory (RAM) portion 14*b*, and a read-only memory (ROM) 14*c* in which is stored a logic program for determining the operation of the control module, responsive to certain commands and/or data received from the central controller, local control means 11 and/or or local sensors 12, via respective data buses 10*b*, 10*c* and 10*d*. Controller logic means 14 also includes an input-output (I/O) portion 14*d* providing the bidirectional communications capability to and from the central controller via bus 10*c*, as well as between other portions of control module 10 and the controller.

Control module 10 utilizes an analog-to-digital conversion (ADC) means for converting the analog voltage outputs of local sensors 12 to digital data for communication via internal data bus 18 to controller microcomputer 14. Control module 10 also includes a local control interface means 20 for allowing the local control means data, input to control module 10 via bus 10*b*, to be properly formatted and subsequently introduced, via another control module internal data bus 22, into controller microcomputer 14. As will be explained hereinbelow, controller microcomputer 14 is predeterminately programmed to obey the load command data from the central controller, local control means and local sensors in a predetermined manner, whereby the controller microcomputer provides digital load control data on a control module internal bus 24, for eventual control of load energy consumption/output. The digital load control data bus 24 is connected to the input 26*a* of a digital-to-analog converter (DAC) means 26, having an output 26*b* at which appears an analog signal of magnitude proportional to the value of the digital data received at the DAC means input 26*a*. DAC means 26 includes a variable gain amplifier 28 having a first input 28*a*. An oscillator means 30 provides, at an output 30*a* thereof, a periodic waveform of substantially constant amplitude, for coupling to another input 28*b* of the variable gain amplifier. The variable gain amplifier modulates a characteristic of the oscillator output waveform, in accordance with the digital data value then applied to amplifier input 28*a*, to provide a modulated carrier waveform at an amplifier output 26*b*. The modulated carrier waveform is transmitted via control module output bus 10*a* to provide control data to the at least one load connected thereto. In a presently preferred embodiment of control module 10, the control data is transmitted as a pulse-amplitude-modulated waveform, wherein the oscillator means provides a square wave at a frequency slightly less than 10 kHz. and the waveform amplitude may vary on a long-term, or on a cycle-by-cycle, basis to transmit load control data.

Control module 10 also includes an address selection means 32, coupled to controller logic means 14 to assign a unique address to a particular one of a plurality of control modules, in a centralized-control energy control system. By assigning a unique address to the address selection means 32 of control module 10, a control module will only respond to those central controller commands and data following receipt of the unique address assigned to that particular control module and will ignore central control commands and data prefaced by all other control module addresses.

Figure 2:
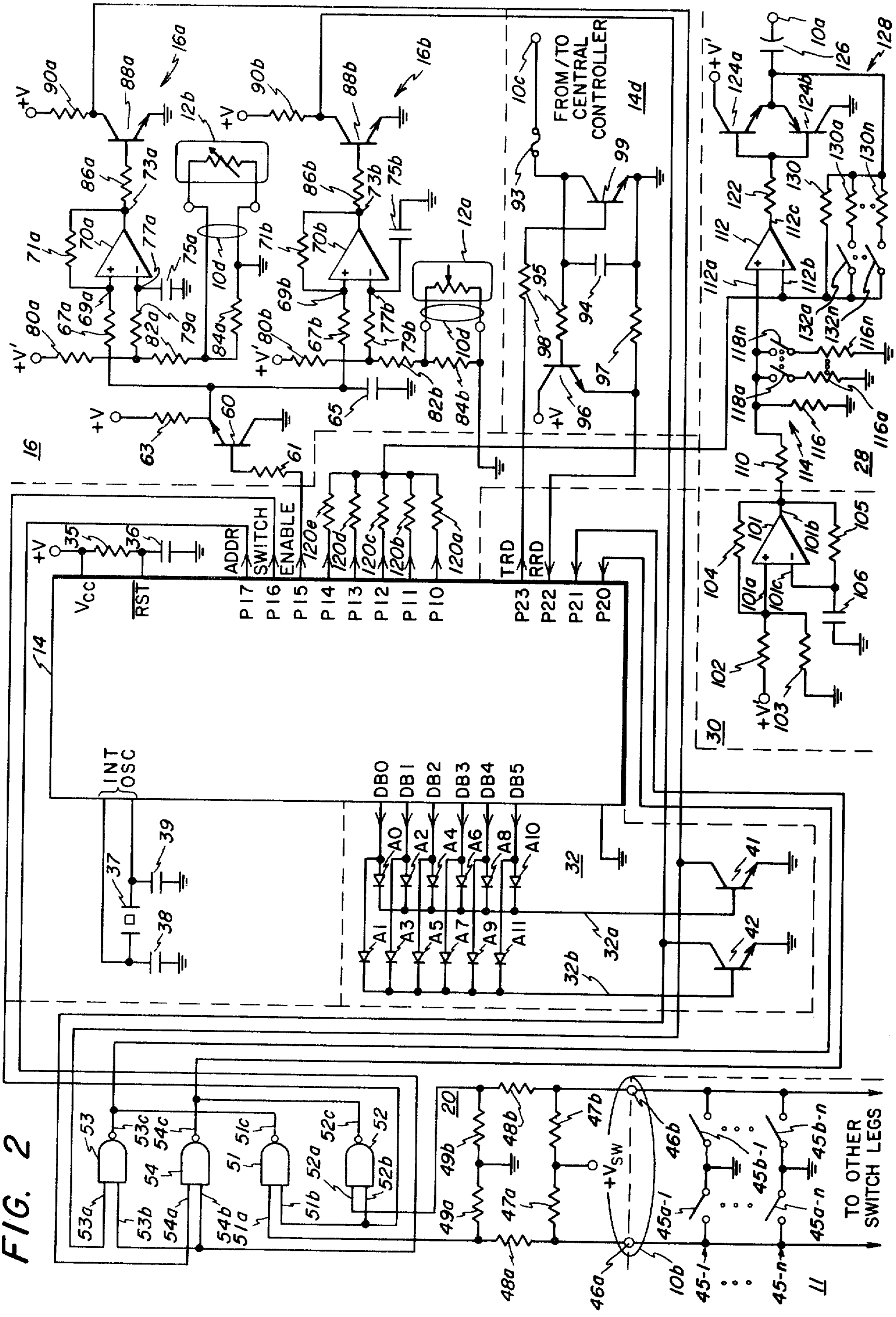
FIG. 2 is a schematic diagram of a presently preferred embodiment of the control module shown in block diagram form in FIG. 1.

Referring now to FIGS. 1 and 2, a presently preferred embodiment of our novel control module 10 utilizes the aforementioned INTEL 8748 single-chip microcomputer for controller logic means 14. Operating potential of magnitude +V is applied between the microcomputer power supply pins ($V_{cc}$) and ground. Operating potential is also applied to a resistance element 35, in series-connection with a capacitance element 36; the junction therebetween is connected to a reset ($\overline{RST}$) input, whereby the controller microcomputer is placed in operating condition upon application of the operating potential thereto. An internal clock signal is provided by connection of a clock crystal element 37 between a pair of internal oscillator leads of the microcomputer integrated circuit, operating in conjunction with a pair of oscillator capacitances 38 and 39, connected between ground potential and respective different ones of the internal oscillator leads.

The microcomputer provides a plurality of data bus outputs, e.g. outputs DB0–DB5, each connected to address selection means 32. The address selection means is comprised of a plurality (e.g. 12) of address selection elements, e.g. elements $A_0$–$A_{11}$, which may be diodes with or without fusible links and the like. Use of diode address selection elements is illustrated. Each of data bus outputs DBO–DB5 is connected to the anodes of an associated pair of diodes, e.g. pairs of even-odd numbered elements $A_0$-$A_1$, $A_2$-$A_3$, $A_4$-$A_5$, $A_6$-$A_7$, $A_8$-$A_9$, and $A_{10}$-$A_{11}$ if that particular diode is present. The cathode of one of the pair of diodes (e.g. the even numbered diodes) connected to each data bus output is connected to a first address line 32*a* and the cathode electrode of the remaining diode of each diode pair (e.g. the odd-numbered diode) is connected to a second address line 32*b*. Each of address lines 32*a* and 32*b* is connected to the base electrode of an associated transistor 41 and 42, respectively. The emitter electrodes of transistors 41 and 42 are connected to ground potential, while the collector electrodes thereof are respectively connected as described hereinbelow.

In the illustrated embodiment, local control means 11 comprises a plurality of switch means 45-*l* through 45-*n*, each of which is a momentary contact, single-pole, double-throw switch unit. Thus each switch unit 45-*k* (where $1 \leq k \leq n$) may be a wall-mounted switch unit of known type and may be considered (as illustrated) as first and second switches 45*a*-*k* and 45*b*-*k*, each having one contact thereof connected to ground potential and the remaining contact connected to an associated one of bus terminals 46*a* and 46*b*, respectively. Switches 45*a*-*k* may be used to control the ON/OFF funtion, while switches 45*b*-*k* may be used to CHANGE the output level (by an amount related to the length of time this switch is closed) in a direction set by the status of the UP/DOWN flag. The local control bus 10*b* comprises the pair of switch input terminals 46*a* and 46*b*, each capable of having at least one, and generally several, of the switches 45 connected thereto.

Local control interface means 20 utilizes a source of switchleg operating potential of magnitude $+V_{sw}$; the magnitude of the switchleg operating potential is advantageously established of sufficiently high value to prevent formation of oxides and the like across the contacts of the switches during operation thereof. Each of resistive elements 47*a* and 47*b* is respectively connected between the switch operating potential $+V_{sw}$ and an associated one of local control interface input terminals 46*a* and 46*b*. Each of a pair of resistance elements 48*a* and 48*b* have one terminal thereof connected to an associated local control interface means input terminal 46*a* or 46*b* and have the remaining terminal thereof connected to one terminal associated one of a pair of resistance elements 49*a* and 49*b* each having the remaining terminal thereof connected to ground potential. The junction between resistive elements 48*a* and 49*a*, or between resistive elements 48*b* and 49*b*, is respectively connected to one input 51*a* or 52*a* of each of a pair of two-input open collector NAND logic gates 51 or 52, respectfully. The remaining logic gate inputs 51*b* and 52*b* are connected together to the P16, or SWITCH, output of controller microcomputer 14. The output 51*c* of NAND gate 51 is tied in parallel to the output 53*c* of another two-input NAND gate 53, while the output 52*c* of NAND gate 52 is tied to the output 54*c* of a fourth two-input NAND gate 54. One input 53*b* and 54*b* of each of gates 53 and 54 is tied together to the P17, or ADDR, output of controller microcomputer 14. The remaining input 53*a* of gate 53 is tied to the collector electrode of address means transistor 41, while the remaining input 54*a* of gate 54 is connected to the collector electrode of address means transistor 42. Gate outputs 53*c* and 54*c* are also respectively connected to the controller microcomputer data inputs P20 and P21, respectively.

Another controller microcomputer output P15, forms an ENABLE line (forming a portion of bus 18) to ADC means 16. The analog-to-digital conversion means comprises a plurality (e.g. two) of a single-slope analog-to-digital converters, utilizing a common switching transistor 60. In the illustrated embodiment, transistor 60 is of the NPN type, having a collector electrode connected to ground potential, a base electrode connected through a base resistance 61 to the ENABLE output of controller microcomputer 14, and an emitter electrode connected through a resistance 63 to operating potential +V. An integration capacitance element 65 is connected between the switching transistor emitter and collector electrodes. The inputs of a plurality of threshold switching subcircuits, equal in number to the number of analog-to-digital converters desired, are connected across integration capacitance 65. In the illustrated embodiment, a pair of threshold-switching subcircuits 16*a* and 16*b* are utilized. A first resistance element 67*a* or 67*b* is connected from the transistor emitter electrode-integration capacitance element junction to a respective non-inverting input 69*a* or 69*b* of an associated operational amplifier 70*a* or 70*b*. An associated feedback resistance 71*a* or 71*b* is connected between an associated one of input 69*a* or 69*b* and a respective output 73*a* or 73*b* of the associated operational amplifier. A capacitance element 75*a* or 75*b* is connected between ground potential and an associated inverting input 77*a* or 77*b* of the respective operational amplifiers 70*a* or 70*b*. A first pair of series-connected resistance elements 79*a* and 80*a*, or 79*b* or 80*b*, is connected between operating potential +V and the associated operational amplifier inverting input 77*a*, or 77*b*, respectively. Another pair of series-connected resistance elements 82*a* and 84*a*, or 82*b* and 84*b* are connected between ground potential and the junction of respective resistance elements 79*a* and 80*a*, or 79*b* or 80*b*, respectively. Local sensor input bus 10*d* is formed across respective resistors 84*a* and 84*b*, for connection of local variable-output-resistance sensors 12*b* and 12*a* respectively thereto. Illustrative, sensor 12*a* is a photosensor, such as a photocell and the like, while sensor 12*b* is a temperature sensor, such as a thermistor and the like. The respective operational amplifier output 73*a* or 73*b* is connected through an associated base resistor 86*a* or 86*b* to the base electrode of an associated switching transistor 88*a* or 88*b*. The emitter electrodes of both transistors 88*a* and 88*b* are connected to ground potential while the collector electrodes thereof are respectively connected through an associated one of load resistances 90*a* and 90*b* to operating potential +V. The collector electrode of transistor 88*a* is connected to the collector electrode of address means transistor 41 and to the third logic gate input 53*a*. The collector electrode of transistor of 88*b* is connected to the collector electrode address means transistor 42 and to the fourth logic gate input 54*a*.

That portion of controller microcomputer I/O 14*d* used for bidirectional communication with the central controller via bus 10*c*, is illustratively configured for operation with a bus-current-sensing central controller transceiver, such as described and claimed in the aforementioned application Ser. No. 089,478. Bus 10*c* may be a twisted wire pair, having a first wire connected to ground potential and a second wire configured as an active line. The active line is connected through a fusible protection element 93 to a first terminal of a noise-filtering capacitance 94, having its other terminal connected to ground potential. The signal across filter capacitance 94 is applied through a base resistance 95 to a base electrode of a switching transistor 96. Transistor 96 is an emitter-follower stage, and has a collector electrode connecting to operating potential +V and an emitter electrode connected through an emitter resistance 97 to ground potential. The emitter electrode of transistor 96 is connected to a receive-remote-data (RRD) input P22 of controller microcomputer 14. A transmit-data-to-remote (TRD) output P23, of controller microcomputer 14, is connected through a base resistance 98 to a base electrode of another switching transistor 99, having its emitter electrode connected to ground potential and its collector electrode connected through protection element 93 to the active wire of bus 10*c*.

Oscillator means 34 and variable gain amplifier 28, forming DAC means 26, may be as described and claimed in co-pending U.S. patent applications Ser. No. 267,274 and 267,330 filed on even date herewith, assigned to the assignee of the present invention and incorporated herein by reference. Briefly, oscillator means 34 utilizes an operational amplifier 101 as an astable multivibrator, producing a square-wave waveform output at a frequency slightly less than 10 KHz. A pair of series-connected resistance elements 102 and 103 are connected between operating potential +V and ground potential. The junction between resistors 102 and 103 is connected to the non-inverting input 101*a* of the operational amplifier and is also connected through a feedback resistance 104 to the amplifier output 101*b*. Another feedback resistance 105 is connected between output 101*b* and the inverting input 101*c* of the operational amplifier, while a timing capacitance 106 is connected between inverter input 101*c* and ground potential. The oscillator output waveform is applied through a first resistance 110 to the non-inverting input 112*a* of another operational amplifier 112. A variable resistance 114 is formed between non-inverting input 112*a* and ground potential, and includes a fixed resistance element 116 and a plurality of resistance elements 116*a*–116*n*, each having a first terminal connected to ground potential and a second terminal connected to one contact of an associated one of a like plurality of switch means 118*a*–118*n*. The remaining contact of all of switch means 118*a*–118*n* are connected to non-inverting input 112*a*. Switch means 118*a*–118*n* are manually actuatable at the location of control module 10 to allow manual selection of the attenuation applied to the oscillator output waveform. Switch means 118a–188n may be utilized to set a minimum level of the control signal to the load and therefore set a maximum load level, which may not be exceeded under remote central, or local, control.

Variable gain amplifier 28 also includes a plurality of resistance elements 120, illustratively being five resistance elements 120a–120e. Each resistor has a first terminal connected to an associated one of controller microcomputer data outputs P10–P14. The remaining terminals of resistance elements 120a–120e are connected together to an operational amplifier inverting input 112b. An operational amplifier output 112c is connected through a resistance element 122 to the base electrodes of a complementary-symmetry pair of transistors 124a and 124b. The collector electrode of NPN transistor 124a is connected to a source of output operating potential of magnitude $+V_1$, while the collector electrode of PNP transistor 124b is connected to ground potential. The emitter electrodes of both transistors 124a and 124b are connected via a coupling capacitance 126 to the load control data output bus 10a (here shown as a twisted wire pair). As previously mentioned, but 10a may be coupled to the isolation circuit of co-pending application Ser. No. 242,782, or other suitable interface circuit. A feedback network 128 includes a plurality of resistance elements 130a–130n, each having a first terminal connected to the junction between the transistor emitter electrodes. The remaining terminal of each of resistors 130a–130n is connected to a first contact of an associated one of a like plurality of switch means 132a–132n, all having a remaining switch contact connected in parallel to operational amplifier inverting input 112b. A fixed resistance 130 may be used across the paralleled resistance-switch branch, to fix a minimum amplifier output level. Switch means 132a–132n may be manually operated or may be coupled to others of controller microcomputer outputs for programmable control (not shown).

Referring now to all of FIGS. 1, 2, 3, and 3a–3q, control module 10 operates as follows: upon application of power to the control module, the controller microcomputer $\overline{RST}$ pin is given a positive potential, by action of resistance 35 and capacitance 36, releasing the microcomputer reset. Upon release of the reset status, the microcomputer program counter is set at an intial location in the firmware program stored in the ROM 14c portion therof, entering the BEGIN step 200 of the program (FIG. 3a). The instructions stored in memory for the BEGIN step directs CPU 14a to the portion of ROM 14c in which is stored an INITIALIZATION OF PARAMETERS sequence (step 205): a constant, stored in ROM, is utilized as the digital data bit pattern initially made available at controller microcomputer output lines P10–P14. Those of gain-select lines P10–P14 receiving a logic zero level appear as if connected to ground potential, while those lines receiving a logic one level appear as a substantially open circuit impedance level. The gain of amplifier section 28 is thus initially set by those of resistances 120a–120e connected to ground potential, to establish the magnitude of the waveform at control data waveform output 10a at a predetermined level; the magnitude of the output waveform cannot exceed the maximum amplifier gain set by manual control of switches 118a–118n and/or 132a–132n. The periodic waveform is transmitted on bus 10a to the at least one input control-ballast-lamp combination, with the input control portion thereof providing isolation and rectification of the periodic waveform to a D.C. level setting the associated lamp to a predetermined intial light output level.

During Initialization of Parameters in step 205, the controller microcomputer also transfers a maximum light level-setting data value MAXON from a storage location in ROM 14c to a selected storage location in RAM 14b. The MAXON data establishes the minimum amplitude to which the variable gain amplifier output waveform may be set, by putting a limiting value to the data bit pattern applicable to controller microcomputer output lines P10–P14. This data word is stored at a predetermined locations in RAM 14b, so that the level thereof is capable of subsequent change by command from the central controller. (In the event that the control module is configured in the local-only mode, as hereinbelow described, the initial maximum light-level-setting data, permanently stored in the ROM, becomes an invariant maximum light level for all control circuit-ballast-lamp combinations controlled by that control module).

During Initialization of Parameters step 205, the controller microcomputer flags are also set to initial states. An ON/OFF flag is set to reflect the state of the lamp, such that if the initial level, previously established in the firmware program ROM 14c, is a level other than OFF, this flag is set to ON. The ON/OFF flag is set to OFF only if the lamp is to be initially off. A message-pending (MSG PEND) flag is utilized to signify, if set, that the control module is waiting for data bus 10c to be free in order to have the particular control module 10 transmit a message, stored in RAM 14b, to the central controller. The MSG PEND flag is reset at initialization to indicate that a message is not then to be sent. An UP/DOWN flag, determining if the brightness of the lamp is to increase (UP) or decrease (DOWN), in response to closures of switch portions 45b–k, is initially set to the UP position, to allow the lamp to be powered up, if the ON/OFF flag is set to the ON condition. The UP/-DOWN flag remains in the UP condition until the load level reaches the load level set as the maximum light level (MAXON), and then changes to the DOWN condition. This flag is maintained in the DOWN condition until the load output level reaches a minimum allowable level (MINON), if used, or until reset to the UP condition.

After the parameters have been initialized, the firmware program proceeds to step 210 wherein a read-local-address (RDADR) subroutine (shown in FIG. 3b) is called. Since a common firmware program is utilized for all control modules in an energy-control system, the unique local address assigned to a particular control module 10 must be read into the control microcomputer from address means 22 at the commencement of operation, and before the control module can respond to command information on bus 10c from the central controller. Accordingly, at step 210 in the commencement of the RDADR subroutine, controller microcomputer output P15 is set to the logic one level, holding switching transistor 60 in the saturated condition. The ADC comparator outputs 73a and 73b are thus set to logic zero output levels, to place transistors 88a and 88b in the cut-off condition. The multiplexers, formed respectively by transistors 88a and 41a and by transistors 88b and 42b, are thus configured to select the inputs to address means transistors 41 and 42 as determining the outputs to controller microcomputer inputs P20 and P21, respectively; thus, the ADC outputs and switches are effectively masked (step 211 of FIG. 3*b*). In subsequent step 212, the address bits are input to data lines P20 and P21 as each of data bus lines DB0–DB5 is individually and sequentially enabled to the logic one level. It will be seen that, as first data bus address line DB0 is enabled to the logic one level, transistors 41 and 42 will saturate only if an associated one of address-selection elements $A_0$ and $A_1$ is present; saturation of either transistor places a logic zero level at the associated data input of controller microcomputer 14. If the associated one of address elements $A_0$ or $A_1$ is not present (as by removal of a diode, or by opening a fusible link and the like) the base electrode of the associated transistor receives no signal and is in the cut-off condition, allowing the associated one of controller microcomputer inputs P20 and P21 to be pulled to the logic one level by application of operating potential +V through the associated one of resistors 90*a* and 90*b*. Thus, by application of a logic one level at the $DB_0$ output, the first two bits of the local address are determined by the presence or absence of address elements $A_0$ and $A_1$. Subsequently, each of the remaining data bus address lines $DB_1$–$DB_5$ is individually raised to the logic one level whereby additional two-bit portions of the unque control module local address are read into data lines P20 and P21. When all six of the data bus lines have been sequentially raised to logic one level, a 12 bit address word has been read into the RAM 14*b* section of the controller microcomputer. It will be seen that this allows $2^{12}=4096$ distinctly-addressed control modules to be connected to a single central controller data bus 10*c* and individually addressed. The particular address remains stored in RAM 14*b* as long as the control module is receiving operating potential. This address will be subsequently used for comparison against the address portion of any transmission from the central controller and also as a preamble in any message transmission back to the controller, as may be initiated from control module 10 by the central controller. Storage of the address word in RAM 14*b* thus requires that the 12-bit word be shifted to the proper bit location (step 213) and then logic OR'd with the contents of the assigned location (step 214) to place the recently-input addressed data bits into the location assigned thereto. A check (decision step 215) is then made to ascertain whether the reading of the address bits into RAM is complete. If all 12 bits are not present in the proper location, the subroutine loops back (as shown by line 216) to the beginning of the RDADR subroutine (step 210); if reading and storage of the address bits is complete, the subroutine goes to step 217, and returns to the main sequence of FIG. 3*a*.

The main program now proceeds to step 220, wherein a BLSCON subroutine is called to determine if the control module is connected to the central controller data bus 10*c*. The BLSCON subroutine (of FIG. 3*c*) is required as the control module may operate in two distinct modes: A local (LOCAL) mode in which data bus 10*c* is not connected to a central controller and load output level is controlled by local control means 11 and local sensors 12; or a programmable general (PROG) mode, in which data bus 10*c* is connected to the central controller and in which maximum (and/or minimum) output levels (MAXON and MINON) and output values therebetween, can be set by the central controller, with or without override by local control means 11 and with or without reference to the data from local sensors 12. In the PROG mode, control module 10 can also transmit information over central controller data bus 10*c* in response to commands from the central controller. The BLSCON subroutine 220 is based upon use of control module 10 in the bidirectionally communicating energy management system of the aforementioned pending application Ser. No. 089,478, wherein data bus 10*c* will have a positive voltage present thereon within a certain time limit (typically 200 milliseconds) if data bus 10*c* is connected to the control module. Therefore an initial step 221 initializes an internal counter-timer register of controller microcomputer 14 for a count of 200 milliseconds; a counter-timer output is provided after the 200 millisecond count delay has passed. Having set the counter-timer, the subroutine progresses through a BLSCON 2 node 222 to a step 223 wherein the logic level on data bus 10*c* is read. The data bus 10*c* logic level read in step 223 is utilized in a decision step 224; if the data bus is high, providing a logic one level the subroutine progresses to step 225, setting a flag (BLSFLG) indicative of the PROG condition with connection to the remote central controller, and making no change in the state of a second flag (LSFLG). After setting flag BLSFLG and leaving flag LSFLG alone, the subroutine enters a RETURN step 226 and returns to the main program prior to a LOOP node 230. If the logic level on data bus 10*c* was low, decision step 224 provides a NO output and the subroutine enters decision step 227, in which the count in the counter-timer is compared to zero. If the count has not yet reached zero, step 227 provides a NO output and step 228 is entered, wherein the counter-timer is decremented and the BLSCN 2 node 222 is reentered. At such time as the counter-timer is fully decremented and the count therein is zero, decision step 227 provides a YES answer and step 229 is entered. In step 229, the BLSFLG flag is cleared, indicative of the fact that a positive logic one level has not been presented on the remote central controller bus 10*c* at any time during the 200 millisecond check interval and the central controller is not connected to control module 10. Accordingly, the LSFLG flag is set to the LOCAL condition, indicative to the fact that the particular control module 10 is in the local, or stand-alone, mode. After completion of step 229, the subroutine enters step 226 and returns to the main program prior to LOOP node 230. It should be noted that the LSFLG flag, indicative of the states of the local control means 11 switchs connected to bus 11*b*, may be enabled even if the central controller is connected and the module is in the PROG mode. The central controller has the capability to programmably change the state of the LSFLG flag during the course of operation of the remotely controlled system.

The initialization phase is now complete and the module is now ready to process commands from switch means 11 closures or from the remote central controller.

MAIN LOOP-LOCAL MODE

Having been initialized, control module 10 will, as previously mentioned hereinabove, be in the LOCAL mode if the BLSCON subroutine of step 220 ascertains that a logic one level does not appear upon bus 10*c* at any time within 200 milliseconds. In the LOCAL mode (or with the LSFLG flag enabled in PROG mode), local switches 45-*l* through 45-*n* may be utilized to increase or decrease the load output level dependent upon the state of the UP/DOWN flag, which is itself controlled by closure of one of switch portions 45*a*-*l* through 45*a*-*n* to place ground potential of bus 10*b* input 46*a*; the magnitude of load output level change, once the change direction is set, is dependent upon the duration of closure of one of switch portions 45*b*-*l* through 45*b*-*n* to place ground potential on bus 10*b* input 46*b*. Local sensors 12 may or not be utilized in a particular application, with the control module either in the local or remote-control mode.

Figure 3:
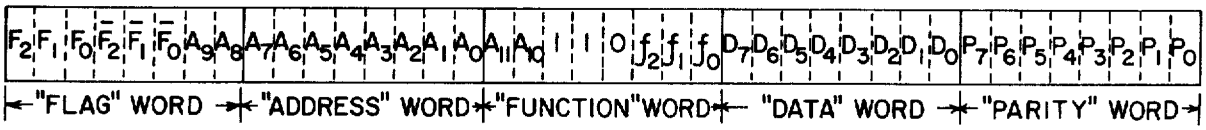
FIG. 3 is a diagram illustrating a 40 bit message of five sequential eight-bit words, as may be sent to a control module in one presently preferred centrally-controlled system embodiment.
Figure 3A:
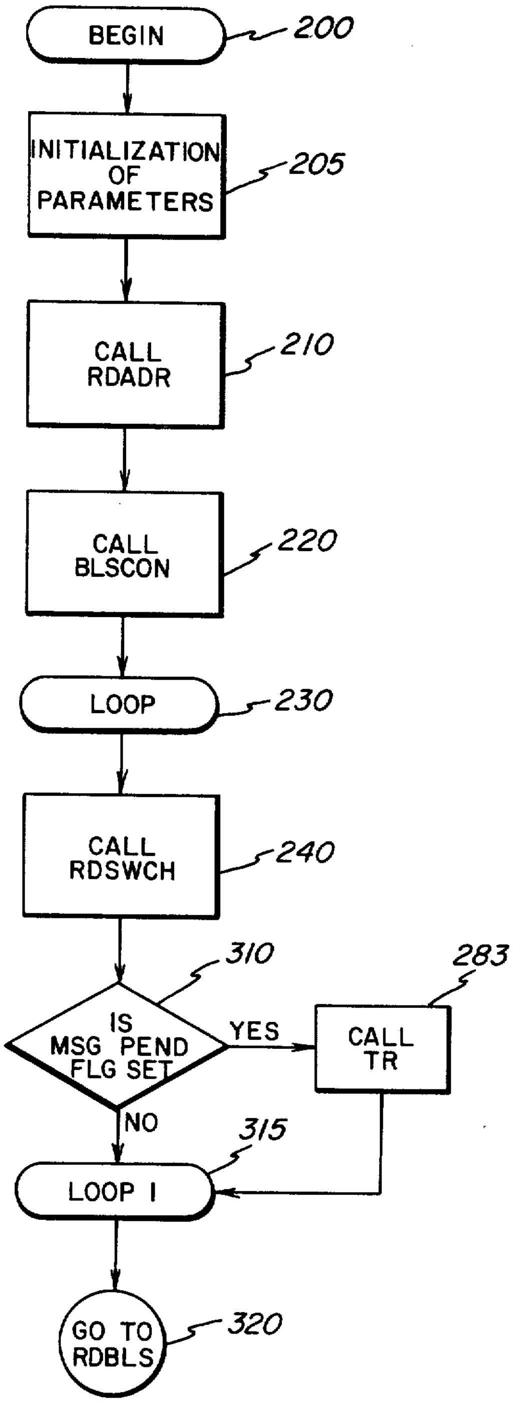
FIGS. 3*a*–3*q* are coordinated flow charts useful in understanding the manner in which the control module circuitry of FIG. 2 performs each of a multiplicity of load control functions in one presently preferred embodiment.
Figure 3B:
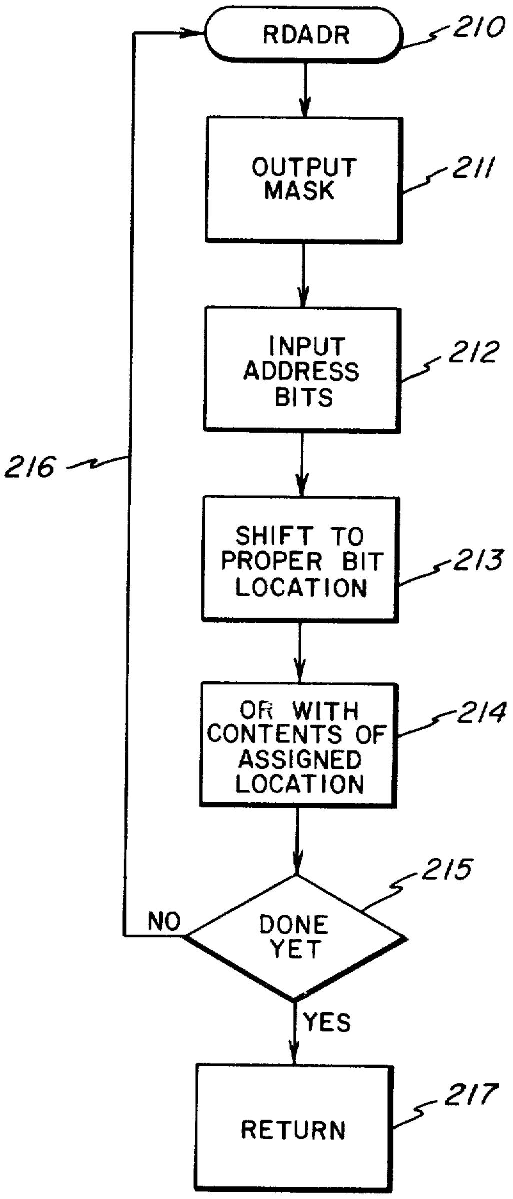
Figure 3C:
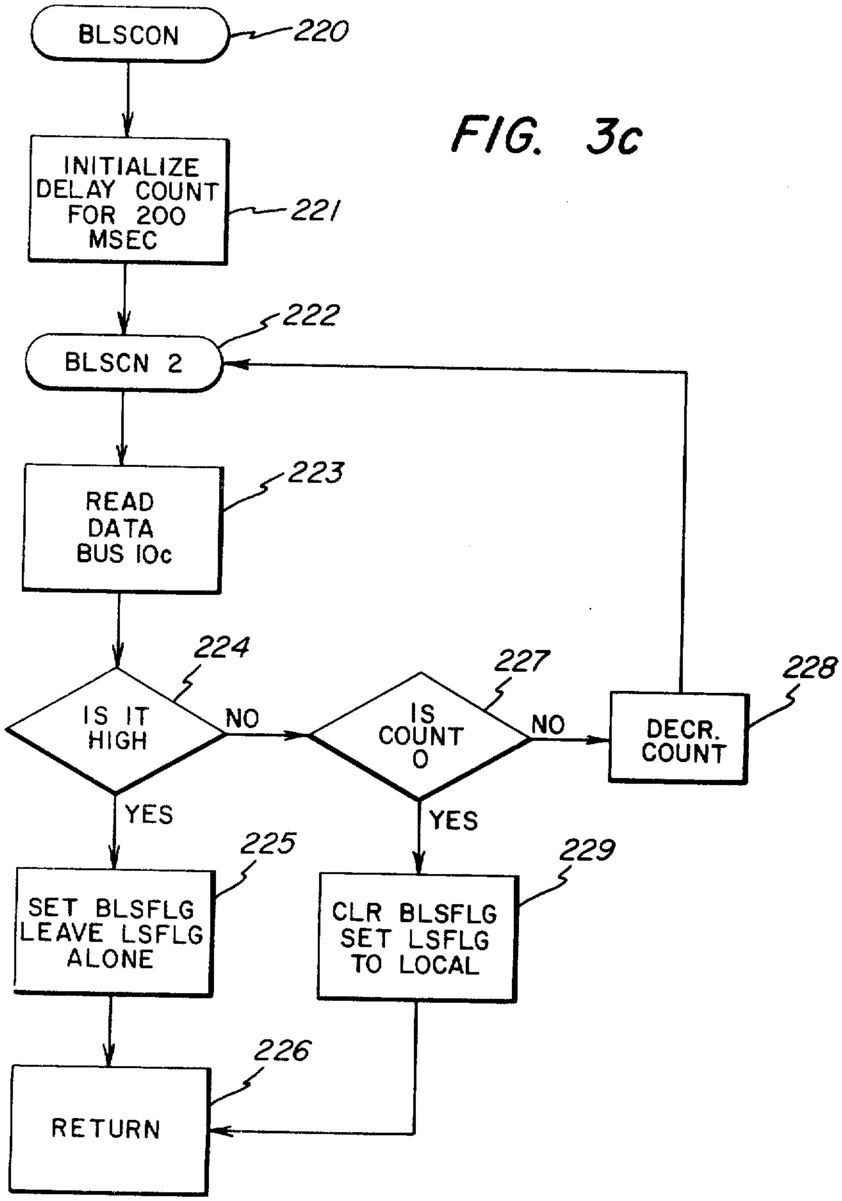
Figure 3D:
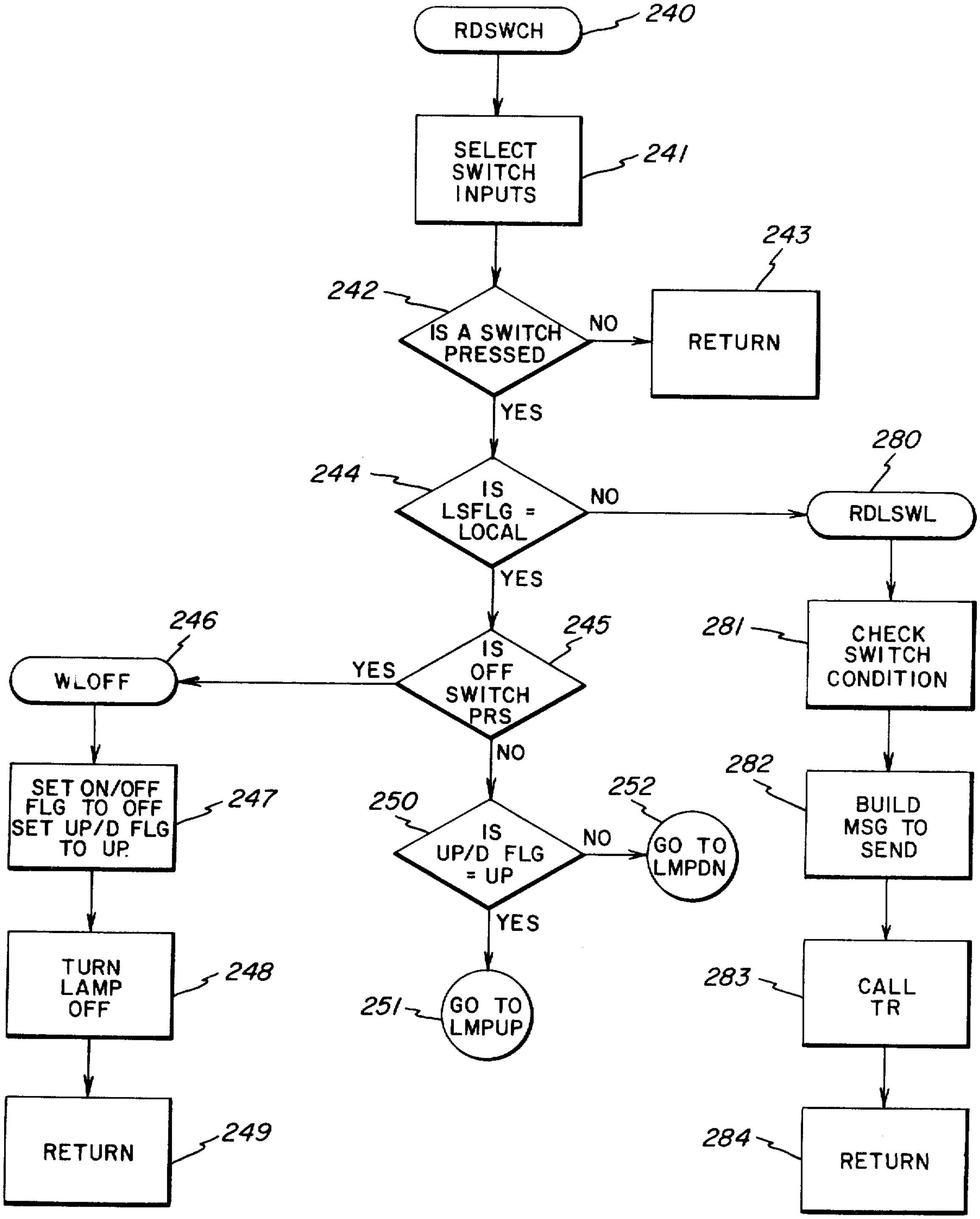

The main LOOP commences by passing from LOOP node 230 to call the switch-reading subroutine (RDSWCH) at step 240 (FIG. 3*d*). In step 241, the ENABLE line at the P15 output, and the ADDR line at output P17, are switched to a logic zero level effectively removing the open-collector NAND gates 53 and 54 from connection to inputs P20 and P21. The logic levels at the P20 and P21 inputs are now set directly by the associated logic gate outputs 51*c* and 52*c*, respectively. The controller microcomputer P16, or SWITCH, output is enabled to provide a logic one level to enable gates 51 and 52. If all members of both switch portions 45*a*-*k* and 45*b*-*k* are open, both input P20 and P21 receive logic zero inputs. If any one member of either of switch portions 45*a*-*k* or 45*b*-*k* are closed, the associated input 46*a* or 46*b* is connected to ground potential, the associated gate input 51*a* or 52*a*, respectively, receives a logic zero input and the associated gate output provides a logic one signal to the associated controller microcomputer input P20 and P21, respectively, indicative to a switch closure. The controller microcomputer 14 therefores checks its inputs P20 and P21, immediately after enabling the P16 output and determines if a logic zero level exists on either input, indicative of a switch-pressed decision (step 242). If a switch has not been closed, a NO decision results and the subroutine enters the RETURN step 243, returning to step 310 in the main LOOP sequence. If either input P20 and P21 is a logic zero, a YES switch-pressed decision results, taking the subroutine to next decision step 244. The CPU checks the flag register and determines if the LSFLG flag is set to the LOCAL condition. If the LSFLG flag is in the LOCAL position, another decision step 245 occurs, wherein the state of ON/OFF switch sections 45*a*-*k* are checked for OFF presence (PRS). If the switch section is being continously pressed to provide an OFF level, the firmware program enters the immediate-lamp-off (WLOFF) subroutine at step 246. The CPU (step 247) sets the ON/OFF flag to the OFF condition, indicative of the load being turned off, and sets the UP/DOWN flag to the UP condition, indicating that the load is at a minimum value and that subsequent level changes must be in the UP direction. The present load level data is stored in a predetermined location in RAM 14*b*, for use when the lamp load is subsequently turned ON.

In step 248, the lamp is turned off, by controlling outputs P10-P14 to provide a periodic waveform signal of that value which turns the input control-ballast-lamp load combination to the off condition. Having completed the WLOFF subroutine, the program returns, at step 249, to the main LOOP after step 240.

Returning to step 245, if the OFF switch has not been pressed, a check for closure of any switch is made by checking the status of the UP/DOWN flag in decision step 250. If the flag is in the UP position, the subroutine continues to an increase-output-level subroutine LMPUP subroutine, at step 251; if the flag is in the DOWN position, the program continues to a decrease-output-level subroutine LMPDN at step 252.

The LMPUP subroutine step 251 (FIG. 3*e*) commences, at step 252, by re-checking the ON/OFF condition of the switches. An off flag indicates that the lamp is being turned back on from an off condition, and therefore the program is directed to an immediate-on WBLON sequence, starting at step 253. The load is programmed to a predetermined specific level, e.g. 38 percent of maximum output, in step 254, and the ON/OFF flag is set to the ON condition in step 255. Having now implemented the local switch signals, which require the lamp to be on with reduced input, the program enters step 256 and returns to the main LOOP program at the end of step 240.

If, during the check of step 252, the OFF condition was not present, indicating that the lamp was previously on, the program is directed to step 257, wherein the LSFLG flag is checked for being in the LOCAL condition. If the local flag is not set, the program jumps to step 259 (to be discussed hereinbelow); if the local flag is set to the LOCAL condition, the program enters the decision step 258. In step 258 the level is checked against the currently established maximum allowable level MAXON, which was, as hereinabove described, transferred to the RAM from the ROM at initialization, and which may be revised by data from the remote central controller if the programmable mode is subsequently utilized. If the load output level is less than the MAXON level, or if the LSFLG flag was not set to the LOCAL condition (step 257), the program enters step 259 and increments the load output level. The actual level change is carried out by a WLAMP subroutine, in step 260, to provide a smooth level change, utilizing the slow-output change circuitry and methods described and claimed in co-pending application Ser. No. 267,274 and 267,330, both filed on even date herewith, assigned to the assignee of the present invention and incorporated herein by reference in their entireties. As that method, whether of the amplitude-modulated, pulse-width-modulated or other variable-signal characteristic modulated form, utilizes at least one controller microcomputer counter-timer, continued execution of the program is delayed in step 261, until the level changes have been executed. In particular, when a slow change in light level is required, either in response to a "set light level slow" command from the central controller (discussed hereinbelow with respect to FIG. 3*k*) or to closure of the "CHANGE" switch section 45*b* for a particular amount of time, the following procedure is followed: the controller microcomputer assigns three locations in the RAM portion 14*b* thereof as counter-registers. The first counter register is utilized to hold basic system time constant data, transferred thereto from ROM portion 14*c*; the ROM value will be different for different systems, dependent upon the time constant necessary for the load, e.g. the ballast-lamp combination, to effect an output change therein. The second and third counter registers contained basic system time constant multipliers, having values varying in accordance with the time constant with the total system and which, in the present preferred embodiment can vary between values of 1 and 255 (for an eight-bit register). To effect the slow change of level, microcomputer 14 initializes all the counter-registers and then provides the new level data at the P10-P14 output thereof, setting the variable gain of circuit 26 to the new value, for a time period equal to the basic system time constant value. Thereafter, the old, or former, output level data is provided at the P10-P14 microcomputer outputs for a period of time much greater than the basic system time constant value, e.g. for about 100 times the basic system time constant value. Thereafter, the count in the second counter register is incremented by one (e.g. to a count of two) while the count in the third counter register is decremented by one (e.g. to a count of 99). The new level data is then provided at the P10–P14 outputs for a time interval equal to the product of the count in the first and second counter-registers, e.g. two times the basic system time constant, and then the old level data is output for a time interval equal to the product of the counts in the first and third counter-registers, e.g. for about 99 times as long as the basic system time constant. Incrementation of the second counter-register and decrementation of the third counter-register continue; the amount of time at the new level of output steadily increases while the amount of time at the old level of output steadily decrease. This process continues until the second counter-register is fully incremented, say to the count of 100, and the third counter-register is fully decremented to a count of zero. At such time, the controller microcomputer then outputs the data for the new level continuously. Thus, the output load level has changed discretely but appears to an observer to have slowly and continuously changed, due to the gradual change thereof. After the slow level change is complete, program step 262 is entered and the program returned to the end of step 240 in the main LOOP.

If, in step 258, a comparison finds that the output level is not less than, or equal to, the MAXON value, step 263 is entered and a long delay begun to let the switch operator know that a change will not be occurring. At the end of the delay, since the output level cannot increase beyond the maximum presently-set level, the UP/DOWN flag is set, in step 264, to the DOWN condition, indicative of the need for any further changes in the load output level to be of a decreasing nature. Having set the UP/DOWN flag the program proceeds to step 265, and returns to LOOP node 230 at the beginning of the main loop, to check for additional switch instructions, which may request a reduction in load output (as further load output increases cannot be presently obtained).

Figure 3F:
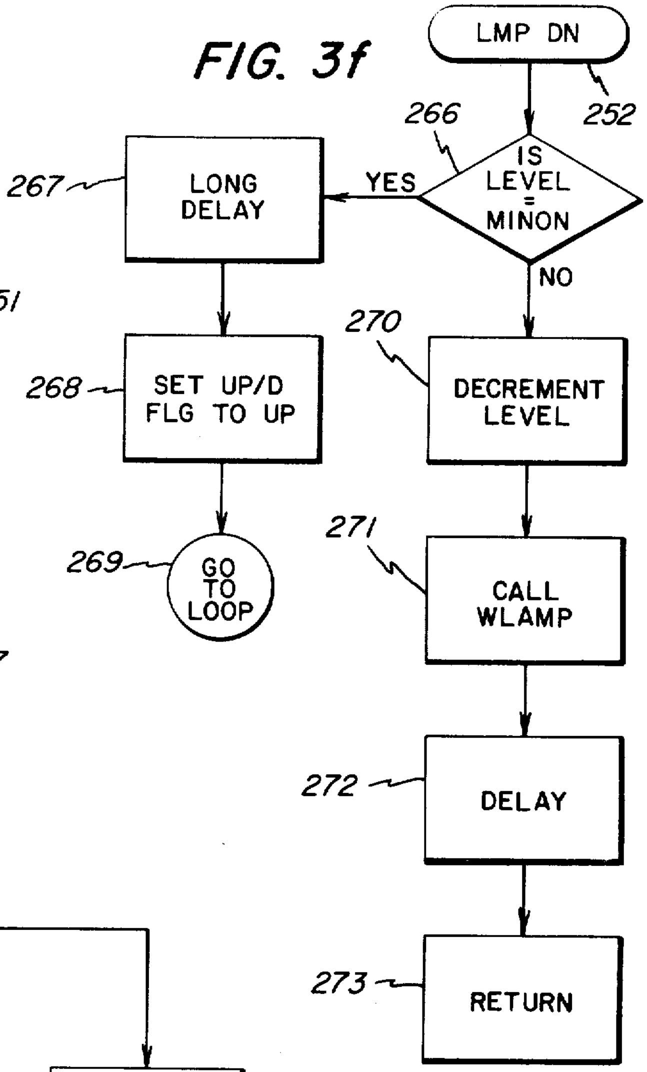
Figure 3E:
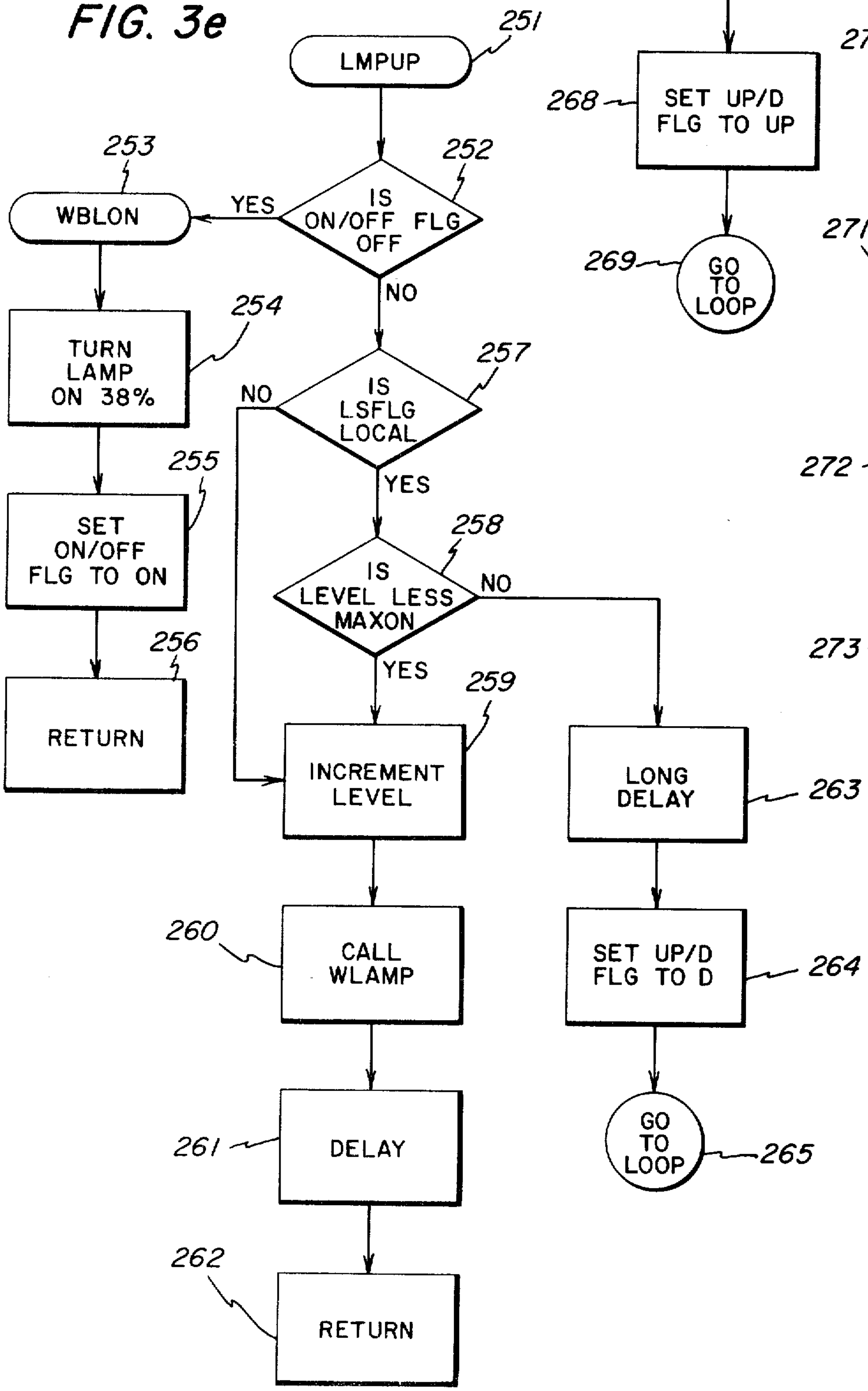

If an output level decrease is commanded, the RDSWCH subroutine will eventually enter the LMPDN step 252, as previously described hereinabove, and the sequence of FIG. 3*f* commences. In step 266, the present commanded load output level is checked against the minimum selectable output level MINON. If the minimum selectable output level is presently used and the load output is equal to that level, the program passes through a long delay step 267 and then, in step 268, resets the UP/DOWN flag to the UP condition, indicative of the need for interpreting the next closure of the UP/DOWN switch section 245 as an UP command. After setting the flag, step 269 is entered and the program returns to LOOP step 230 to reenter the RDSWCH subroutine (step 240) and reinterpret any continued closure of the UP-DOWN switch as a request to increase the light level.

If the level comparison step 266 found that the present load level was not at the MINON level, step 270 is entered to decrement the present level. Having reduced the commanded load level in step 270, a smooth level change is carried out by calling the WLAMP subroutine, in step 271; the WLAMP subroutine was previously described hereinabove with reference to step 260. While the WLAMP smooth-level-change procedure is occurring, the program goes through a delay step 272 until the controller microcomputer has finished use of its internal counter timer, at which time step 273 occurs and the program returns to the end of step 240 of the main LOOP.

MAIN LOOP-PROG. MODE

If, in step 220, the remote central controller data bus 10*c* was determined to be connected to control module 10, LOOP node 230 is still followed by the RDSWCH subroutine step 240. The previously described steps 241–244 occur; however, the result of comparison step 244 will be a NO result as the LSFLG flag is set to the PROG condition. The program now enters the RDLSWL subroutine, of step 280 (FIG. 3*d*). The controller microcomputer checks the switch conditions in step 281, and forms, in predetermined locations in RAM 14*b* thereof, a message containing the contact status of each switch, for eventual transmission to the central controller (step 282). Once the message has been "built" in its RAM storage space, the program calls the message transmission (TR) subroutine of step 283. After the TR subroutine is run, the program enters step 284 and returns to the end of RDSWCH main program step 240.

The message transmission TR subroutine, as well as the messages transmitted to control module 10 from the central controller, utilizes a 40-bit message format, as shown in FIG. 3. This five-byte message commences with a "flag" word providing three true flag bits $F_2$-$F_0$ and three complementary flag bits $\overline{F_2}$-$\overline{F_0}$, followed by address bits $A_9$ and $A_8$. An "address" word transmits the eight least significant-bits $A_7$-$A_0$ of the control module address. A "function" word has the two most-significant-bits $A_{11}$ and $A_{10}$ of the control module address, followed by a fixed 3-bit sequence (011) and three-function bits $f_2$-$f_0$, for transmission of control module function information to the remote central controller. A "data" word, having eight data bits $D_0$–$D_7$ (received from the central controller) utilizes the high-order nibble of data bits $D_4$–$D_7$ for transmission of one of 16 possible command numbers; the low-order nibble, of data bits $D_0$–$D_3$, contains four bits of command data, if present, for the associated command number transmitted in the high-order nibble. Finally a "parity" word, having eight parity bits $P_0$–$P_7$, is transmitted. The complementary flag and true-flag bits are utilized for transmitting status information on, or setting status of, the ON/OFF, UP/DOWN, LOCAL/PROG, LSFLG, BLSFLG, SENSOR-ENABLE, etc., flags in the CPU flag register.

Figure 3H:
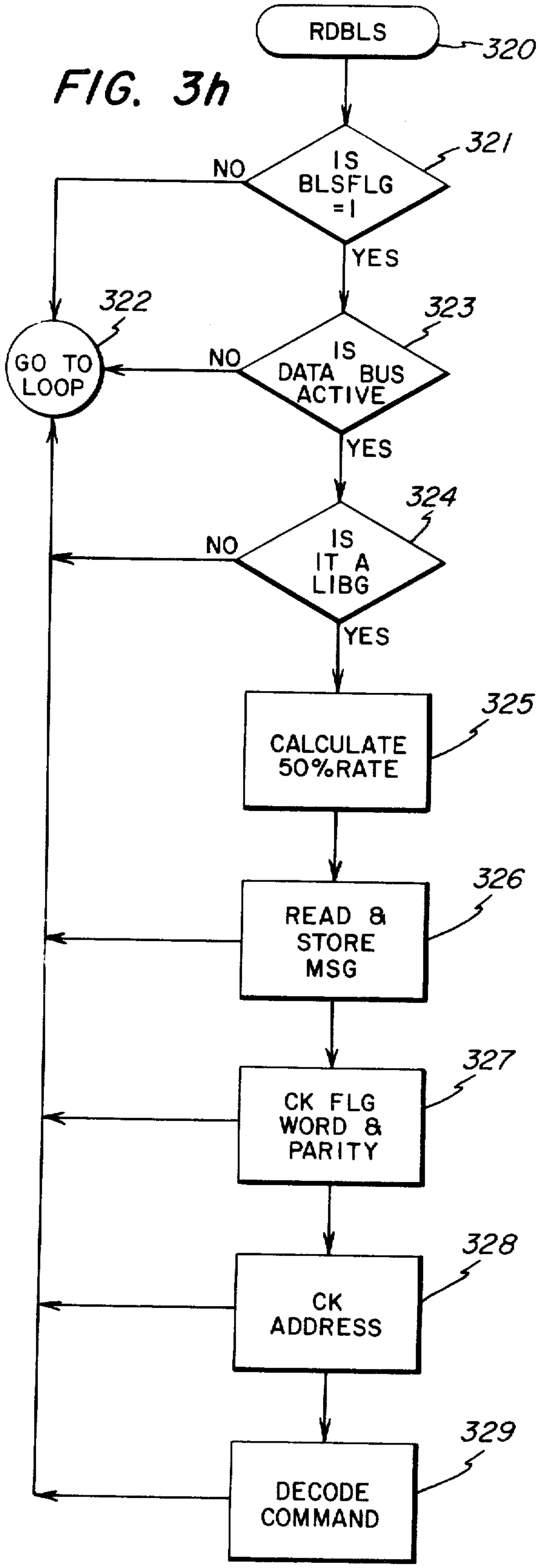
Figure 3G:
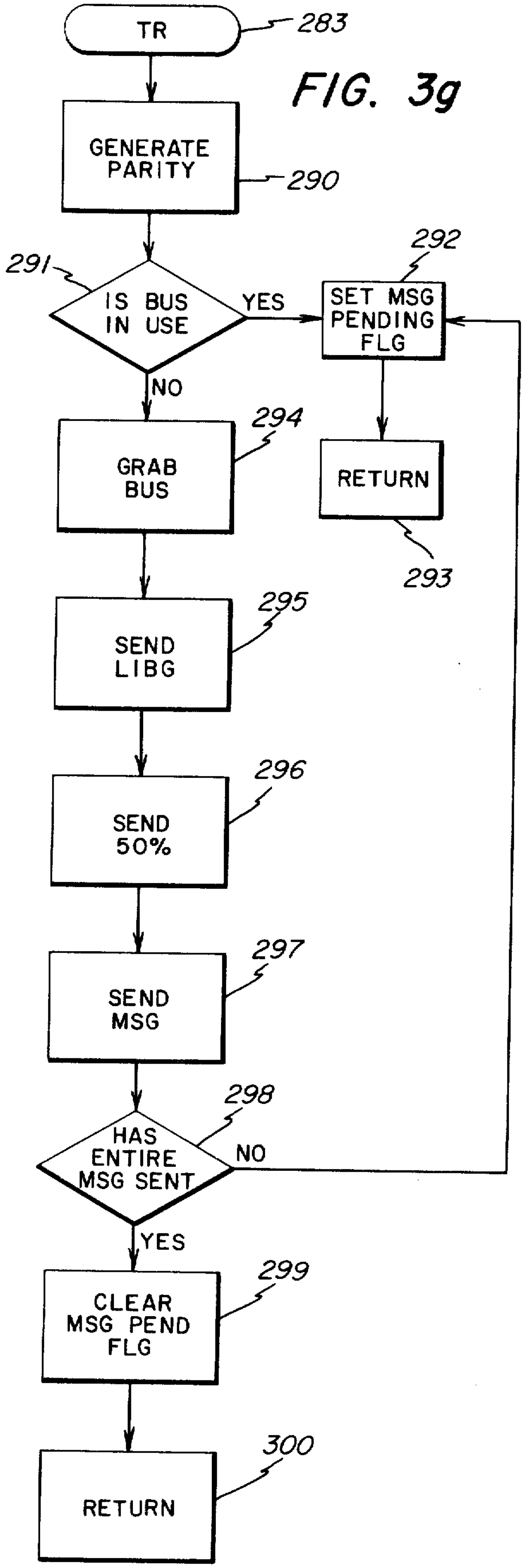

In the message transmission TR subroutine of FIG. 3*g*, the message data: is assembled in RAM 14*b* in accordance with the "flag", "address", "function" and "data" word format of FIG. 3; is checked; and parity bits are generated therefrom (step 290) to form the "parity" word (see FIG. 3). The complete message now having been assembled from data and parity information, the program then enters decision step 291 and determines if remote controller data bus 10*c* is in use. If the bus is in use, the message pending flag is set in step 292 and the TR subroutine returns through step 293 to the end of RDSWCH step 240. If bus 10*c* is not in use, the controller microcomputer "grabs" the bus to gain access thereto, in step 294. The bus is grabbed by providing a logic one level at controller microcomputer TRD output P23, causing transistor Q7 to saturate and connect the active line of bus 10*c* substantially to ground potential. In the presently preferred embodiment, data is sent by pulse-width-modulation, with the length of each data bit pulse being predetermined in both the logic one and logic zero states. It should be noted at this point that the controller microcomputer can receive data at various rates, although transmission must be by use of the predetermined-pulse-width technique. Having grabbed bus 10c in step 294, the controller microcomputer keeps the bus at the logic zero level to send an initial and relatively long inter-block-gap (LIBG) in step 295. Output P23 of the microcomputer then varies between a logic one level, saturating transistor 99 to connect an impedance across the line and render the line in the inactive state, and a logic zero level to cut-off transistor 99 and release the bus, to place the bus in the active state. The message therefore is transmitted by varying the length of time that each of the active and inactive states are transmitted by the transistor 99 collector-emitter output impedance across the bus. A preamble is sent utilizing pulses having a 50% duty cycle, in step 296, and the message follows thereafter in step 297. In order to avoid simultaneous transmission by two control modules, which would destroy the integrity of a message already being sent by one such module, a bit arbitration technique is utilized. If the data bus is set to the active state by the remote controller, the active bus state is immediately received and read into the microcomputer as a logic one level at RRD input P22. If the state changes to the inactive state by action of another module, the module presently sending its message would relinquish the data bus and set its message-pending flag in a selected location in internal RAM 14*b*. Thus, in step 298, relinquishment of data bus 10c is checked and if the entire message has not been sent, the message pending flag-setting step 292 follows; after the message pending flag is set, the subroutine returns (step 293) to the RDSWCH program of step 240 and will later attempt to send the message once again. If the entire message has been sent, step 298 is followed by step 299, wherein the message pending flag is cleared, indicative of no pending messages being stored in the single-message RAM buffer. Having cleared the message pending flag, step 300 returns the program to the RDSWCH program step 240.

Having read the switch data in either the local or remote modes, the RDSWCH subroutine 240 is complete and the main LOOP program now checks the message pending flag in step 310. If the message pending flag is set, because an entire message was not sent (as in step 298 or otherwise) the program calls the message transmission TR subroutine, as in previously-described step 283. Upon completion of the TR subroutine, or if the message pending flag was not set, the main program is rejoined at the LOOP 1 node 315 and proceeds to call a RDBLS subroutine step 320 (FIG. 3*h*).

The RDBLS subroutine commences with consideration of the BLSFLG flag in decision step 321. The condition of this flag had previously been established in the BLSCON subroutine of step 220. If the BLSFLG flag is set to a logic zero state, indicating that the remote central controller data bus 10c is not connected to control module 10, the program goes to step 322 and returns to LOOP node 230. If the BLSFLG flag has been set to a logic one condition, indicative of the connection of remote central controller bus 10c to the control module, the program next considers, in decision step 323, if the data bus 10c has a low logic level thereon, providing a low logic level to controller microcomputer input P22. If the low logic level is present, data bus 10c is not active and the program exits through step 322 to LOOP node 230. If the data bus has a logic one level theron, the line is active and the controller microcomputer, in decision step 324, looks for the long inter-block-gap (LIBG). As each message starts with an LIBG signal having duration which is typically on the order of 2–6 milliseconds, any incoming data on the bus 10c is checked for an LIBG of this length. Thus, the microcomputer counts the time that the data-bus 10c is active and if the duration is insufficiently long for the LIBG signal, the signal on bus 10c is ignored and the controller microcomputer returns, via step 322, to LOOP node 230, and again monitors the local switches. If, however, an LIBG signal of sufficient length is received, the controller microcomputer continues on to step 325, wherein the possible portion of an incoming message will be received at a 50% rate (i.e. with a 50% duty cycle). The microcomputer counts the time that the data-bus is in the inactive state for each of a predetermined number, e.g. four, of preamble pulses. As part of step 325, the total time for the preselected number of pulses to be received by the microcomputer is found and the total time is then divided by the total number of pulses, giving an average value for the 50% rate. This rate is used to calculate a threshold for the pulse-width-modulated logic zero and logic one data bits that follow. ROM 14*d* contains a firmware subroutine to calculate these thresholds in the regular interblock gap times between receipt of the 50% duty-cycle pulses of the preamble and the start of the message, and to store the calculated threshold values in predetermined locations in RAM 14c for subsequent detection use. The microcomputer waits for the data bus to return to the active state and counts the time that the line remains in the active state. When the microcomputer detects that the data line has gone to the inactive state, the count is terminated and the value of the count is compared to the various thresholds determined in step 325. The count is used to determine whether the received bit of information is a logic one or a logic zero, in step 326, and the received logic bit is then stored in a predetermined buffer location in RAM 14c. If the duration of the count is not within the threshold values previously determined, the message is ignored and no action is taken to change the programming of the module; the subroutine exits via step 322 and returns to LOOP node 230.

After the entire message, e.g. 40 bits of data, is decoded and stored in the microcomputer RAM in step 326, the microcomputer proceeds to interpret the message by initially checking the received flag bits $F_0$-$F_2$ and $\overline{F_0}$-$\overline{F_2}$, in step 327. If the received flag bits are equal to a flag-bit sequence predeterminately selected to identify a transmission as one for a control module, the decoding is allowed to continue. If, however, the decoded flag bits do not identifying a transmission for a control module, the program returns via step 322 to LOOP node 230. If it has been determined that the received flag bits are proper for a control module, the first 32-bits (in the flag, address, function and data words) of received message are then checked for parity. A parity word is generated for these 32-bits and compared to the last eight bits $P_0$–$P_7$ (the parity word) received. If the parity check is not satisfactory, the program exists through step 322 to LOOP node 230. If received parity bits are correct, step 328 is entered and the control module address bits $A_0$–$A_{11}$ specified in the received data are checked against the local address previously set, by means of address elements $A_0$–$A_{11}$, for the particular control module 10. Thus, the received message address portion is checked against the stored address portion established during RDADR. If the unique address of that control module is not received, the transmission is ignored; the program exits via step 322 to LOOP node 230. If the particular control module address is received, the RDBLS subroutine continues on to the decode command CMDDEC step 329. In step 329, the four command number bits $D_4$–$D_7$ of the "data" word are checked to determine which of 16 command numbers is being called for. The lower four-bits $D_0$–$D_3$ of the "data" word provide data necessary for performance of several of the commands.

The command numbers are decoded (FIG. 3*i*) by means of a table structure. The command number data bits are arranged in the order $D_7$, $D_6$, $D_5$, $D_4$, and provide a four bit nibble utilized as an index to a predetermined table stored in ROM 14*c*. Thus, in step 330, the firmware program points to the start of the command table and then, having obtained the command data word in step 331, utilizes the command number found in step 332 to go to the commanded location in the command table in step 333. At the commanded table location is located the address for the start of the particular subroutine program previous set in the firmware for that one of the command numbers received in step 334. The command subroutine address is called in step 335; in the presently preferred embodiment, only 8 of the 16 commands are presently assigned, as shown in the following table, listing command number, associated binary command number representation ($D_7$, $D_6$, $D_5$ and $D_4$), command subroutine label and command function:

COMMAND TABLE

| Command Number | Binary Representation | Subroutine Label | Command Function |
|---|---|---|---|
| 1. | 0001 | FSTSET | Set Light Level Fast |
| 2. | 0010 | SLOSET | Set Light Level Slow |
| 5. | 0101 | SETLSW | Set Local Switch |
| 6. | 0110 | SETMXL | Set Maximum Level |
| 8. | 1000 | RDPHCL | Read Photocell* |
| 9. | 1001 | RDMXLV | Read Maximum Level* |
| 10. | 1010 | RDBALZ | Read Current Level* |
| 11. | 1011 | RDLSWL | Read Switch Contact Status* |

*return transmission to be sent by control

Figure 3I:
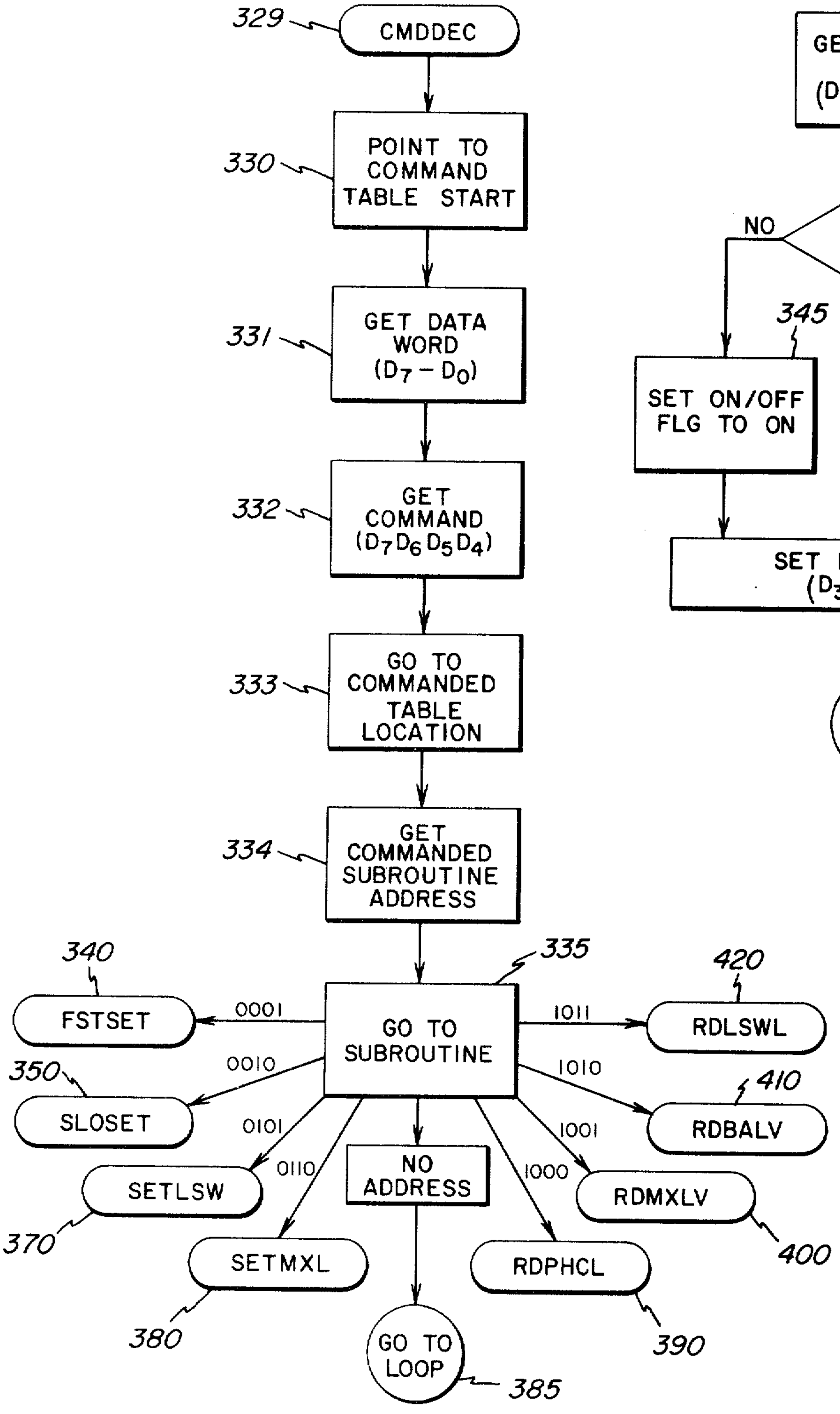
Figure 3J:
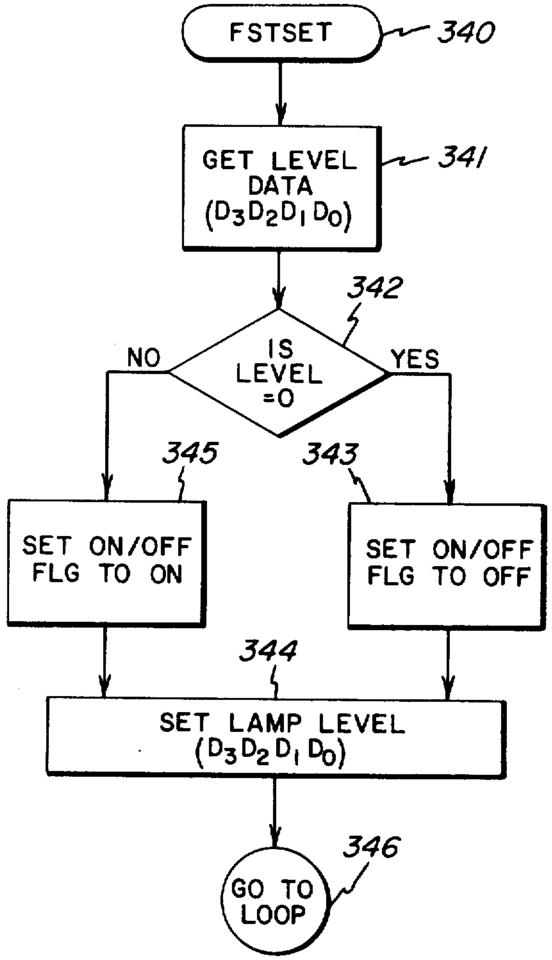

If the 0001 data bits are utilized for the command number, step 335 (FIG. 3*i*) calls the FSTSET subroutine of FIG. 3*j*, in step 340. The command data $D_3$, $D_2$, $D_1$ and $D_0$ for the level associated with the "set light level fast" command is obtained from memory in step 341 and is compared, in decision step 342, to the zero, or load off, level. If the commanded level is the zero level, the ON/OFF flag is set to OFF in step 343 and the commanded level now given by the four-bit data sequence $D_3$, $D_2$, $D_1$ and $D_0=0000$, is set in lamp level-setting step 344. If the commanded level is not a zero level, step 342 is followed by step 345, where the ON/OFF flag is set to the ON condition. Step 344 is then entered and the lamp level is set to the non-zero level specified by bits $D_0$–$D_3$ of the data transmission. After the lamp level is set and the new level data stored, the subroutine exits through step 346 to the LOOP node 230 of the main program.

Figure 3K:
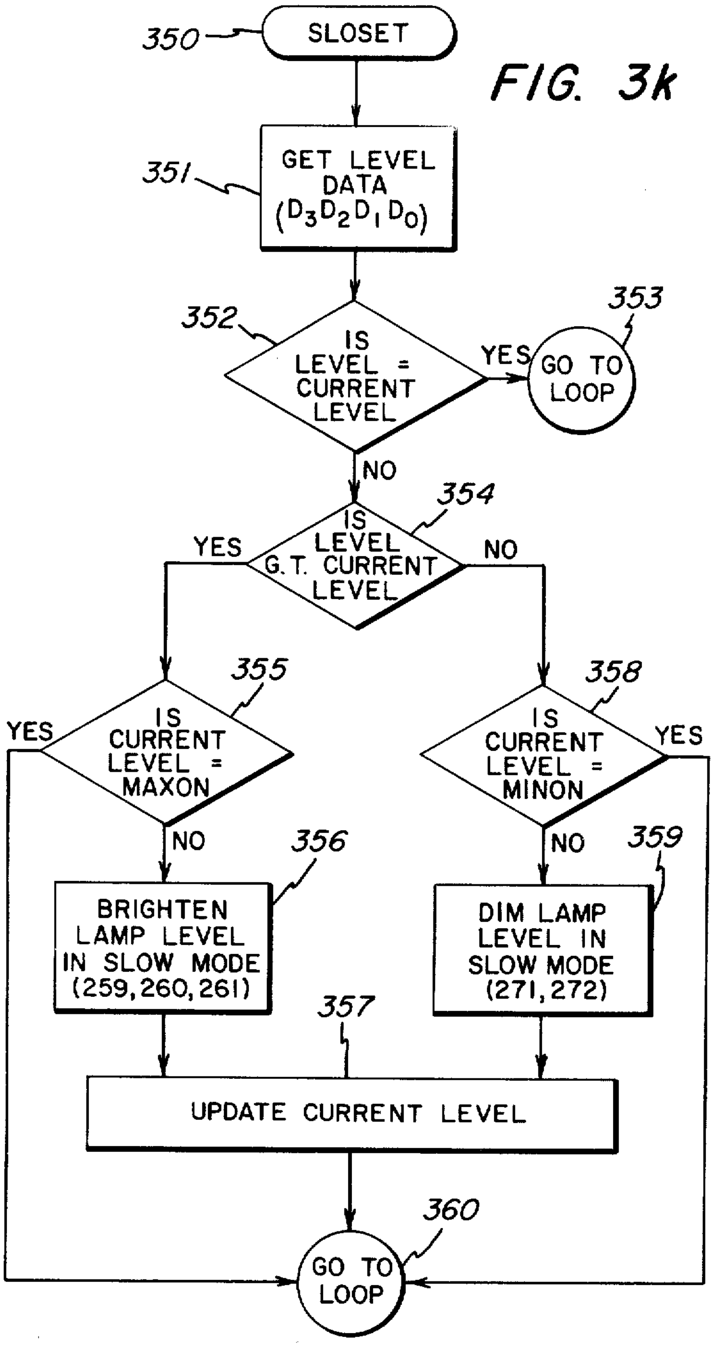

If the command number is 0010, step 335 calls the SLOSET subroutine (step 350 of FIG. 3*k*). This "set light level slow" command causes the control module to set the associated load lamp level to the value established by the command data nibble in the four bit sequence $D_3$, $D_2$, $D_1$ and $D_0$. Accordingly, the level data is obtained from the stored received transmission in step 351. The level data, in decision step 352, is compared to the current lamp level; if the current lamp level is the newly commanded level, no further action is required and the program exits to step 353 and returns to LOOP node 230. If the current level is not equal to the new command level data received, step 352 exits to a decision step 354, wherein a decision is made as to whether the new level data is greater than the current level. If the new level is greater than the current level, decision step 355 is entered and the current level is compared to the maximum load limit MAXON. If the current level is already at the maximum limit, no further increase in level can be programmed and the program exits through step 353 to LOOP node 230. If the current level is not equal to the maximum-set level (MAXON), the program continues to step 356, wherein the lamp level is increased (brightened) in the "slow" mode, utilizing program steps 259, 260 and 261, previously discussed hereinabove. After the lamp has been brightened, the new level data is stored in RAM 14*c* as the updated current level (step 357). If, however, in step 354, the newly commanded level was found to not be greater than the current level, decision step 358 is entered and the current level is compared to the minimum-set level MINON, which may be the zero level if a particular value of MINON has not been programmed. If the current level is the minimum-set level, no further decrease in load level can be programmed and the program exits via step 353 to LOOP node 230. If the current level is not yet equal to the minimum-set level MINON, the program continues onto step 359, wherein the output lamp level is decreased (dimmed) in the slow mode, utilizing steps 271 and 272, previously discussed hereinabove. After dimming of the lamp level in step 359, the current level is updated, again in step 357, utilizing the new data, and the program returns at step 360, to the LOOP node 230.

Figure 3M:
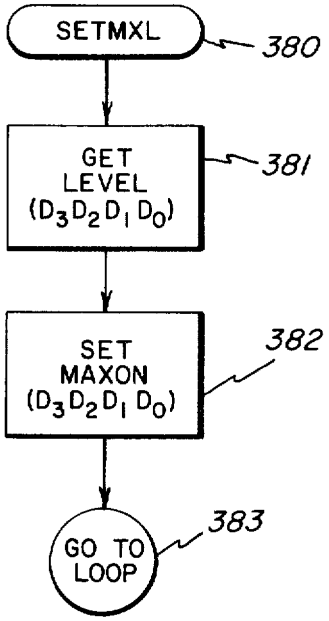
Figure 3L:
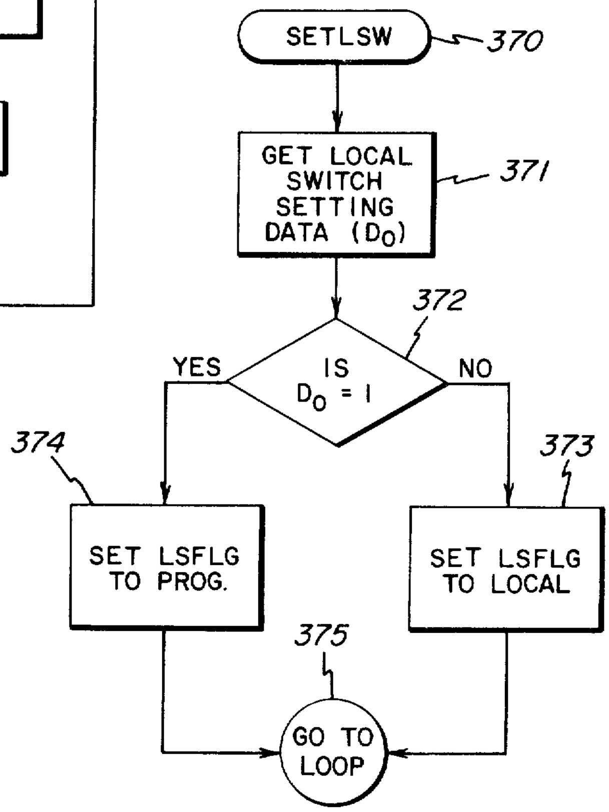
Figure 3N:
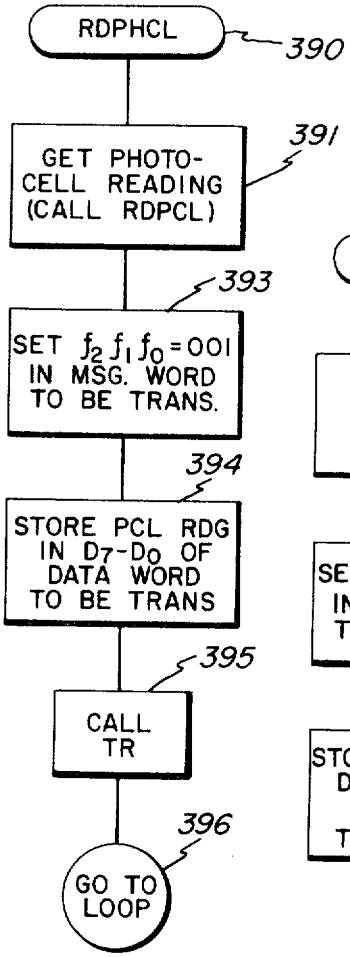

If the specified command number is 0100, in call-subroutine step 355, the SETLSW subroutine of step 370 is selected. This subroutine, shown in FIG. 3*l*, sets the LSFLG flag, which when enabled, allows switches 45 of local control means 11 to control load level. As only two local switch setting conditions obtain (switches enabled or switches disabled), only the first command data bit $D_0$ is utilized. Thus, in step 371, the local-switch-setting bit Do data is obtained from memory and is compared to a binary one value in decision step 372. If data bit $D_0$ has a binary zero value, the local switch flag LSFLG is set to the LOCAL mode in step 373. If data bit $D_0$ was found equal to 1, in step 372, the following step 373 sets the LSFLG flag to the PROG condition. After either of steps 373 or 374, the program goes to step 375, returning to the LOOP node 230 of the main program, whereby the local-switch-monitoring RDSWCH subroutine 240 is then entered.

If the command number is 0110, step 335 calls the SETMXL subroutine 380 (FIG. 3*m*) to carry out the "set maximum level" subroutine. The new maximum level MAXON data bits $D_0$–$D_3$ are retrieved from the received message buffer portion of memory in step 381 and are transferred to that memory location in which the present maximum level MAXON data is stored, in step 382. The program then returns to LOOP node in step 383. The new MAXON data is examined whenever a level increase is to be made, such as in step 258 of the LMPUP subroutine of FIG. 3e. Accordingly, this subroutine allows dynamic control of the ambient brightness level, by the remote central controller.

It should be noted at this point that if the subroutine command address called in step 335 does not correspond to the address of a command presently in use, the CMDDEC program of FIG. 3i exits through step 385 to the LOOP node 230.

If the command number has a $D_7$ bit set to the logic one level, a reply transmission is required to be sent to the remote central controller. For example, if command number 8 (the "read photocell" command) is called for by the associated 1000 bit pattern, the subroutine called step 335 proceeds to the RDPHCL subroutine of step 390. The control module is required to determine the ambient lighting level, by obtaining the voltage across a photocell sensor 12b, and to translate this photocell voltage to a digital value prior to transmitting the digital value to the central controller. Thus, the first step in the subroutine is to obtain a photocell reading, in step 391, by calling up a photocell-reading sequence labeled RDPCL. This sequence commences with the establishment of a logic one ENABLE signal at the controller microcomputer P15 output (FIG. 2) to turn on switching transistor 60 and discharge integration capacitor 65. Positive discharge typically requires somewhat more than a millisecond, and causes the state of the associated comparators 16a and 16b to change that such output transistors 88a and 88b in the cut-off condition. The associated controller microcomputer data inputs P20 and P21 are, as transistors 41 and 42 and gates 51 and 52 are in the logic one output conditions, presented with logic one input levels. Thereafter, the ENABLE output P15 is placed in the control to the logic zero level, turning off transistor 60 and allowing capacitor 65 to charge toward positive supply voltage +V. Incrementation of the count in a counter-timer register of controller microcomputer 14 commences immediately after transistor 60 is cut-off, whereby a count of the time taken for a comparator output to change state is obtained. This comparator output change occurs when the voltage across integrating capacitor 65 reaches the same magnitude as the voltage across that sensor 12 associated with the particular one of the analog-to-digital converter sections. In particular, for reading the voltage across photocell 12b, transistor 88a is switched from cut-off to saturation when the voltage across resistance 84a is proportional, by the value of a constant, to the voltage across the integrating capacitor. Switching of transistor 88a from cut-off to saturation places a logic zero level at the associated P20 data input of microcomputer 14, stopping the counter-timer therein. The firmware program now sets the three function bits $f_2$, $f_1$, $f_0$=001 (indicative of a photocell-read operation) for storage in the five-byte buffer holding the message word to be transmitted (step 393). An eight-bit data word is obtained from the counter-timer register and is stored in that portion of the five-bye buffer set aside for data bits $D_0$–$D_7$ of the message to be transmitted (step 394). The message transmission TR subroutine (of FIG. 3g) is called in step 395, and after adding the 12 address bits for the particular control module and generation of a parity word, the photocell data message is transmitted to the remote central controller. Upon completion of message transmission, the RDPHCL subroutine exits through step 396 to the LOOP node 230.

Figure 3O:
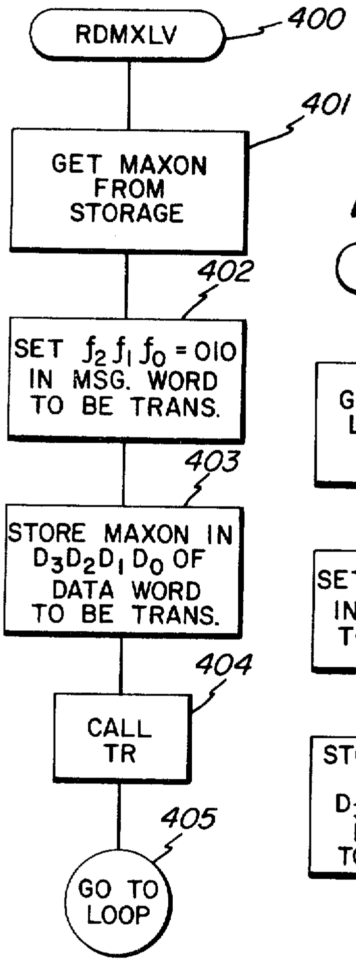

If command 9, the "read maximum level" command, is received, the 1001 command number data pattern thereof causes the RDMXLV subroutine of step 400 to be called. This subroutine (FIG. 3o) transmits to the central controller the value of the maximum allowable level MAXON stored in the microcomputer RAM section 14b, in response to a request therefore from the central controller. The first step is to obtain the previously-defined MAXON value from RAM storage, in step 401. After setting function bits $f_2$, $f_1$ and $f_0$=010, to indicate that a read maximum data word will be transmitted (step 402), the stored MAXON data is placed in data bits $D_0$–$D_3$ of the data word to be transmitted (step 403). The particular control module address is added and the TR subroutine is called in step 404. After completion of the TR subroutine, the RDMXLV subroutine exits through step 404 to LOOP node 230. It is to be noted at this point that command 9 merely reads the present maximum level stored in the control microcomputer RAM buffer assigned to MAXON, and that command number 6, the "set maximum level" command is utilized to effect a change in the MAXON data stored in RAM.

Figure 3P:
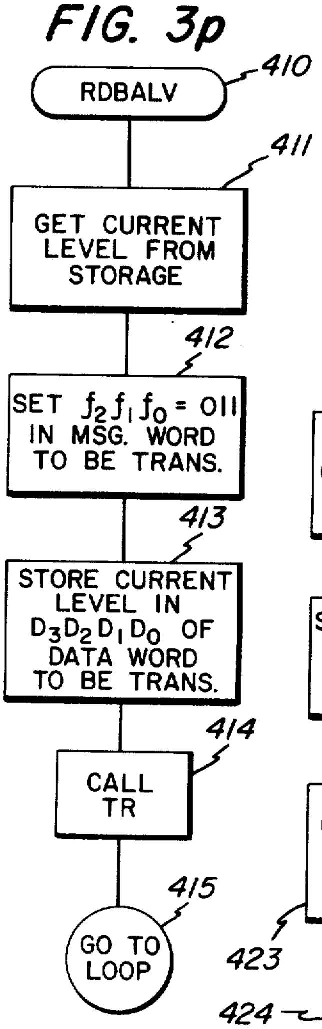
Figure 3Q:
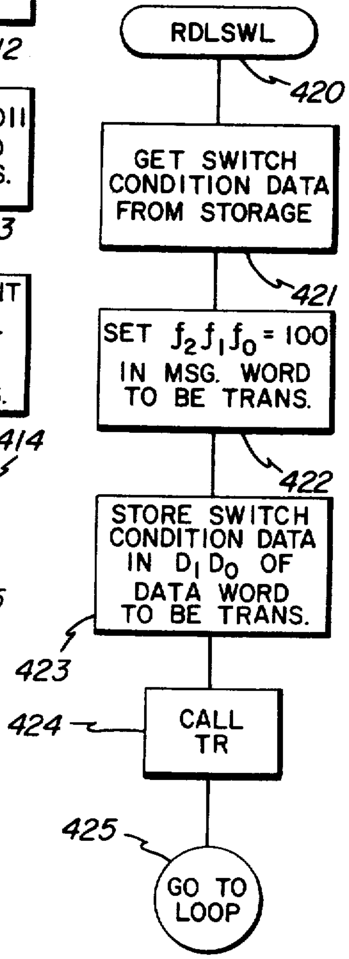

If a "read current level" command 10 is transmitted, step 355 calls the RDBALV subroutine step 410 in response to the 1010 command number binary value. As seen in FIG. 3p, the RDBALV subroutine obtains the current level data from its RAM 14b storage buffer (step 411), sets function bits $f_2$, $f_1$, $f_0$=011 in the message word to be transmitted (step 412) and then stores the four-bits of current level data in data bits $D_0$–$D_3$ of the data word to be transmitted (step 413), before calling the TR subroutine in step 414. After the message is transmitted, subroutine exits through step 415, returning to LOOP node 230.

If command 11, the "read switch-contact-status" command is received at step 355, the RDLSWL subroutine of step 420 is called in response to the 1011 command number binary data pattern thereof. The RDLSWL subroutine (FIG. 3q) obtains the switch contact voltage levels by retrieving switch condition information from the RAM storage buffer assigned thereto (step 421), then sets the message word function bits $f_2$, $f_1$, $f_0$=100 (indicative of a switch contact reading operation), in step 422, and stores two bits of switch 45a and 45b information in data bits $D_0$ and $D_1$ of the five-bye data buffer for the message to be transmitted, in step 423. The TR subroutine is called in step 424 and, after the message has been transmitted, the RDLSWL subroutine exits through step 425 to LOOP and node 230.

Figure 4:
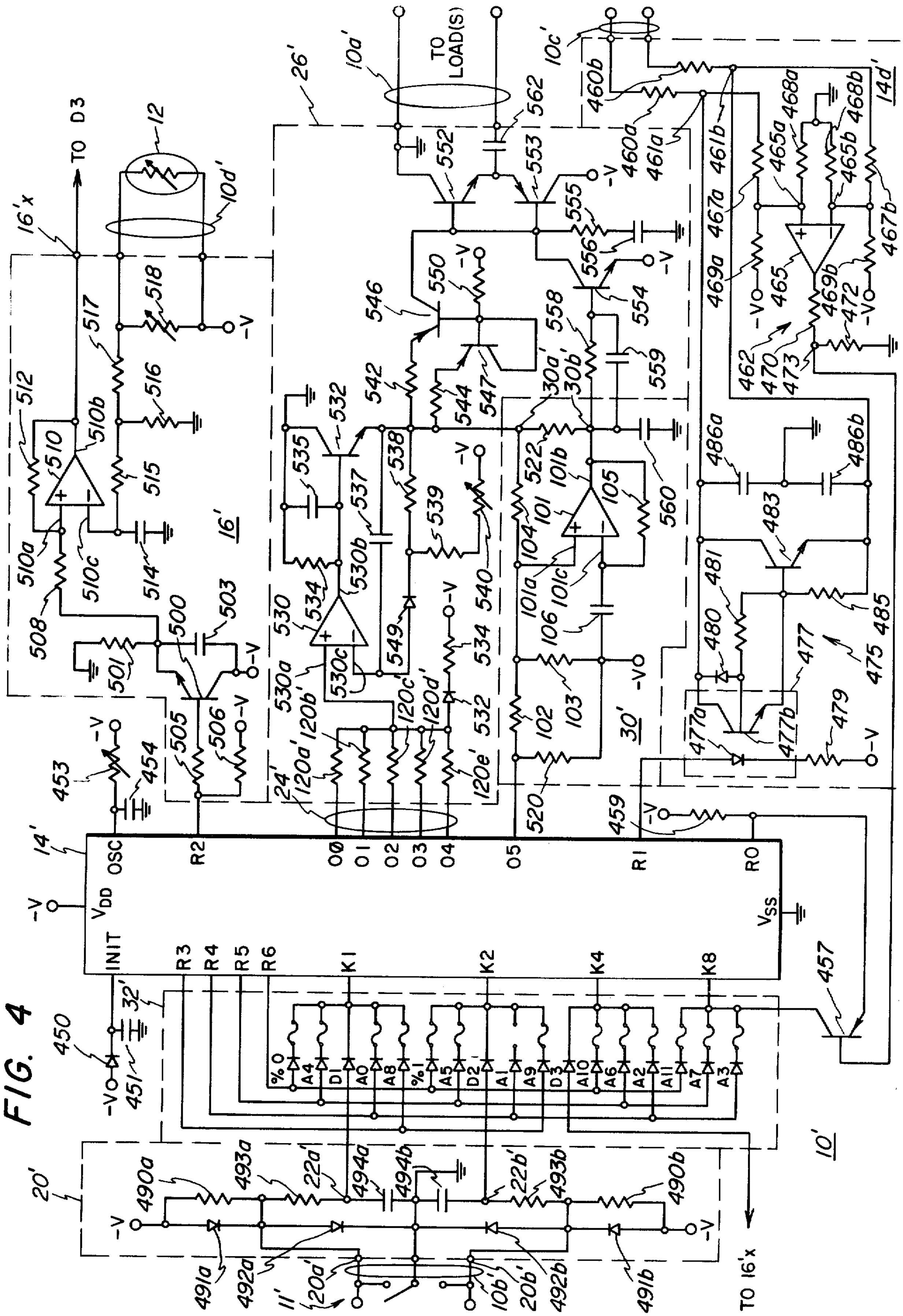
FIG. 4 is a schematic diagram of another presently preferred embodiment of the control module shown in block diagram form in FIG. 1.

Referring now to FIGS. 1 and 4, another presently preferred control module embodiment 10' utilizes a Texas Instruments TMS1100 4-bit single-chip microcomputer for controller logic means 14'. Operating potential of magnitude −V is applied between the microcomputer power supply input $V_{DD}$ and ground $V_{SS}$. The negative operating potential is also applied to the anode of an initialization diode 450 having its cathode connected to an initialization INIT input of microcomputer 14'. The INIT input is also connected to one terminal of a capacitor 451, having its remaining terminal connected to ground potential. Upon application of operating potential, the controller microcomputer is reset by the action of diode 450 and capacitor 451. An internal clock signal is provided within controller microcomputer 14', at a frequency selectable by the value of a potentiometer 453, coupled between operating potential −V and an oscillator OSC input, in conjunction with a timing capacitor 454, connected from the OSC input to ground potential.

The particular controller microcomputer 14' includes a RAM of 128 4-bit words and a ROM of 2K bytes of memory, in addition to a I/O section having a single 4-bit input port (consisting of inputs K1, K2, K4 and K8) and a pair of output ports including a parallel 8-bit output O port of which lines 0Ø–05 are presently used, and an individually-latched 11-bit R port (including lines R0–R6).

Address selection means 32' is comprised of a plurality of address selection elements A, each including a series diode fusible link combination. Each of individually-settable/resettable outputs R3–R6 is connected to the anode of a selected diode of one of the plurality of series diode-link combinations. The remaining link-end terminal of each combination is connected to one of inputs K1–K8. A pair of outputs 22a' and 22b' (of local control interface means 20') are connected to associated diodes D1 and D2, respectively, to respective first and second microcomputer data inputs K1 and K2. In addition, the collector electrode of a switching transistor 457 is connected to the K8 input, with the emitter electrode of transistor 457 being connected to the first R output line R0. A pull-down resistor 459 is coupled between input R0 and operating potential −V. One of a pair of diode-link series combinations %0 and %1 are connected between a selected R output (e.g. the R6 output) and an associated one of the K1 and K2 inputs, for a purpose hereinbelow explained.

The central controller bus 10c' is connected to control module I/O means portion 14d'. Bus 10c' is herein illustrated as a 2-wire pair respectively connected through isolation resistors 460a and 460b to respective input/output terminals 461a and 461b. Incoming data is buffered by circuitry 462, utilizing a differential-input amplifier 465. The non-inverting input 465a of the differential amplifier is connected through a resistance element 467a to a first one of the I/O bus terminals 461a, while the inverting input 465b is connected to remaining I/O bus terminal 461b through another resistance 467b. One of Resistance elements 468a and 468b is connected between ground potential and each respective one of non-inverting and inverting inputs 465a and 465b. A pair of resistance elements 469a and 469b are connected between operating potential −V and a respective one of inputs 465a and 465b. The output of amplifier 465 is coupled to a pair of resistance elements 470 and 472 in series to ground potential. The output 473 of the received-data buffer 462 is taken from the junction between resistance elements 470 and 472 and is connected to the base electrode of transistor 457.

For transmitting data from microcomputer controller 14' to the central controller on bus 10c', a transmitted-data buffer circuit 475 is utilized. The data to be transmitted is serially read out of individually-selectable output line R1, to the light-emitting diode portion 477a of an optoelectronics isolator 477. Diode 477a is series connected with a current-limiting resistance 479 between output line R1 and operating potential −V. A phototransistor 477b, forming a remaining portion of isolator 477, is responsive to the flux emitted from diode 477a. The collector electrode of phototransistor 477b is connected to I/O bus terminal 461a and to the cathode of a diode 480 having its anode connected to the phototransistor base electrode. The phototransistor base and emitter electrodes are connected through a resistance 481. The phototransistor emitter electrode is connected directly to the base electrode of another transistor 483, having its collector electrode connected to bus terminal 461a and its emitter electrode connected to bus terminal 461b. A resistance 485 is connected between the base and the emitter electrodes of transistor 483. A pair of noise-filtering capacitance elements 486a and 486b are connected between ground potential and a respective one of input/output bus terminals 461a and 461b. Data-receiving circuit 462 and data-transmitting circuit 475 are utilized with the aforementioned bus-current-sensing central controller transceiver, such as described in the aforementioned application Ser. No. 089,478.

Local control interface means 20' has a pair of inputs 20a' and 20b', which are respectively connected by bus 10'b to opposite selectable terminals of each of at least one single-pole, double-throw switch means 11', each having a common terminal connected to a ground potential line of the bus. Each of inputs 20a' and 20b' is respectively connected to operating potential −V through a first resistance element 490a or 490b, each respectively shunted by a normally-reverse-biased diode 491a and 491b, respectively, to prevent the bus input voltages from exceeding the operating potential magnitude. Other normally-reversed-biased diodes 492a and 492b are respectively connected between respective inputs 20a' and 20b' and ground potential to prevent the bus input voltage from attaining a positive polarity. Each of a pair of resistance elements 493a and 493b is respectively connected between a respective one of inputs 20a' and 20b' and an associated local control interface means output 22a' and 22b', respectively. Noise-filtering capacitances 494a and 494b are respectively connected to ground potential from a respective one of local control interface means outputs 22a' and 22b'.

The analog-to-digital conversion means 16' of this embodiment utilizes the R2 individually-enabled output line as the ENABLE line thereto. The collector electrode of a switching NPN transistor 500 is connected to the negative operating potential and the emitter electrode of transistor 500 connected through a resistance element 501 to ground potential. An integration capacitance element 503 is connected between the emitter and collector electrodes of transistor 500. The base electrode of transistor 500 is connected through a resistance element 505 to the R2 output of microcomputer 14'. The R2 output is connected through another resistance element 506 to the negative operating potential bus. The integration capacitance-switching transistor emitter junction is connected through a resistance element 508 to a non-inverting input 510a of a differential-input operational amplifier 510. The non-inverting input 510a is connected to the operational amplifier output 510b via a feedback resistance 512. Amplifier output 510b is connected to the ADC means output 16'x and thence to the anode of a multiplexing diode $D_3$ having its cathode electrode connected to the third bit input K4. The operational amplifier inverting input 510c is connected to ground potential via a capacitance element 514, paralleled by the series combination of a pair of resistance elements 515 and 516. The junction between the resistance elements 515 and 516 is connected to one terminal of another resistance element 517, having its remaining terminal connected to one line of the sensor bus 10d' (and thence to one terminal of sensor 12) and to one terminal of a variable resistance 518. The remaining terminal of resistance 518 is connected to the operating potential −V bus and to the remaining sensor bus 10*d'* line (and thence to the remaining terminal of external sensor 12).

The DAC means 26' utilizes oscillator means 30' and variable gain amplifier means 28'. Oscillator 30' is substantially identical to oscillator 30 of FIG. 2, with the exception that, due to the change from a positive operating potential to a negative polarity operating potential, resistance 103 and capacitance 106 are returned to negative potential, rather than ground potential, as in FIG. 2. An additional resistance element 520 is connected as a pull-up resistance between negative operating potential −V and a designated one of the O-port lines, e.g. $O_5$. Additionally, that terminal of resistance element 102 furthest from operational amplifier 101 is also connected to the $O_5$ output, whereby oscillator means 30', which normally outputs a squarewave of variable amplitude at a frequency less than 10 $KH_z$ for lighting control, may be used to provide a pulsed waveform of approximately 15% duty cycle (at essentially the same frequency) for providing on "off" signal, when the 0Ø–05 outputs are set. This is the only use, in this embodiment, of the 05 output line.

Variable gain amplifier 28, as more fully described in co-pending applications Ser. Nos. 267,274 and 267,330, both filed May 26, 1981, and Ser. No. 479,048, filed Mar. 25, 1983, is a 5-bit multiplying digital-to-analog converter having the multiplication factor (gain) thereof established by the binary data pattern at the five O output lines 0Ø–04 of controller microcomputer 14'. These five output lines form bus 24' and are respectively connected to one terminal of each of the five resistance elements 120*a'*–120*e'*. The remaining terminal of resistance elements 120*a'*–120*e'* are connected together. An operational amplifier 530 is used, and may, advantageously, be one-fourth of a quad comparator-amplifier integrated circuit (such as the National Semiconductor Corp. Type LM 339) with the three remaining units therein being used for amplifiers 101, 465 and 510. The common terminals of resistance elements 120*a'*–120*e'* are connected to both the non-inverting input of the operational amplifier 530 and through a diode 532 and series resistance 534 to negative operating potential −V. The operational amplifier output 530*b* is connected to the base electrode of a transistor 532 and is also connected through a parallel network of resistance 534 and capacitance 535 to ground potential, along with the collector electrode of NPN transistor 532. The emitter electrode of 532 is connected to: first oscillator output 30*a'* (at the junction between resistance elements 104 and 522); a feedback capacitance element 537 having another terminal coupled to the inverted operational amplifier input 530*c*; a first and second series fixed resistance element 538 and 539 and a variable resistance element 540 to negative operating potential; and through resistance elements 542 and 544 respectively to the respective emitter electrode of each of a pair of PNP transistors 546 and 547. A junction between resistance elements 538 and 539 is connected to the cathode of a diode 549, having its anode connected to inverting operational amplifier 530*c*. The base electrodes of transistors 546 and 547 are connected together, to the collector electrode of transistor 547 and through a resistance element 550 to operating potential −V. The collector electrode of transistor 546 is connected: to the base electrodes of a complementary-symmetry pair of output transistor 552 and 553; to the collector electrode of a NPN transistor 554; and through a series network of resistor 555 and capacitor 556, to ground potential. The emitter electrode of transistor 554 is connected to negative operating potential, as is the collector electrode of transistor 553. The base electrode of transistor 554 is connected through a parallel network of resistance 558 and capacitance 559, to second oscillator output 30*b'*, itself connected to ground potential via a capacitance 560. The collector of output transistor 552 is connected to ground potential and the emitters of both transistors 552 and 553 are connected together and via an output capacitance 562 to the active one of a pair of lines forming load data bus 10*a'*. The remaining load bus line is connected to ground potential. Bus 10*a'* can be coupled, as explained hereinabove, to the isolation circuit of pending application 242,782, or any other desired load interface circuit.

Figure 5A:
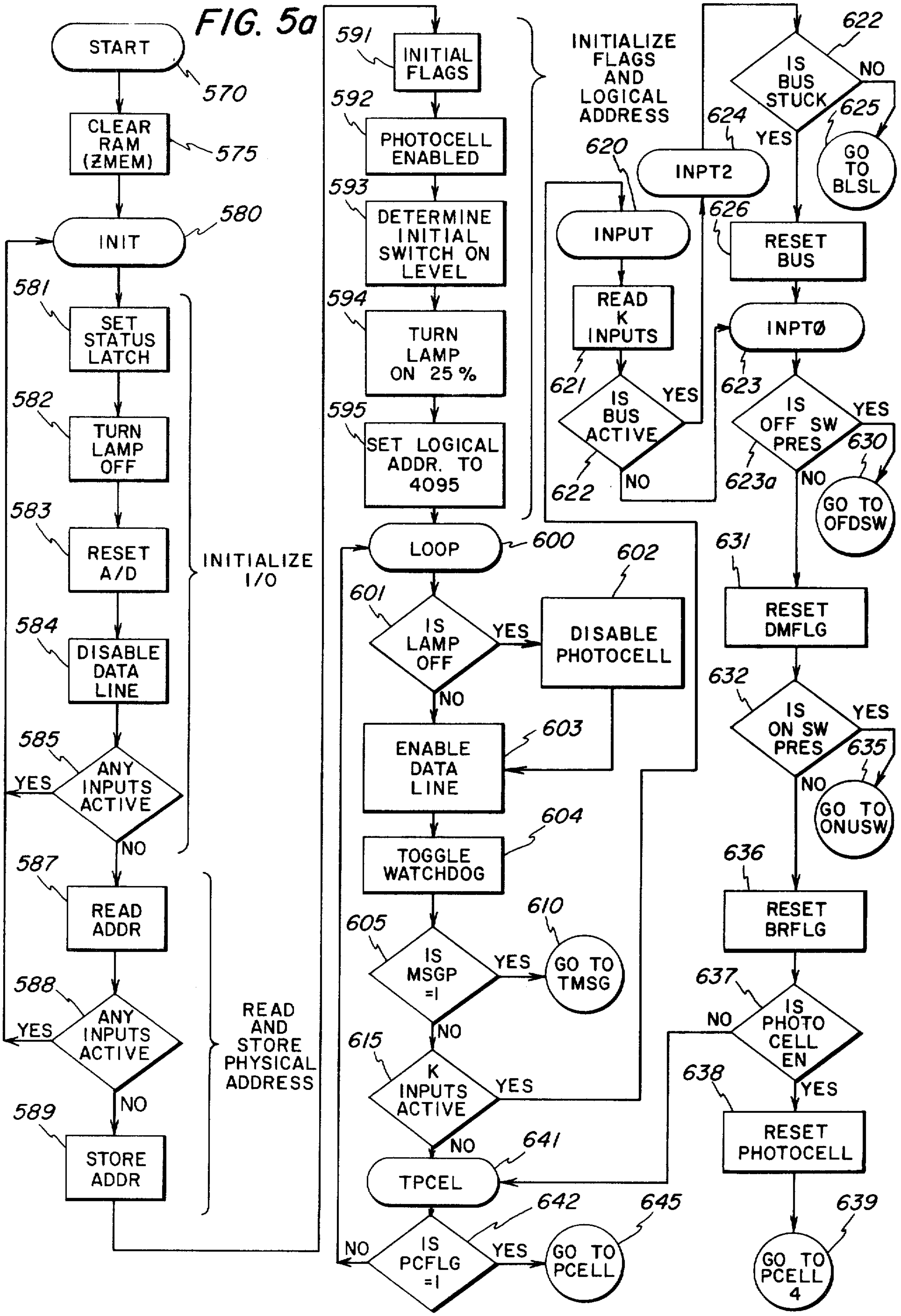
FIG. 5*a*–5*w* are coordinated flow charts useful in understanding the manner in which the control module circuitry of FIG. 4 performs each of a multiplicity of load control functions.

Operation of the control module embodiment 10' will now be explained with reference to the flow charts in FIGS. 5*a*–5*x*, in additional to the schematic diagrams of FIGS. 1 and 4. Upon application of power to control module 10', the start-up network connected to the INIT input directs the microcomputer to a preselected address in ROM. This address is at location O of page F of chapter O of memory (step 570 of FIG. 5*a*). From the START step 570, the microcomputer commences the first operational sequence, at step 575, by clearing the RAM memory through a ZMEM subroutine. Once the random-access memory has been initialized, to clear all data randomly set therein during the powering-up of the control module, the program branches to location 0 of page 0 of chapter 0 and commences the initialization (INIT) routine starting at step 580. In a first sequence, the input/output is initialized by first setting a status latch (step 581) and then turning the controlled load to the "off" state (step 582). The ADC 16' is reset (step 583) such that readings are not made of the sensor 12, e.g. a photocell, during the initialization routine. The incoming data line is "freed" by commanding the controller microcomputer to ignore all data at the received-data input port R0 (step 584). The sequence now enters a comparison step 585, in which, with all of output lines R3–R6 disabled, the state of the local control interface inputs, via diodes D1 and D2, are checked. If either of the K1 or K2 inputs is enabled, indicative of a closure of one of switch means 11', step 585 indicates that at least one input is active and the sequence exits back to INIT step 580. The loop is continued until step 585 indicates that there are no active inputs, and the "initialization of input/output" sequence is complete.

The program now "reads and stores the physical address", assigned to the particular control module, by entering step 587, wherein the address programmed by the 12 diode-link combinations A0–A11 is read. Reading of the physical address is accomplished by initially enabling the R4 output line, whereby those diode-link combinations having complete links, e.g. such as the diode-complete link series arrangement for bit A0, provide a logic 1 at the associated one of the K1–K8 inputs, for the associated one of the first four address bits A0–A3. If a diode-link combination has been preprogrammed as by causing disintegration of the associated link (as shown for bit Al) a logic 0 is present at the associated input line. After reading the first four address bits, output line R4 is disabled and output line R5 is enabled to read the next group of four address bits A4–A7, into the microcomputer 4-bit input port. Thereafter, output line $R_5$ is disabled and output line R3 is enabled to read the two bits A8 and A9 of address data into the K1 and K2 inputs of the microcomputer. The R3 line is then disabled and the R6 line is enabled to read the last two bits A10 and A11 of the address data. These serial-presented groups of parallel address bits are assembled into a 12-bit word. The microcomputer now enters step 588 and again checks for any active inputs. If inputs are active, the address word previously obtained found may contain erroneous bits and therefore the program loops back to INIT step 580. If there are no active inputs, the address word has been properly read and step 589 is entered, wherein the 12-bit word is stored in a preselected RAM location. This physical address is to be recalled from the preselected location for comparison against the address portion of all transmissions subsequently received by the control module, to identify when the particular control module has been addressed by the central controller. The physical address is also utilized in all transmissions from the particular control module to the central controller, to identify that particular control module then transmitting data. On completion of step 589, the reading and storing of the physical address is complete.

The Initialization routine then enters a series of steps which "initialize the microcomputer flags and set a logical address" in memory. The logical address allows a block, map or sector, each containing at least one control module, to be addressed, as a group, by assigning the same logical address to all control modules in a defined block, a defined map, or a defined sector. Further information as to block, map and sector addressing may be found by reference to the aforementioned U.S. Pat. No. 4,213,182 and application Ser. No. 089,478. Illustratively, as a 12-bit physical address (one of 4096 different combinations) may be assigned, an individual control module maybe assigned one of 256 possible logical addresses (corresponding to one distinct combination of lower eight address bits with the upper four bits set to a logic one). Illustratively, the logical address may be established at a default state of 4095 (decimal) corresponding to the hexadecimal address "FFFF", wherein all of the address bits are a binary one, or may be any assigned lower eight-bit address, with the upper 4 bits being logical one's. In addition, a universal address may also be assigned, whereby, upon receipt of the particular 12-bit unniversal address, all control modules respond. In the present embodiment, this universal address is preprogrammed to the $FFFF_H$ default condition. Thus, a particular control module may respond to: its unique physical address; one or more logical addresses utilized for block, map or sector addressing; or a universal address for controlling all control modules connected to a central facility.

The flag and logical address initialization sequence thus starts with step 591, in which the various microcomputer flags are set to preestablished initial conditions. In step 592, output line R2 is enabled to enable ADC 16' to read sensor 12. Illustratively, control module 10' is utilized in a fluorescent lighting system wherein sensor 12 is a photocell, utilized to provide data as to the illumination-output condition of the ballast-lamp load connected to load bus 10a'. Thereafter, the initial switch-on level is determined in step 593. The maximum level MAXON is set to 100 percent and stored in the RAM; the controller microcomputer enables output line R6, and reads the condition of the diode-link combinations designated %0 and %1 at the respective K1 and K2 inputs. Thus, by assigning specific switchon levels to each of the diode-link combinations, a quick-on feature may be provided when the local control switch means 11' is utilized, as hereinbelow set forth in more detail. Briefly, if the links associated with the percent %0 and a %1 multiplexer input branches are both intact, a first level, e.g. 50 percent of maximum load, may be immediately implemented upon recognition of closure of the "on" side of the switch means (e.g. to input 22a'). If the link in the %0 branch is open, a binary 0 level at the K1 input and a binary 1 level at the K2 input (provided by the completed link in the percent 1 branch) may set the initial switch-on level at another value, e.g. 70 percent. Similarly, if the link associated with the %1 link is open, while the link associated with the %0 branch is complete, a third switch-on initial level, e.g. 65 percent, may be established. Finally, if both links are open, a fourth initial switch-on level, e.g. 60 percent, may be preselected. Thus, by reading the states of K1 and K2 inputs with the R6 output enabled, the initial switch-on level can be determined in step 593. In step 594, the load (lamp) is turned on to some initial controlled value, e.g. 25 percent of maximum output. The logical address is set to a preselected value, e.g. decimal 4095, in step of 595, and the initialization sequence is completed. The program now enters loop node 600.

Figure 5B:
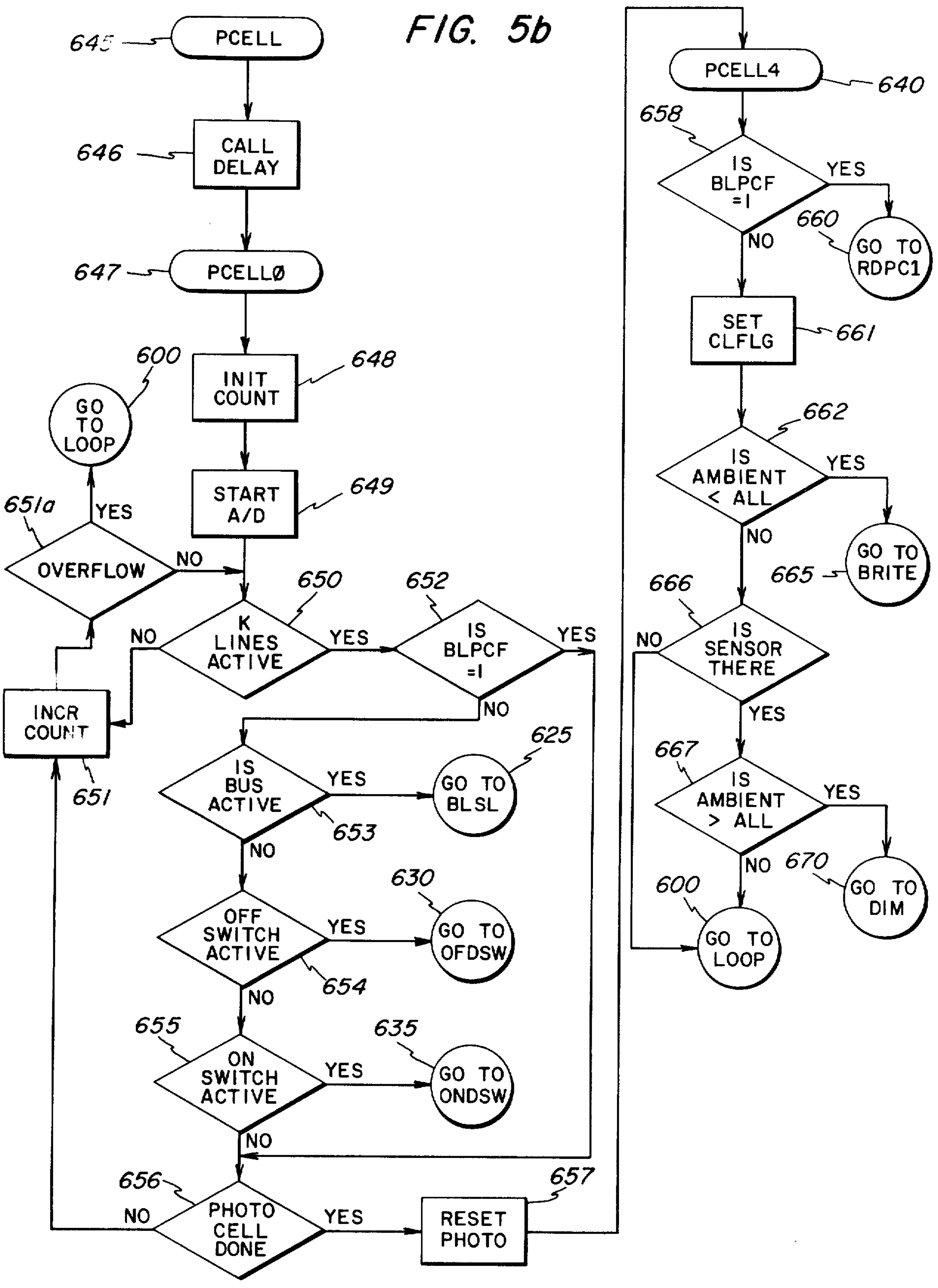
Figure 5C:
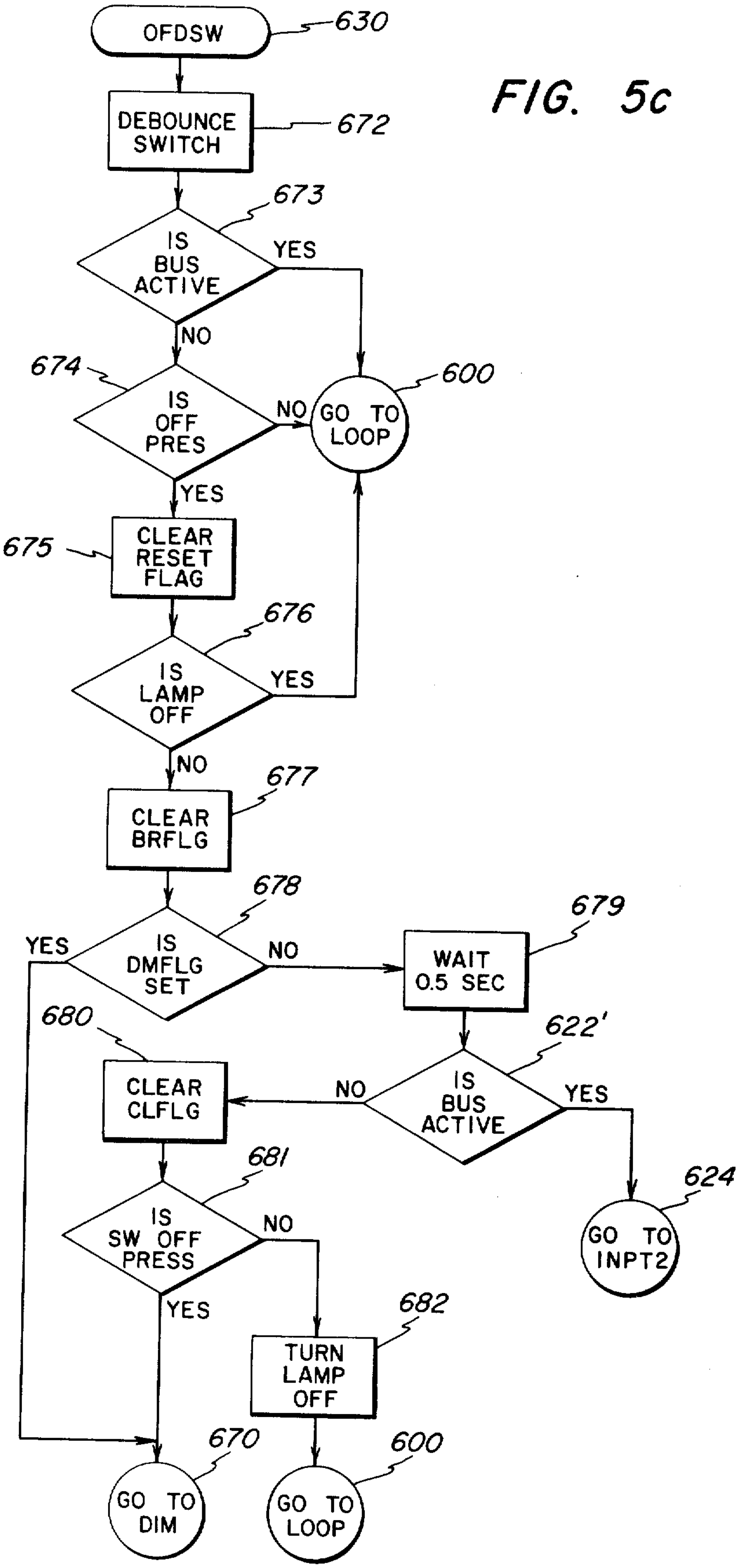
Figure 5D:
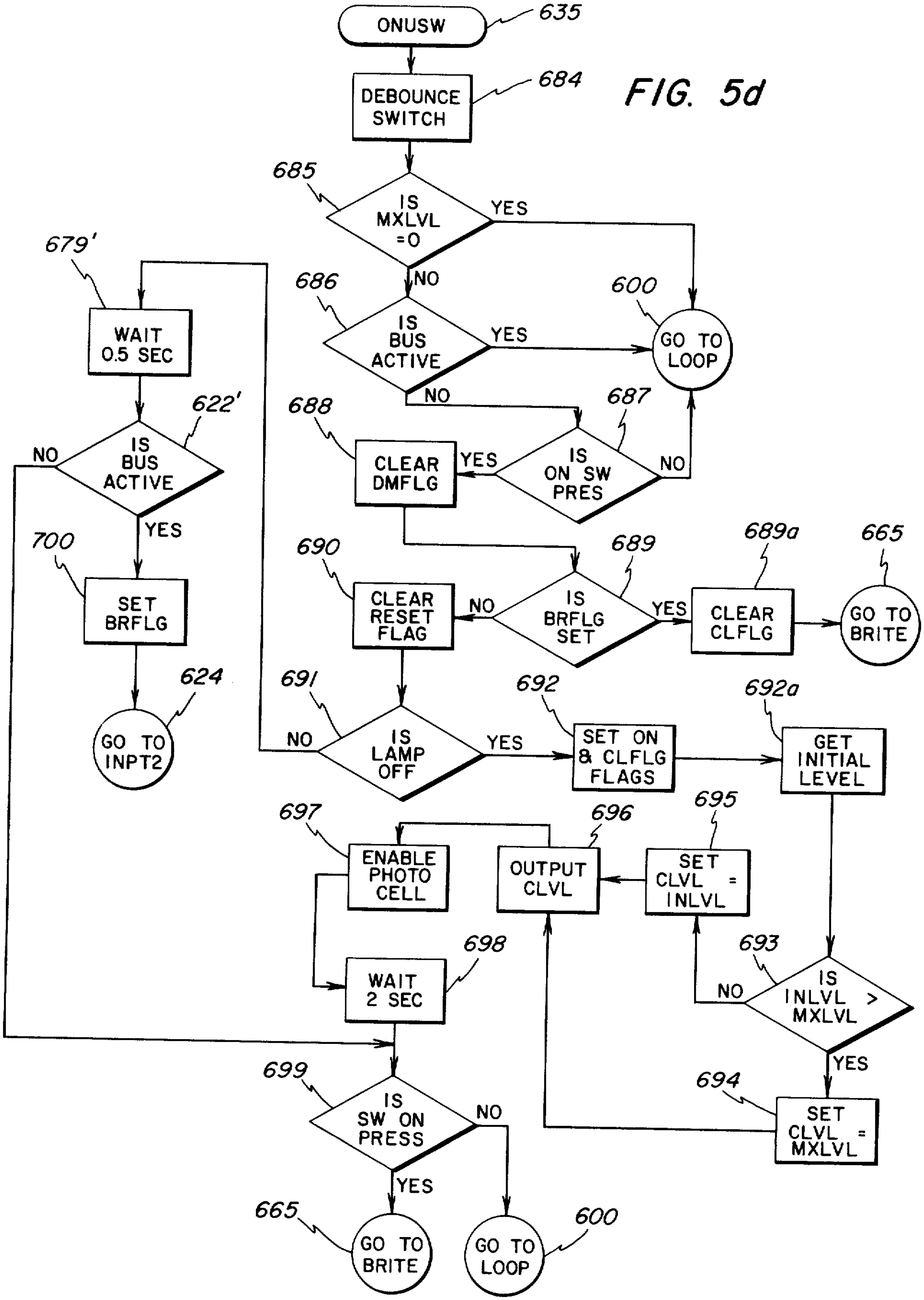

A main, or executive, loop sequence commences at loop node 600. In decision step 601, it is determined whether the load (lamp) is in the "on" state or the "off" state. If the lamp is in the "off" state, the routine proceeds to step 602, wherein photocell sensor 12 is disabled, by disabling controller microcomputer output line R2. After completion of the step 602, if the load lamp was off, or step 601, if the load lamp was on, the data input line is enabled in step 603, by enabling controller microcomputer output line R0. This enables the control module to receive data from the central controller and also releases the data bus 10c' if data transmitter 475 had previously captured the bus. At the completion of step 603, step 604 is entered and a watch-dog timer, implemented in controller microcomputer 14', is toggled to allow external circuitry (not shown) to determine whether the control module is exercising the main loop properly. Next, the "message pending" flag (MSGP) is tested (step 605). If the MSGP flag is set (binary 1), the control module goes to the message transmission routine (TMSG) in step 610 (to be described hereinbelow). If the MSGP flag is not set (a binary 0), the control module proceeds to step 615, wherein the controller microcomputer input K lines are tested for activity. If any of the K inputs are active, the program progresses to the read-input (INPT) mode 620. Thereafter, the program enters step 621, wherein the bits of data at the four K inputs are read by controller microcomputer 14' and stored in a predesignated area of RAM. The inputs are then tested, commencing at step 622, wherein the central controller data bus 10c' activity is tested. If the voltage across bus 10c' is low, indicative of a possible transmission from the central controller, the controller microcomputer checks a "time-out" flag. If the time-out flag is set (a "no" decision in step 622), the controller microcomputer assumes that the central controller data bus is either stuck or disconnected from the control module and continues through an INPT0 node 623, on to step 623a. If the time-out flag is not set (a "yes" decision in step 622), an INPT2 node 624 is traversed and a decision step 624a entered and the central controller data bus is checked for being in a stucklow condition. If the bus is not stuck low, a transmission from the central controller is occurring and step 625 is proceeded to, calling the transmission-read subroutine BLSL (of FIG. 5*h*), discussed hereinbelow. If the central controller data bus was found, in step 624*a*, to be stuck low, step 626 tells the controller microcomputer to reset the stuck bus and proceed to node 623. An input testing routine starts with decision step 623*a*, wherein the "off" condition of all local control switch means 11' is tested, by ascertaining the binary state of the local control interface means output 22*a'*. If this output is a logic one, indicative of a local switch being engaged in the "off" condition, the program calls the off/down switching subroutine OFDSW (of FIG. 5*c*, discussed hereinbelow). If the off switches do not require service, the dim flag DMFLG is reset in step 631 and comparison 632 is entered. In step 632, the condition of all local control "on" switches is tested by checking the logic state of the remaining local control interface means output 22*b'*. If a logic level exits at this output, at least one local "on" switch is active and the program calls the on/up switching routine ONUSW of step 635 (FIG. 5*d*, discussed hereinbelow). If the local "on" switch is not active, step 632 resets a bright flag BRFLG, in step 636, and continues to decision step 637. In step 637 the sensor (photocell) bus activity is checked and if the photocell input to the control module is active, step 638 is entered, wherein the photocell is reset. The program, in step 639, transfers to the PCELL node 640, of the PCELL subroutine of FIG. 5*b*. If, in step 637, the photocell was not active, or if, in step 615, the K inputs were not active, the program transfers to the TPCEL node 641. The photocell flag PCFLG is tested in decision step 642, to ascertain whether the photocell sensor is enabled. If the sensor is disabled, the program branches back to the loop node 600 and the main loop is executed once again. If the photocell is enabled, step 642 calls the photocell sensor PCELL subroutine of step 645 (FIG. 5*b*).

The photosensor PCELL subroutine 645 (FIG. 5*b*) is utilized whenever a photocell reading is desired. The first step 646 calls into play a delay of approximately one second, to allow the sensor output to stabilize. The subroutine then passes through the PCELLO node 647 and enters step 648. In step 648, the count (of an internal counter) is initialized. The analog to digital conversion commences with step 649. First, the K inputs are tested in step 650 and if none of the K inputs are active, the count is incremented in step 651 and the incremented count is rechecked for overflow in step 651*a*. If an overflow occurs, the sequence exits to LOOP node 600. If an overflow does not occur, step 650 is reentered, whereby the program waits until one of the K input lines (ideally, the K4 line enabled via diode D3 at the end of an A-to-D conversion) is active before progressing to decision step 652. In step 652 a BLPCF flag is tested. This flag is set to a logic one if the central controller requested a photocell reading (also indicative of a need for a return data transmission to the central controller), while the flag is reset to a logic zero state if the control module itself requested a photocell reading as part of the main loop sequence. If the main loop sequence requested the reading, step 652 exits to step 653, wherein the activity of the central controller bus is again checked. If the data bus is active, indicative of a possible incoming transmission, the BLSL subroutine (of FIG. 5*h*) is called in step 625. If the data bus is not active, step 654 is entered and the activity of the local "off" switches are rechecked. If any local "off" switch is active, the OFDSW routine 630 is called; if all "off" switches are inactive, then decision step 655 is entered. In step 655, the activity of the local control "on" switches is checked; if any "on" switch is active, the ONUSW routine of step 635 is called. If the "on" switches are inactive, or if the central controller requested the photocel reading (in step 652) the program continues to step 656. Having ascertained that the central controller data bus and the local on/off switches are not active, step 656 tests the photocell input (K4) to see if a sensor analog-to-digital conversion has timed out. If the conversion timing is not complete the program returns to step 651, incrementing the count in the interval counter and entering step 650 to retravel the loop to step 656. If the conversion time-out is complete, step 657 is entered, whereby the sensor converter is reset and the PCELL 4 node 640 is entered.

In the PCELL 4 sequence, the BLPCF flag is again tested in step 658. If the flag is now set to a logic one, the module branches to the read photocell RDPCL subroutine step 660 of FIG. 5*s*. If the central controller had not called for the photocell check, the BLPCF flag is set to a logic zero state (indicative of a main loop-requested photocell reading) and step 661 is entered, wherein a "closed-loop" flag CLFLG is set to a logic one state indicative of the control module being in a closed loop mode. In subsequent step 662, the photocell reading is checked to see whether the sensed ambient level is less than an allowable level. If the ambient (light) level is indeed less than an allowed (light) level the system branches from step 662 to the load increase, or brighten, subroutine BRITE of step 665 (FIG. 5*f*), wherein the lamp output is brightened by one level. If, however, step 662 finds that the ambient is not less than the allowed level, the sequence passes to step 666, wherein the presence of the ambient (light) level sensor is checked. If the sensor is not present, the sequence exits to LOOP node 600. If the sensor is present, step 667 is entered and the ambient (light) level is tested to ascertain if it is greater than the allowed (light) level. If the ambient light level is greater than the allowed light level, control is shifted to a load-decreasing DIM subroutine of step 670 (in FIG. 5*e*) wherein the light is decreased one level. If however, step 666 finds that the ambient light level is not greater than the allowed level (and it has been previously found, in step 662, that the ambient level is not less than the allowed level) the load output (light) level needs no adjustment and the routine returns to loop node 600 (FIG. 5*a*).

Figure 5E:
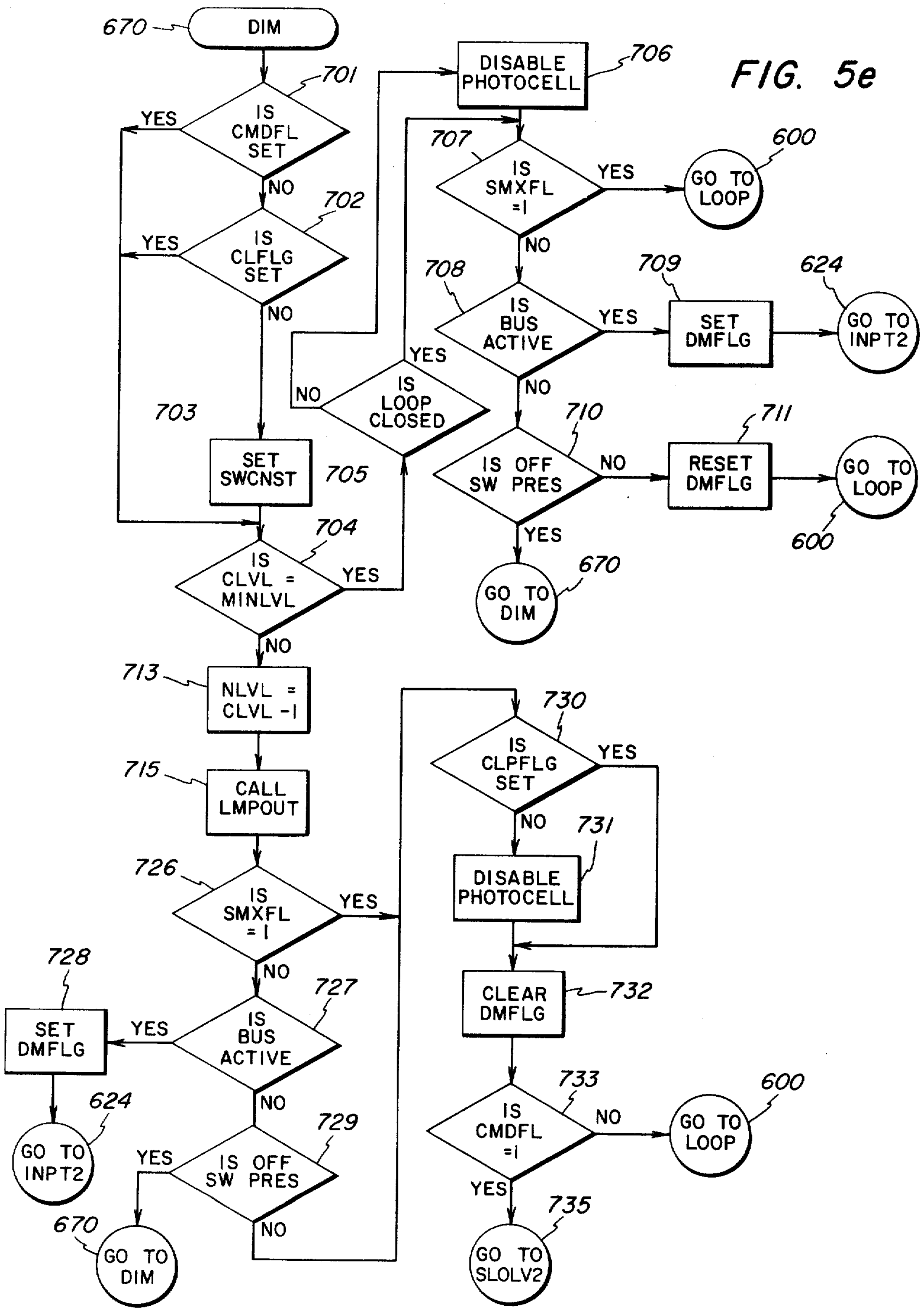
Figure 5F:
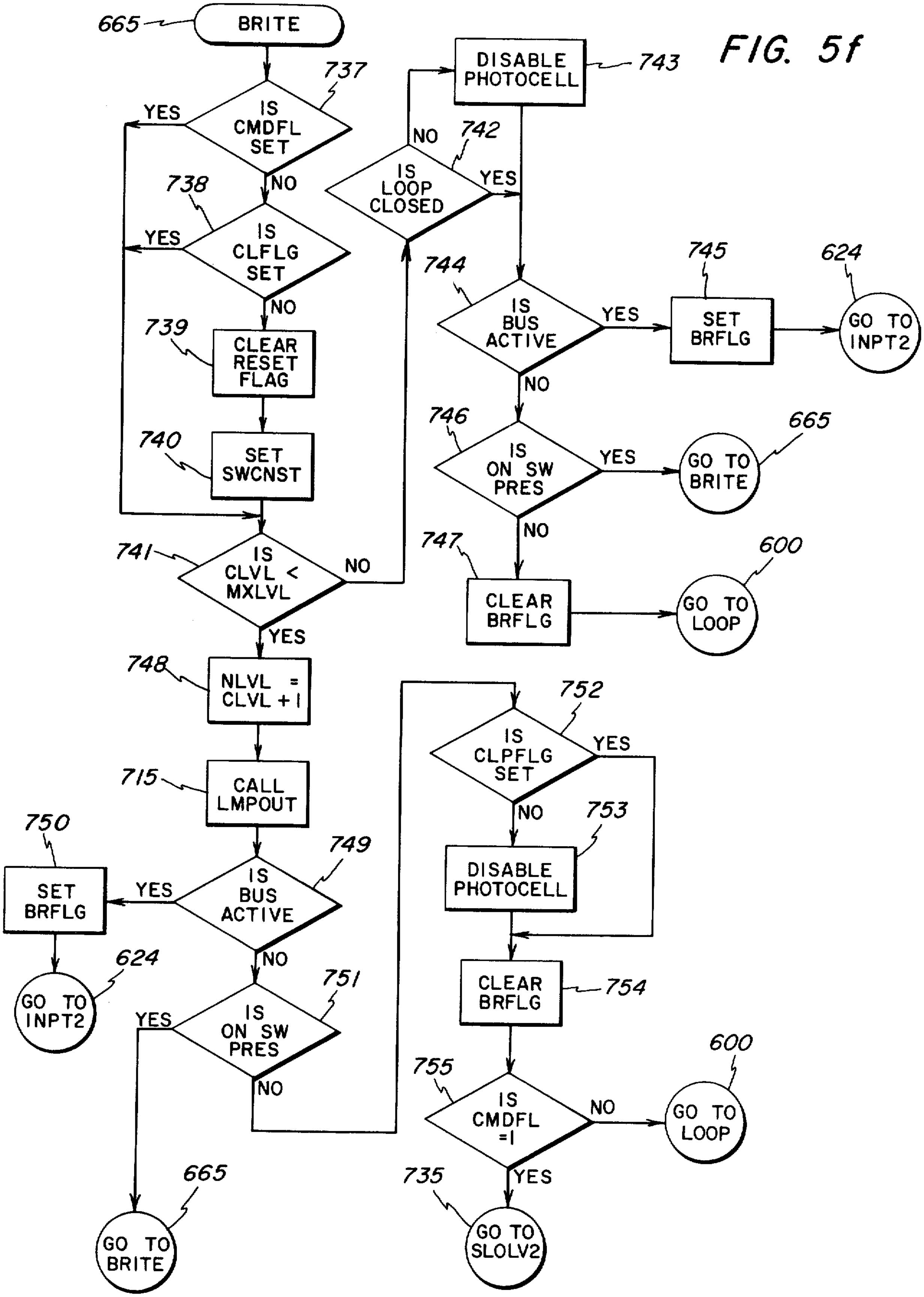

The off-dim switching subroutine OFDSW of node 630 (FIG. 5*c*) is called when an "off" switch closure is detected. In step 672, the controller microcomputer is utilized for the debouncing of the switch contact closure. The central controller bus is again checked, in step 673, and if the bus is active, the program returns to loop node 600. If the bus is not active, step 674 is entered and the K inputs are again checked for an "off" switch closure. If the "off" switch has not been pressed, the program exits to loop node 600. If the "off" switch is pressed, a reset flag is cleared in step 675, and step 676 is entered to determine whether the load (lamp) is in the off condition. If the lamp is in the off condition, no further action is necessary upon the local "off" switch closure, and step 676 exits to loop node 600. If the load is on, the bright flag BRFLG is reset, in step 677 and the dim flag DMFLG is tested in step 678. If DMFLG is set, control branches to the diming routine DIM of step 670 (FIG. 5e). The DIMFLG would be set if, during the DIM routine, the control module had been interrupted by a message from the central controller; this allows dimming to occur, simultaneously with message reading and decoding. If DMFLG is not set, step 678 proceeds to step 679, wherein a one-half second wait occurs. After the one-half second delay, the central controller bus activity is again checked in step 622'. If the bus is active, the INPT2 subroutine (step 624) is called. If the bus is not active, the CLFLG flag is cleared in step 680 and the off-switch is checked (step 681) for continued closure. If the off switch is no longer pressed, signifying that the user requested the lamp to be shut off, step 682 is entered, the lamp is turned off, and the program returns to loop 600. A continued pressing of the switch in the "off" condition, in this embodiment, after a one-half second wait is indicative that the user is requesting the lamp be dimmed, but not shut off. Accordingly, the DIM dimming subroutine of step 670 (FIG. 5e) is called. It will be seen that control module 10', when utilized in a lighting control system, operates whereby the lamp may be turned immediately off with a short-time-interval activation on the "off" side of the switch and may be dimmed with continued "off" switch activation. Similarly, the lamp level may be increased (brightened) by continued pressure on the opposite, or "on", portion of the switch. A short time interval of "on" portion activation is interpreted as an immediate on signal, as utilized in the on-up switching subroutine ONUSW, commencing at step 635 of FIG. 5d.

When the ONUSW subroutine step 635 is called, the computer initially debounces the "on" switch closure, in step 684, and then checks the maximum level MXLVL to ascertain if it is currently set to the zero level, in step 685. If the zero level is set, the load can neither be turned on nor increased, and the program exits to loop node 600. If the MXLVL is not set to zero, step 686 is entered and the activity of the central controller bus is again checked. If the bus is active, the program returns to loop node 600. If the bus is not active, decision step 687 is entered and the state of the "on" local control switch means is checked. If the "on" switch means is not pressed, an on or up switching condition is not required and step 687 again exits to loop node 600. However, if the "on" switch is pressed, step 687 exits to step 688, wherein the dim-flag DMFLG is cleared and the status of the brightflag is checked in step 689. If BRFLG is set, the lamp can be brightened one level and the program clears the CLFLG flag (step 689a) and then goes to the BRITE subroutine node 665 of FIG. 5f. If BRFLG is not set, the reset flag is cleared in step 690 and step 691 is entered to test the on/off condition of the load (lamp). If the load is off, step 692 is entered and both the ON and CLFLG flags are set, before step 692a is entered and the initial level data, given by the condition of the fusible links for the %0 and for the %1 diode-link combinations, is obtained. The initial level INLVL data is compared against the maximum level MXLVL, in step 693, and if the initial level is greater than the program maximum level, step 694 is entered and the command level CLVL data is set to the MXLVL amount. If the initial level is not greater than the maximum level, step 695 is entered and the commanded level CLVL is set equal to INLVL. Having now set the commanded level CLVL, in one of steps 694 or 695, the commanded level data is output in step 696. Step 697 is entered and the photocell is enabled. A wait of two seconds occurs in step 698, before going to step 699. If, however, in step 691 the lamp was found to be on, a wait of one-half second (step 679') occurs and the activity of the central controller bus is checked in step 622'. If the bus is active, step 700 sets the BRFLG flag and calls the INPT2 subroutine (step 624 of FIG. 5a). If the bus is not active, the sequence proceeds to step 699. Step 699 again checks for a closure of an "on" local switch. If the switch is no longer closed, no further change in light level is required and the program exits to node 600. If the switch is still closed, a further increase of the load level is requested and the routine exits to BRITE subroutine node 665 of FIG. 5f.

Figure 5G:
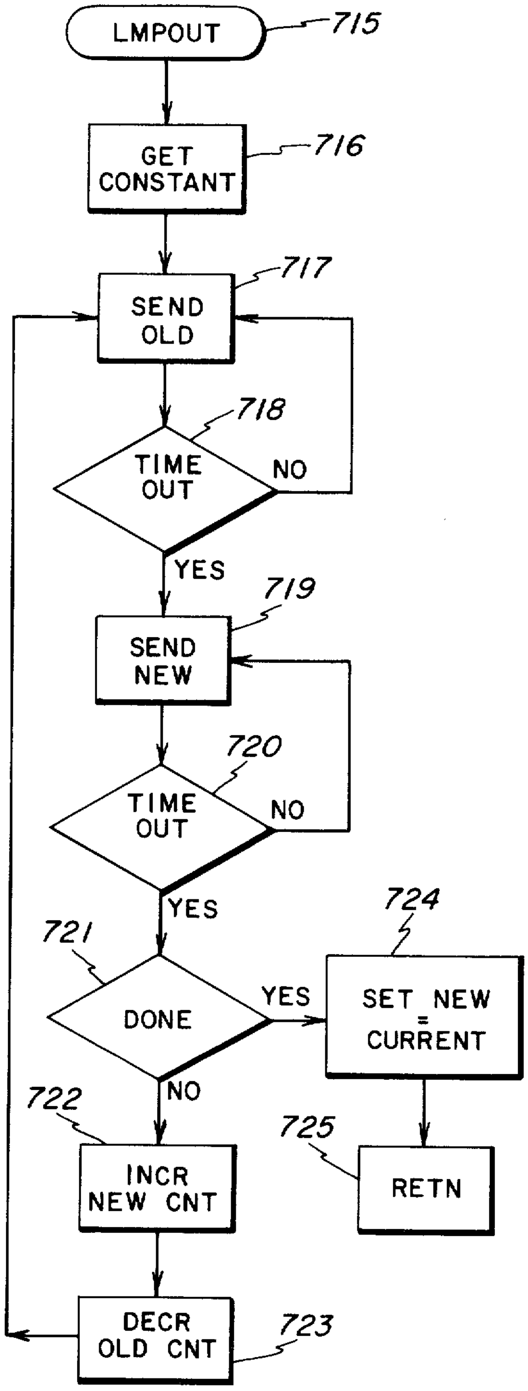
Figure 5H:
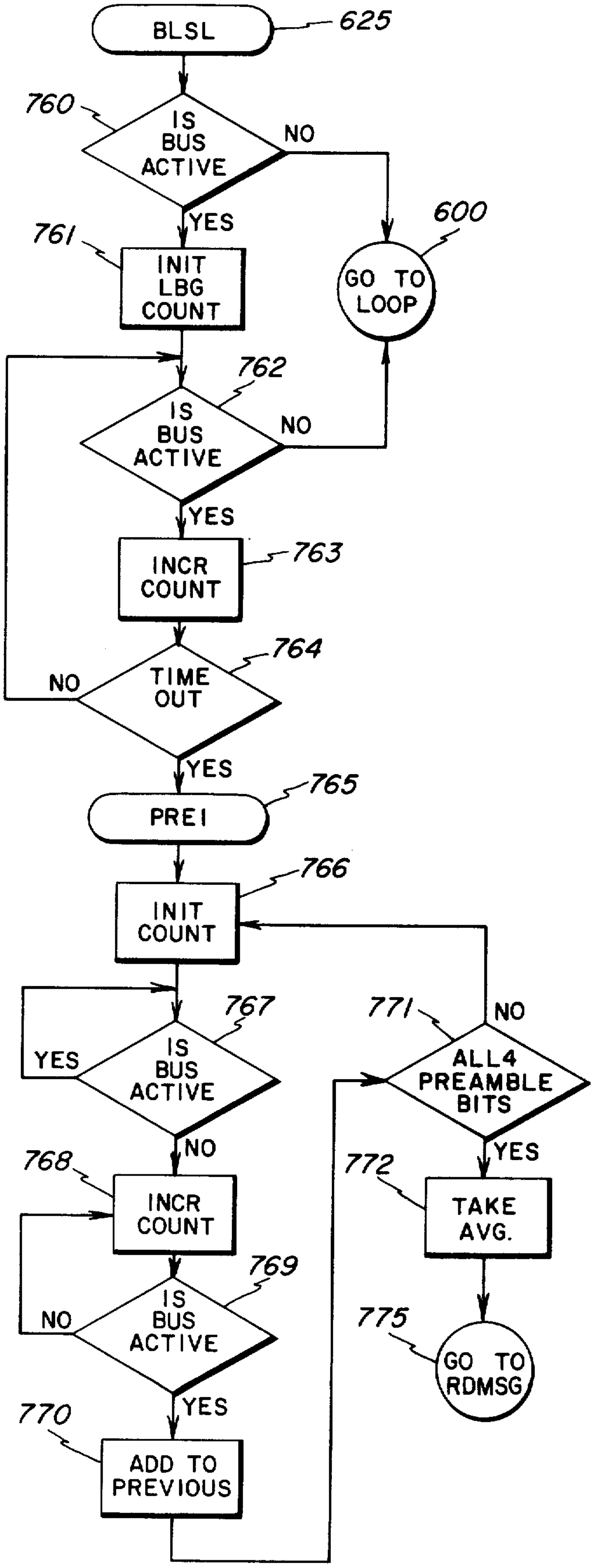
Figure 5I:
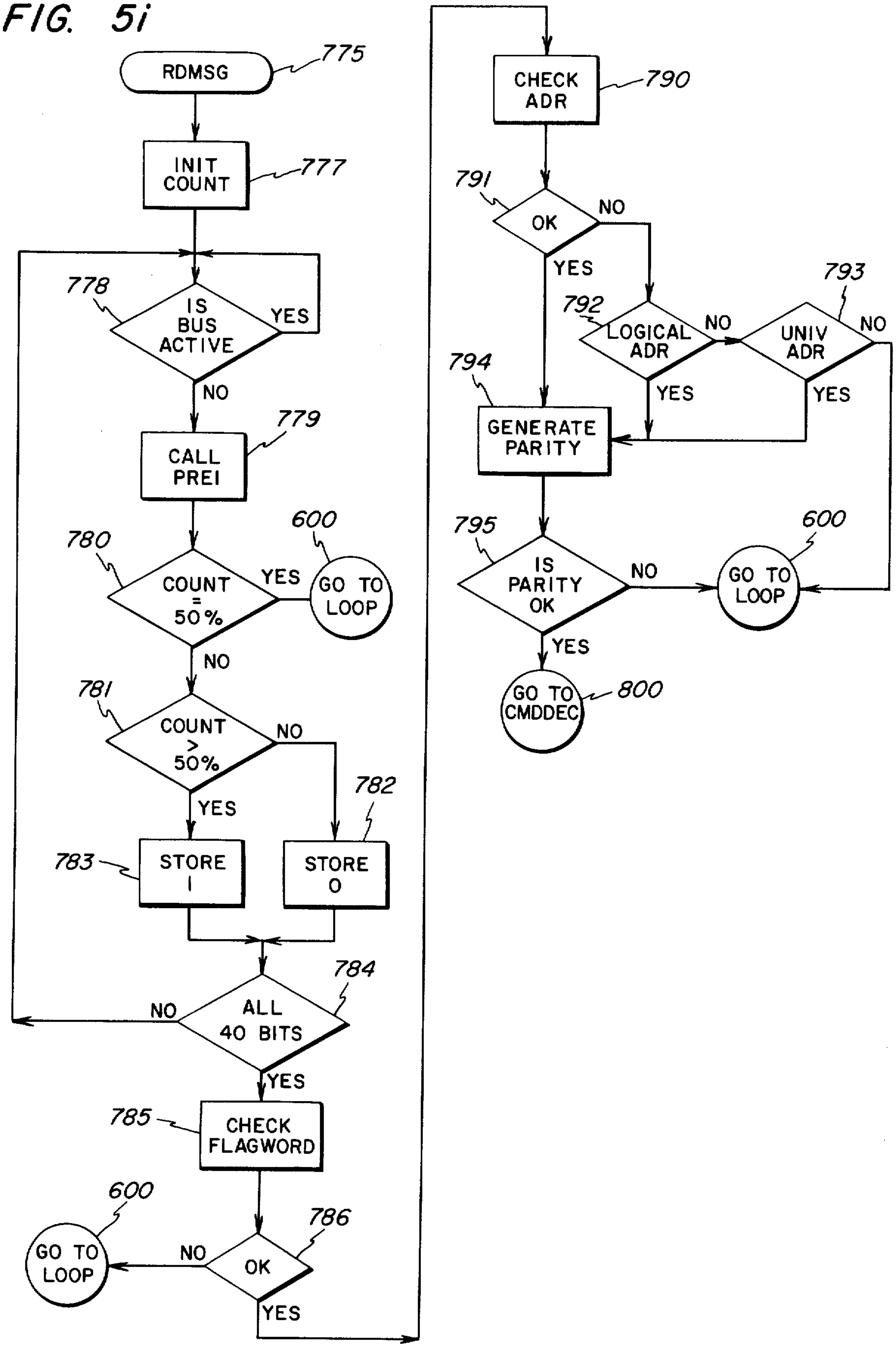
Figure 5J:
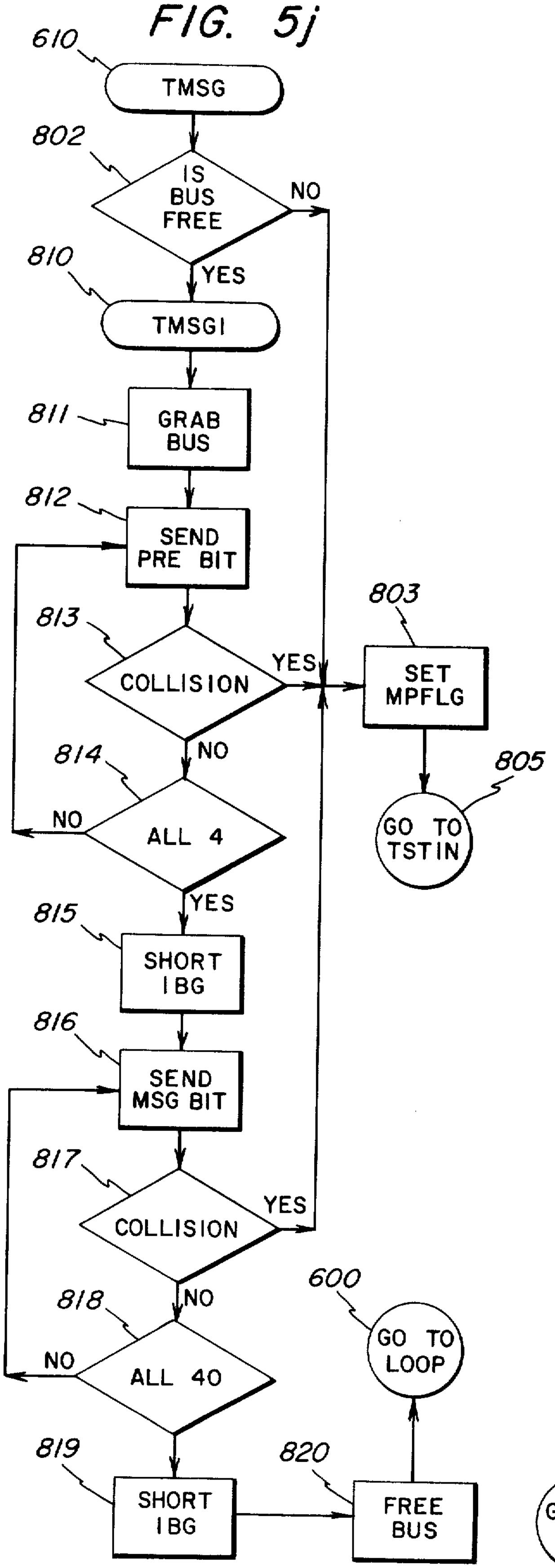

If the load level is to be decreased (load lamp output to be dimmed) the DIM subroutine commencing at node 670 (FIG. 5e) is utilized. In a first step 701 a "command" flag CMDFL is tested. If the flag is not set, the closed-loop flag CLFLG is tested in step 702. If CLFLG is also reset, step 703 is entered and a switch constant SWCNST flag is set and that switch-setting constant (which will be used for determining the speed of the slow level-change) is obtained from RAM. Thereafter, or if either CMDFL or CLFLG is set, the current load level CLVL is tested (step 704) for equality to a minimum allowable load level MINLVL. If CLVL equals MINLVL, step 705 checks for a closed output-under-photocell-control loop. If this loop is open, step 706 is entered and the photocell is disabled. If the loop is closed, step 706 is bypassed. Thereafter, a "set maximum" flag SMXFL is tested in step 707. If SMXFL is a logic one, the maximum level has been set to a level which is lower than the current level, and the program exits to loop node 600. If SMXFL is set to a logic zero, the central controller bus activity is again tested in 708 and, if active, the DMFLG flag is set in step 709 and the INPT2 subroutine (node 624 of FIG. 5a) is called. If the data bus is not active, step 710 is entered and the local control "off" switch input is again checked; if the switch is not being pressed the dimming flag DMFLG is reset in step 711 and the program returns to node 600. If the local control off switch is still pressed, (indicative of a request for the dimming function), the program returns to step 670 at the start of DIM subroutine. If, at step 704, the commanded level was found to be other than the minimum allowed level, step 713 is entered and CLVL is decremented by one level to establish a new level NLVL=CLVL-1. The lamp output LMPOUT subroutine of step 715 (FIG. 5g) is called.

The lamp output LMPOUT subroutine (FIG. 5g) is used to effect a slow level change between two levels in response to one of: a sensor (photocell) request, a central controller request, or a local control switch closure request. In first subroutine step 716, the speed constant, associated with flag SWCNST, is obtained from memory; the value of this constant will differ depending on whether the level change is due to a central controller command, a local control switch closure, or a sensor (photocell) output change when the control module is operating in the closed-loop mode. Once the timing constant is obtained, the control module sends the "old", or current level, to the load, in step 717, for a specific number of cycles of the oscillator 30'. As the level change is to be accomplished in accordance with the methods of co-pending application Ser. No. 267,330 incorporated herein by reference in its entirety, a counter is initialized for both the old CLVL and new NLVL counts. The subroutine proceeds to step 718, where the count in the CLVL, or "old", counter is checked. If time still remains for sending the CLVL level, the subroutine returns to step 717. After the required number of oscillator cycles are transmitted at an analog level associated with the old CLVL levels, step 718 verifies that the CLVL count is zero and step 719 is entered. At this time the new NLVL level is transmitted as an associated amplitude of a waveform including that number of oscillator cycles determined by the time count in the new level counter. Step 720 checks the status of the new level counter and returns to step 719 if the required number of cycles have not yet been transmitted. Once the required number of NLVL amplitude cycles have been transmitted, step 720 exits to step 721. In step 721, the count in the old CLVL counter is checked, and if still greater than zero, step 722 is entered, wherein the new NLVL counter is incremented by one count. In step 723, the old CLVL counter is decremented by one count. The routine now returns to step 717. The loop of steps 717–723 is repeated, as the number of old CLVL amplitude cycles decrease and the number of new NLVL amplitudes cycles increase, until the contents of the old CLVL register is equal to zero, at step 721. At that time, the current level is set equal to NLVL and, in step 725 the subroutine returns to that point in the program from which the LMPOUT subroutine node 715 was called.

Returning to the the DIM procedure of FIG. 5*e*, after the LMPOUT subroutine ends and the program returns to the end of step 715, the SMXFL flag is again tested in step 726, and if set to a logic zero level, the central controller bus activity is checked in step 727. If the bus is active, DMFLG is set in step 728 and the INPT2 subroutine node 624 is called. If the bus is not active, a local control off switch closure is checked for in step 729. If any of the local control off switches are closed, the routine returns to the beginning DIM node 670. If a local off switch is not still pressed, or if (in step 726) SMXFL was set to a logic one, step 730 is entered and the state of the closed loop flag CLPFLG is checked. The test in step 726 is to ascertain whether dimming is taking place due to a change in maximum allowable level; such a change occurred if the set-maximum flag is set to a logic one level and did not occur if the set-max. flag was reset to a logic zero level. Step 730 is a test to ascertain whether dimming is occurring due to a photocell request in the closed loop mode. If CLPFLG is not set, the photocell is disabled in step 731. However, if the CLPFLG is set, the photocell remains active and is not disabled. The dimming flag DMFLG is cleared in step 732 and the command flag CMDFL is tested in step 733. If the command flag is reset, the program returns to loop node 600; if the command flag is set to a logic one level, indicative of a level change having been commanded by the central controller, the routine branches to the SLOLV2 node 735 of a slow-level change routine (FIG. 5*n*).

If a load level increase has been commanded, the load-level-increase BRITE routine node 665 (FIG. 5*f*) is called. The routine commences by testing the command flag CMDFL in step 737. If the command flag is not set, the closed-loop flag CLFLG is tested in step 738. If the closed loop flag is also reset, the reset flag is cleared in step 739 and the switch constant SWCNST is set to the appropriate speed for use with the local control switch, in step 740. Thereafter, or if the command or closed loop flags were found to be set in respective steps 737 or 738, step 741 is entered to test whether the current level CLVL is less than the maximum allowable MXLVL. If the current level is not less than the maximum allowable level, the photocellcontrol loop is checked (step 742). If the loop is open, the photocell sensor is disabled (step 743) and step 744 is then entered. If the photocell is active, step 742 goes directly to step 744. Central controller the bus activity is then checked 744. If the bus is active, indicating an interruption by the central controller of the BRITE subroutine, the bright flag BRFLG is set in step 745, as control passes to the INPT2 node 624 (FIG. 5*a*). If the bus is inactive, step 746 is entered and the closure of the local control "on" switch is tested. If the "on" switch is still being pressed, the program returns to node 665 at the start of the BRITE program. If the ∓on" switch is no longer being pressed, the brite flag BRFLG is cleared in step 747 and the program returns to loop node 600.

If the current level was found to be less than the maximum allowed level in step 741, step 748 is entered and the current level CLVL data is incremented by one level to obtain the new level NLVL data. The LMPOUT subroutine (at node 715 of FIG. 5*g*) is called; when LMPOUT is finished, the program returns to step 749, wherein the central controller bus activity is again checked. If the bus is active, the brite flag BRFLG is set, in step 750, and the INPT2 node 624 is called. If the bus is not active, the local "on" switch presence is again checked, in step 751, and if still present, the routine returns to the BRITE node 665, as the user requests further increases in the light level. If the "on" switch is no longer being pressed, indicative of the user having found a present load (light) level acceptable, the "closed loop" flag CPLFLG is checked, in step 752, to see whether the load level increase was due to a sensor (photocell) change and, if such change did occur, if the photocell was enabled. If the CLPFLG flag was not set, step 753 disables the sensor (photocell). If the CLPFLG flag was set in step 752, or after disabling the photocell sensor in step 753, step 754 is entered and the BRFLG "flag" is cleared. The "command" flag CMDFL is tested in step 755 to determine whether the load level increase was responsive to a control command from the central controller. If the CMDFL is set (to a logic one level), the program branches to step 735, the SLOLV2 routine of FIG. 5*n*, whereas if CMDFL was reset (to a logic zero level) the program returns to main loop node 600.

The BLSL subroutine (FIG. 5*h*), commencing at node 625, is utilized for passing control of the control module to the central controller, upon detection of bus 10*c*' being pulled to a low logic state. Accordingly, the routine commences with the activity of the central controller bus being checked in step 760. If the bus is inactive, program control returns to loop node 600 (FIG. 5*a*). If, however, the bus is active, the count for the initial long interblock gap (LBG) is initialized in step 761. The activity of the central controller bus is again checked, in step 762 to ascertain whether it is still pulled to the low logic state. If the bus is no longer in a low state, control passes back to loop node 600. If the bus is, however, in a low state, the count (initialized in step 761) is incremented in step 763 and a check is then made in step 764 to see if the count has timed out to establish that an initial LBG has been received. If the LBG has not been received, step 764 loops back to the beginning of step 762, whereby the central controller bus 10*c*' is continually checked in the step 762–764 loop, until the bus is either released or the count times out. Once the count times out, node 765 is entered and the message preamble PRE1 is read in. This is accomplished by first initializing the preamble count in step 766 and then the control module either waits until the central controller bus is released or until a fixed time interval, e.g. one-half second, has passed. Thus, in step 767, activity of the central controller bus is again checked, and if the bus is still active, the program loops around to the entrance of step 767; therefore, the program essentially waits until the bus becomes inactive before proceeding to step 768, wherein the count, initialized in step 766, is incremented. The bus activity is again checked in step 769, and if the bus is inactive the count is again incremented in step 768, before rechecking bus activity in step 769. If the bus is active upon being rechecked in step 769, step 770 is entered and the count is added to the previous count and stored in memory for a first preamble bit. Step 771 is then entered and the controller microcomputer checks for the presence of all four preamble bits. If the four preamble bits have not been received, the program loops back to the counter initialization step 766 and awaits further preamble bits. If all four preamble bits have been obtained and stored in memory, the program proceeds to step 772, wherein the average of all four preamble bit times is taken to determine the 50% level thereof, before the program proceeds to the read-message RDMSG routine at step 775.

In the message-reading RDMSG subroutine starting at node 775 (FIG. 5*a*), the 40 bit message from the central computer is read into the control module. The message-reading routine commences by initializing a count, in step 777, and then checking the bus activity to determine when the central controller data bus 10*c'* is released. Thus, if, in step 778, the bus is active, the program loops through step 778 until the bus becomes inactive (released). Once the data bus has been released (becomes inactive) the PRE1 subroutine (as shown for step 765–775 of FIG. 5*h*) is utilized in step 779 to obtain the count for each data bit. The count is checked, in step 780, for percentage of on-to-off time. If the count is equal to a 50% on-to-off timing, an error has occurred in the routine and the program branches back to loop node 600. If the count is not a 50% on-to-off timing, step 781 is entered to compare the count against the 50% mark and if the count is less than 50%, step 782 stores a logic zero, for that particular data bit, in a message buffer. Conversely, if step 781 determines that the count in greater than 50%, a logic one is stored for that particular data bit in the message buffer (step 783). After each bit has been stored, step 784 checks to see if all 40 message bits have been received. If less than 40 message bits are present, the routine loops back to step 778, to obtain additional data bits. Once all 40 message data bits are present, step 785 checks the flag word to determine if the message is one for a control module, rather than for some other component of the centrally-controlled system. If the flag word does not check properly, step 786 exits back to loop node 600. If the flag word indicates that the message is for a control module, the physical address is then checked, in step 790, against that physical address set by the diode-link combinations of address means 32'; the 12 bit address previously read during the initialization procedure is retrieved from the address buffer in the controller microcomputer RAM and is compared to the received physical address. If comparison step 791 finds that the physical address specified in the received messages is not the same as the physical address assigned to the particular control module, step 792 is entered and the received address is checked for equality to the logical address of the control module. If the logical addresses are not equivalent, step 793 is entered and the received message address is checked for equality to the universal address. If step 793 finds that the received address is not equal to the universal address, and as previous steps 791 and 792 have found that the received message address is not the same as the unique physical address or the logical address assigned to the particular control module, the decision must be that that particular control module is not being addressed and the program branches back to loop node 600. If, however, the received message address was found in step 791, 792 or 793, to have a physical, logical or universal address for the particular control module, step 794 is entered and a received message parity word is generated for comparison, in step 795, against the received parity word. If parity equality is not obtained, an erroneous message has been received and the program branches back to loop node 600. If parity word equality is obtained, a proper message has been received and the command may be subsequently decoded in the command decode CMDDEC subroutine starting at node 800 (FIG. 5*k*).

Prior to considering the command decoder sequence (which follows the message read subroutine RDMSG), the message transmission subroutine TMSG (FIG. 5*j*) will be described. Commencing from subroutine node 610, a check is made in step 802, to ascertain if central controller bus 10*c'* is free so that the control module may transmit a message thereon. If the central controller bus is not free, the message-pending flag MPFLG is set (step 803) and the routine branches (step 805) to the input testing location TSTIN, which is the INPT node 620 in the main loop. If the bus is free, the program passes through the TMSG1 node 810, and, in step 811, grabs the central controller bus and holds the bus at a low state, so that another control module can not attempt to transmit a message. In step 812, a preamble bit is sent and then, in step 813, a check is made to see if a collision has occurred during the preamble bit transmission. If a collision is detected, the MPFLG is set (step 803) and the TSTIN location (INPT node 620) is called (step 805). If a collision does not occur, step 814 is entered and the number of transmitted preamble bits is checked. Since a proper message requires transmission of four preamble bits, if less than four preamble bits have been sent, the program loops back to step 812 and sends an additional preamble bit. When all four preamble bits have been sent, step 814 causes the program to enter step 815, to send the short interblock gap (IBG). Thereafter, the 40 message bits are sent by individually transmitting each bit (step 816) and checking for a central controller bus collision during transmission therof (step 817). If a collision is detected, the program goes (step 805) to TSTIN via the MPFLG setting step 803. If no collision is detected, step 818 checks the number of message bits set, and if less than 40 message bits have been transmitted, loops back through steps 816 and 817, to send additional message bits. Once all 40 message bits have been transmitted without a collision, a final short interblock gap (IBG) is transmitted in step 819, the line is released (step 820) for use by other control modules, the central controller or other transmitters on the data bus, and program control passes back to main loop node 600.

Figure 5K:
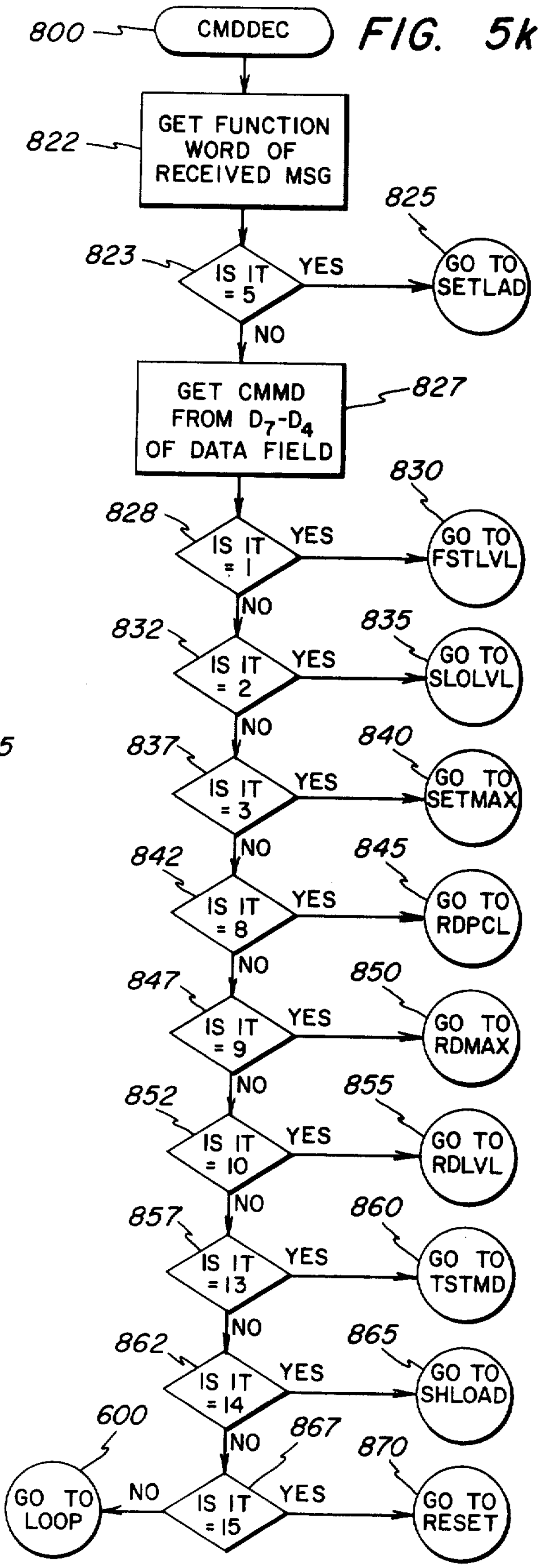
Figure 5L:
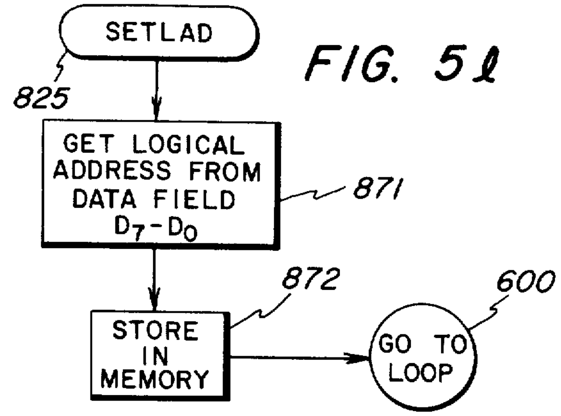

The CMDDEC subroutine for decoding central controller bus commands is shown in FIG. 5*k*. The CMDDEC node 800 is entered when a message, addressed to the particular control module, is received and requires a listed control function to be performed. The function word of the received message has been stored in a reception buffer RBUF in RAM and is retrieved therefrom in step 822. The value of the function word is checked, and if the value is found to be equal to decimal 5 (step 823) the SETLAD subroutine of step 825 (FIG. 5*l*) is called to reset the particular control module logical address to a new value. If the function word value is not equal to 5, step 827 is entered and the command data (CMMD) is obtained from the upper four bits $D_7$-$D_4$ of the data field. The subroutine now has both a command number and an associated command data word. If the command number is equal to 1 (step 828), the fast-level-change subroutine FSTLVL node 830 (of FIG. 5*m*) is called. If the command number is 2 (step 832), the slow-level-change SLOLVL subroutine node 835 (of FIG. 5*n*) is called. If the command number is 3 (step 837) the program branches to node 840 and calls the SETMAX subroutine (of FIG. 5*p*) to change the maximum allowable level. If the command level is 8 (step 842), the program branches to node 845 and calls the RDPCL subroutine (of FIG. 5*q*) to obtain a photocell reading and transmit that reading back to the central controller. If the command number is 9 (step 847), the RDMAX subroutine node 850 (of FIG. 5*s*) is called to cause the control module to transmit its currently-programmed maximum allowable level back to the central controller. If command number 10 is requested, (step 852), the program branches to the RDLVL subroutine node 855 (of FIG. 5*f*), to send the central controller data indicative of the current level data that is being output by the control module to the associated controller load(s). If command number 13 is requested (step 857), the program branches to node 860 and the TSTMD subroutine (of FIG. 5*w*) is called; this is a test-mode command utilized for inspection of the parameters of the controller microcomputer in a particular control module. This test-mode command is not normally used once the controller microcomputer integrated circuit is installed in a control module. If command number 14 is requested (in step 862), the SHLOAD load-shedding subroutine node 865 (of FIG. 5*u*) is called, whereby, if a control module current output level is higher than the level sent as the data portion of the load-shedding command, the control module is then caused to reduce the load control output to the new load-shedding level. If command number 15 is requested (step 867), the RESET subroutine node 870 (of FIG. 5*v*) is called. If any other command number is requested, and is therefore a call for an unassigned command number, the subroutine declares that a valid command has not been received and returns to loop node 600.

Receipt of a command number 5 directs that the set-logical-address SETLAD node 825 (FIG. 5*l*) be entered. After the logical address data is obtained from the data bits $D_7$-$D_0$ of the received data field (step 871), the new logical address is stored in a preselected location in the random-access memory (step 872) and the program returns to loop node 600.

Figure 5M:
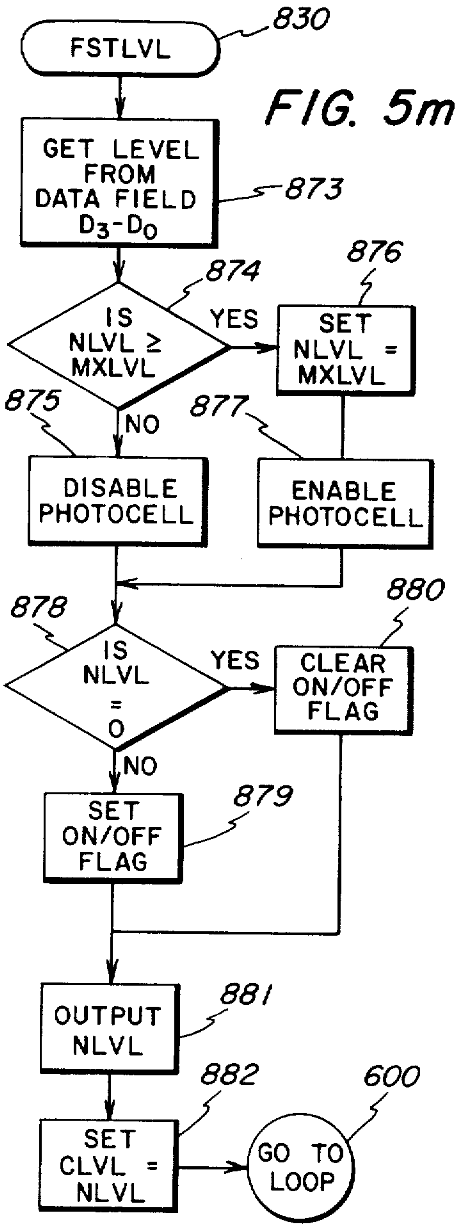
Figure 5N:
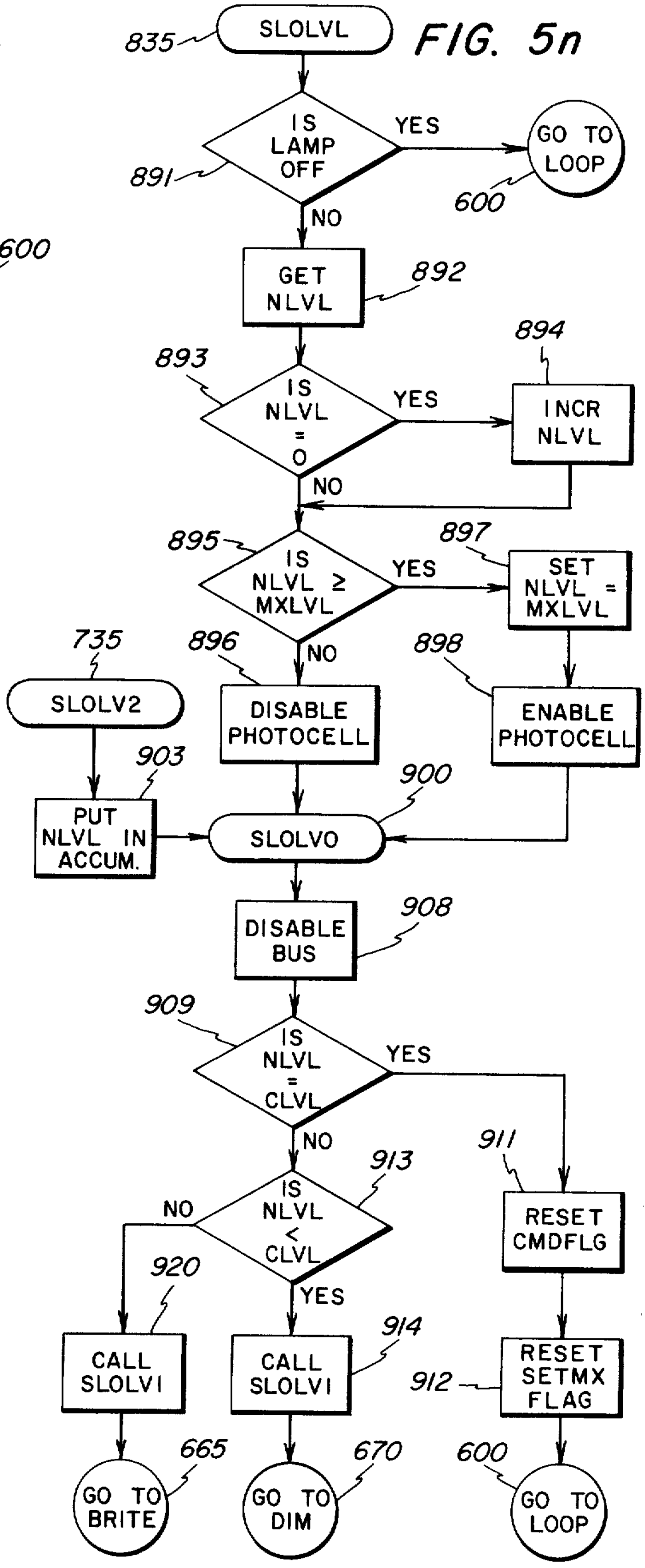

Receipt of a command number 1 causes the program to branch to fast-level-setting subroutine node 830 of FIG. 5*m*. The FSTLVL subroutine commences with step 873, wherein the desired output level is data obtained from the lower four bits $D_3$-$D_0$ of the data field in the received control controller command message. This new level NLVL is compared with the previously established maximum allowable level MXLVL data and, if NLVL is less than MXLVL, the photocell is disabled in step 875, preparatory to an output level change. If NLVL is not less than MXLVL, the data value of NLVL is set equal to the value of MXLVL, in step 876, and the photocell is thereafter enabled in step 877. After operating upon the photocell sensor state in either of steps 875 or 877, comparison step 878 is entered and the new level NLVL data is checked for a zero level. If a non-zero NLVL level exists, then the on/off flag is set in step 879, while if a zero NLVL exists, then the on/off flag is cleared in step 880. After the on/off flag is operated upon, step 881 is entered and the NLVL data is output to the load and thereafter the current level CLVL data is set equal to the new level NLVL data and stored in memory (step 882) prior to the program returning to loop node 600. It will be seen that this fast-level subroutine immediately changes the present load output level to be that of the newly commanded level.

Figure 5O:
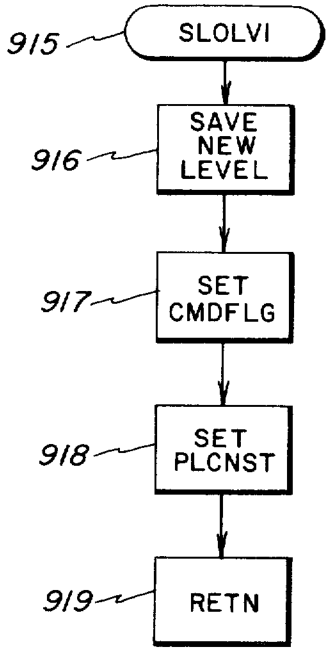
Figure 5P:
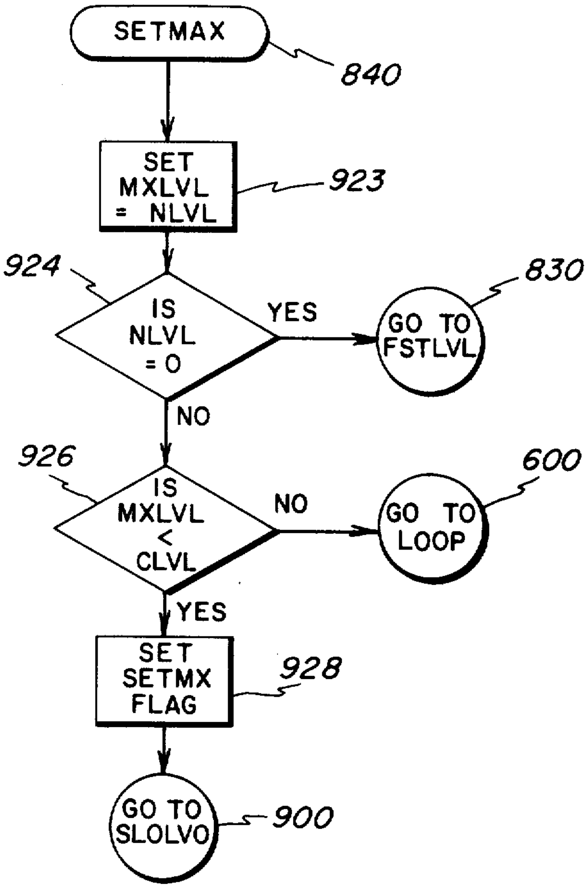

If the central controller has commanded a slow level change, the SLOLVL node 835 (FIG. 5*n*) is entered and the on/off state of the load (lamp) is initially checked in step 891. If the load (lamp) is off, no level change can occur and control branches back to loop node 600. If the lamp is in the on condition, the new level NLVL data is obtained (step 892) from the incoming data buffer, and is checked to see if a zero level is commanded (step 893). If the commanded new level NLVL data is equal to zero, it is automatically incremented to the first non-zero level in step 894. The new level data is then compared, in step 895, with the maximum allowable level MXLVL. If the new level is less than the maximum allowable level, then the photocell sensor is disabled in step 896; while if the new level data is not less than the maximum allowable level, then the new level data is modified in step 897 to be equal to the maximum allowable level MXLVL and the photocell sensor is thereafter enabled (step 898). After the photocell sensor operation in step 896 or 898, the SLOLVO node 900 is entered. This node is also entered if the SLOLV 2 subroutine node 735 had been previously called in the DIM or BRITE subroutines, but after placing the new level data in the accumulator register of the controller microcomputer (step 903). From node 900, the program continues to a step 908 in which the central controller bus 10c' is disabled to allow the control module to complete its load level change without interruption from the central controller. After disabling the central controller bus, the new level NLVL is checked, in step 909, for equality to the current level CLVL. If equality exits, the CMDFLG is reset (step 911) and the SETMX flag is also reset (step 912) before the program returns to main loop node 600. If the new level is not equal to the current level, step 913 is entered and a check is made to determine whether the new level is less than, or greater than, the current level. If the new level is less than the current level, the SLOLV1 routine (FIG. 5*o*) is called (step 914). This subroutine, commencing of entry node 915, first saves the new level data (step 916), then sets the CMDFLG flap in step 917, and also sets the required constant PLCNST, which will be used in the LMPOUT routine, to that value associated with a central-controller-requested level change (step 918). The subroutine then returns (step 919) to the end of CALL step 914 and, as the new level is less than the current level and requires a load level decrease, goes to the DIM subroutine node 670. If, in step 913, the new level was found to be greater than the current level (requiring a load level increase) step 920 is entered and SLOLV1 subroutine entry node 915 is again called. After the subroutine is complete, it returns at step 919 to CALL step 920 and the slow level change subroutine ends by calling the BRITE subroutine node 665.

When the central controller commands a change in a maximum allowable level, the SETMAX subroutine node 840 (FIG. 5*p*) is called. Upon receipt of this command, the controller microcomputer obtains the new maximum level NLVL data from the incoming message buffer, sets this level equal to the maximum level MXLVL (step 923) and then checks to ascertain whether the new level is equal to zero (step 924). If the new level is equal to zero, then the program exits to the fast-level-change FSTLVL routine node 830 of FIG. 5*m*. If the new level is not zero, the program progresses to decison step 926 and compares the new maximum level with the current load level. If the current load level is less than the new maximum allowed level, no action is required and the program returns to loop nodes 600. If, however, the current level is greater than the new maximum allowed level, the SETMX flag is set (step 928) and the slow-level-change sequence node 900 is called, to slowly reduce the current load output level to be no greater than the new maximum allowable level.

Figure 5R:
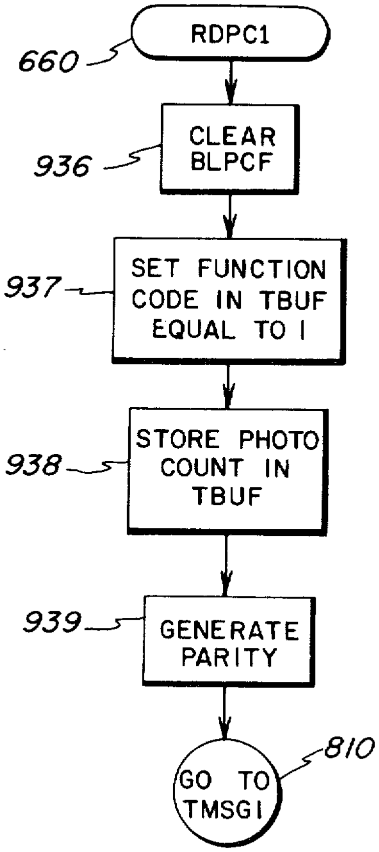
Figure 5Q:
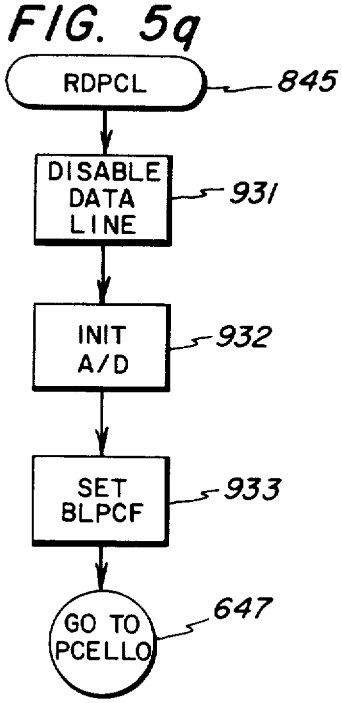
Figure 5S:
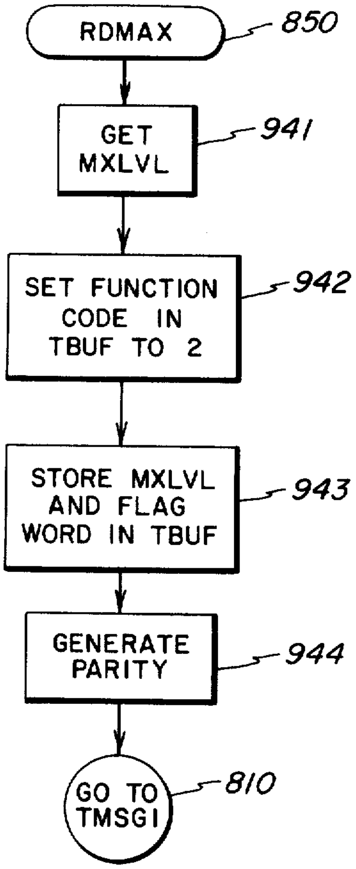

If the central controller requests a photocell reading, the RDPCL node 845 (of FIG. 5*g*) is called. The central controller data bus 10*c*' is disabled so that the photocell sensor may be read without further interruption from the central controller (step 931). After the central controller data bus is disabled, the analog-to-digital converter 16' is initialized (step 932) and the BLPCF flag is set to a logic 1 level (step 933). The photocell-sensor-reading subroutine PCELL0 node 647 (FIG. 5*a*) is called to take the actual photocell reading and then branch the program to the RDPC1 subroutine of FIG. 5*r*, once a photocell sensor reading is obtained.

Node 660 is entered to begin the RDPC1 subroutine, whereafter the BLPCF flag is cleared (step 936), as the photocell reading has been obtained during the preceding PCELL0 routine. Thereafter, step 937 sets the function code data contained in the transmission buffer (holding the message to be sent back to the central collector) to 1, which is the code to inform the central controller that the message contains a photocell reading. The final count from the analog-to-digital converter, corresponding to the photocell sensor output, is stored in the transmission buffer TBUF, in step 938, and a parity word for the message is generated in step 939. Thereafter, the message transmission node TMSG1 of step 810 is called, whereby the message is transmitted on bus 10*c*' to the central controller.

If the central controller calls for a reading of the maximum allowable level, set in its preselected location in the RAM of controller microcomputer 14', the RDMAX node 850 (FIG. 5*s*) is entered. The maximum allowable level data MXLVL is obtained from its storage location (step 941), the transmission buffer formation code data is set for function 2 (step 942), the MXLVL and flag word information is stored in the transmission buffer (allowing not only the maximum level data but also the status of four separate flags to be eventually transmitted to the central controller) in step 943, and a parity word for the new message is generated in step 944. Thereafter, TMSG1 step 810 is called to cause a return message to be transmitted to the central controller.

Figure 5T:
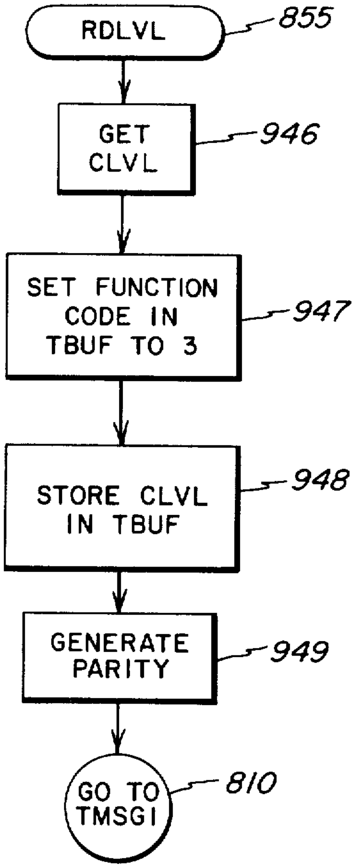
Figure 5U:
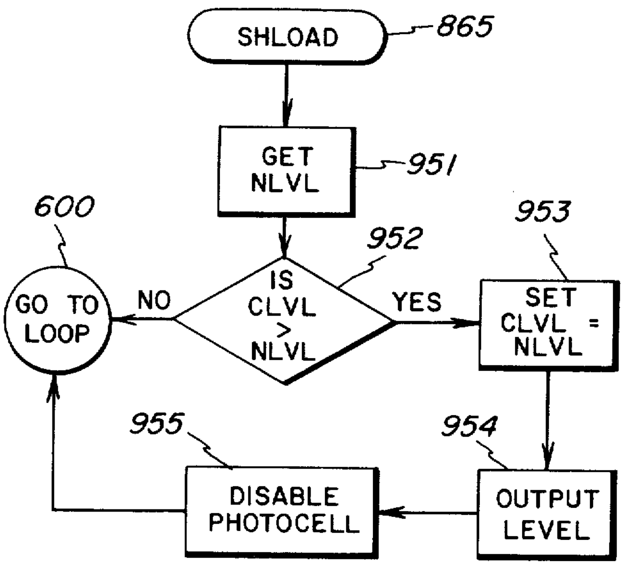
Figure 5V:
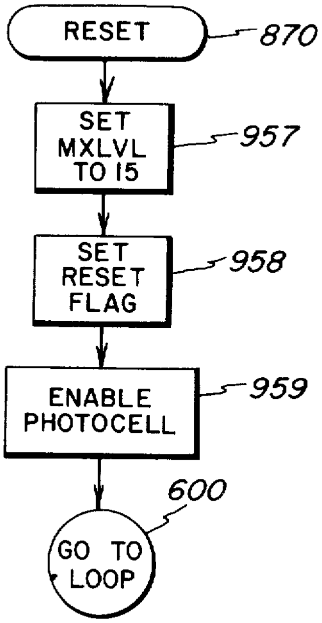
Figure 5W:
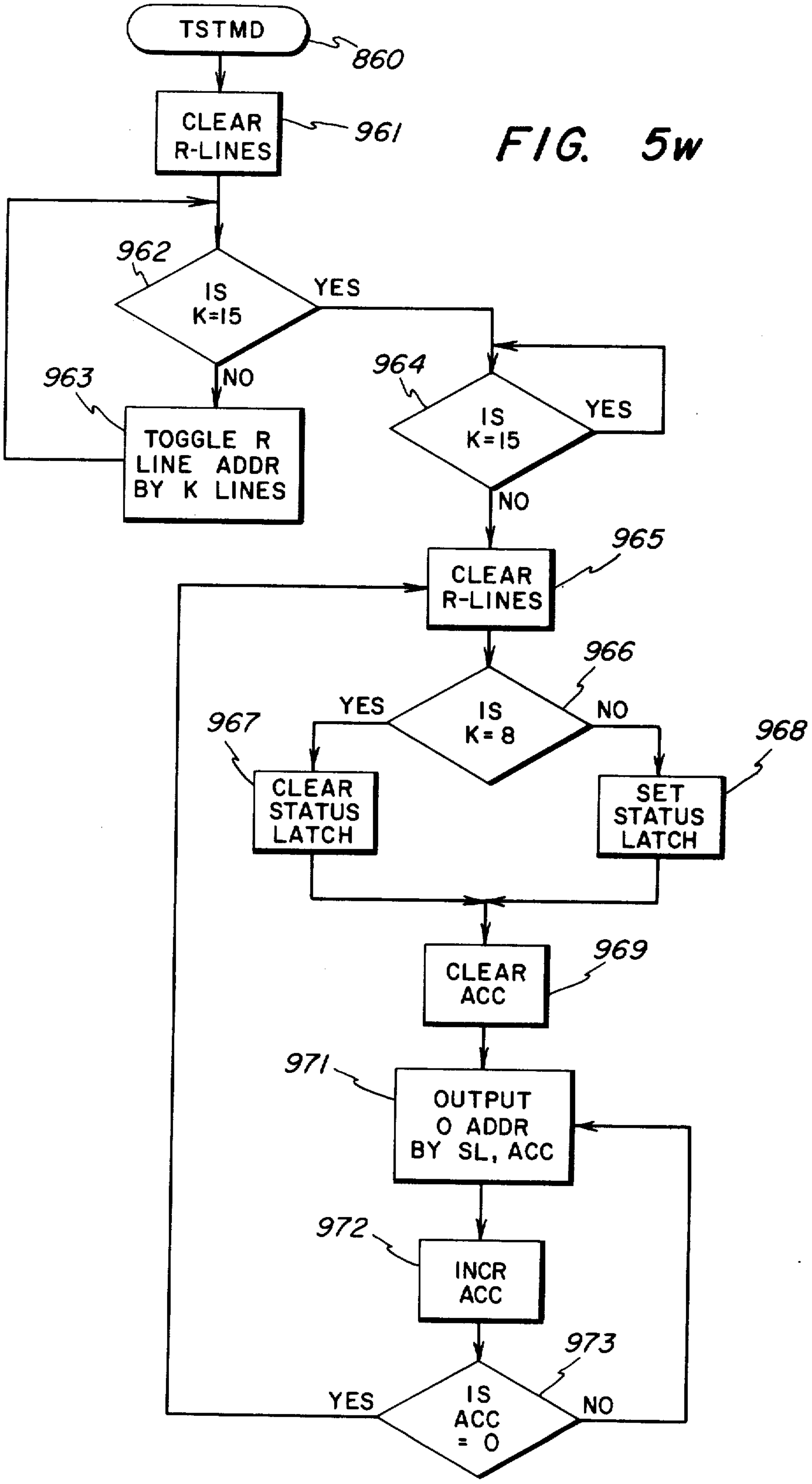

When the central controller requests a reading of the actual load output level, the level-reading RDLVL subroutine node 855 is entered (FIG. 5*t*). The current level CLVL data is obtained from the appropriate RAM location in controller microcomputer 14' (step 946); the function code data in the transmission buffer TBUF is set to 3 (step 947); the current level data is stored in the transmission buffer (step 948) to generate the new message; and a parity word is generated (step 949) for that message. Thereafter, the TMSG1 node 810 is called to send the actual output level message to the central controller.

If the central controller has requested that the control module perform a load shedding action, reducing all outputs to a new level, the SHLOAD subroutine node 865 (FIG. 5*u*) is entered. The new level NLVL data is obtained from the incoming message (step 951), and is then compared with the current level CLVL actual output level in step 952. If the current level is less than or equal to the new level, no change is necessary and the program exits to node 600. If the current level is greater than the newly commanded level, step 953 is entered and the current level is set equal to the new level. Thereafter, the load output level is actually set to the new level by a fast-level-change (step 954), with the photocell sensor being disabled (step 955) to prevent erroneous readings during the fast level change. After the load shedding operation is complete, the subroutine returns to main loop 600 to continue the executive program.

In the event a RESET command is received, node 870 (FIG. 5*v*) is entered, which activates an internal reset that forces fault values to be utilized. Thus, in step 957, the maximum level is set to its highest allowable level, e.g. level 15, corresponding to 100% load (light) output; the reset flag is set (step 958) to indicate that the control module is now operating in the reset mode; and the photocell sensor is enabled (step 958) to allow the load (light) level to be maintained at the reset level 15, by sensor feedback action on the amplitude of the waveform on bus 10*a*'. The program now returns to main loop node 600 and continues the executive program.

Finally, the controller microcomputer may be ordered, driving a bench test or other diagnostic work routine, into the test mode upon receipt of the TSTMD command. Node 860 (FIG. 5*w*) is entered and all of the R output lines are set to a logic 0 level (step 961). Thereafter, all of the four K input lines are read and the total thereof is ascertained (step 962). If the total for (K8=8)+(K4=4)+(K2=2)+(K1=1) is not equal to 15, the difference of the total from 15 determines a K input; the R line associated with the particular K input is toggled (step 963) and the program advances back to step 962 to again test the K input lines. This loop continues until the K input lines have a sum equal to 15. Once the K sum is equal to 15, step 964 is entered. Step 964 waits for the four K input lines to be set to a sum not equal to 15, indicative that at least one K input is active. As long as the sum of the K inputs is 15, step 964 continues to loop about itself. Once the K inputs are set not equal to 15, all of the R output lines are cleared (step 965) and the K lines are checked to see if K=8 i.e. whether it is the K8 input which is active (step 966). If the K8 input is active, then the status latch is cleared (step 967), while if the K8 input is not active, then the status latch is set (step 968). With the status latch in the proper condition, the accumulator register is cleared (step 969) and the particular O outputs addressed by the status latch and the accumulator are then made available (step 971). Thereafter, the accumulator register is incremented (step 972) and the contents thereof tested for equality with 0 (step 973). If the accumulator contents is equal to zero, then the program branches back to step 965. If the accumulator contents is not equal to zero, then the program branches to step 671. The TSTMD sequence, it will be seen, has no exit and is intended only for troubleshooting purposes. The controller microcomputer may be set, by hardware, software or both, to ignore this command, except under special circumstances (such as a technician setting a switch when testing).

While presently preferred embodiments of our control module are described herein, it will now become apparent that many modifications and variations may be made without departing from the spirit and intent thereof. It is our intent, therefore, that we be limited only by the scope of the appending claims and not by specific details or instrumentalities described herein.

What is claimed is:

1. Apparatus for providing a variable-characteristic signal for controlling the condition of at least one associated load to a selected one of plural levels of operation, said apparatus comprising:

(a) at least one local control means for providing load control means data signals and including at least one switching element having open and closed contact positions;

(b) controller logic means including a central processor unit (CPU), ROM means for substantially permanently storing program data defining operational parameters of the apparatus and for providing said program data under control of said CPU, RAM means for substantially temporarily storing digital data under control of said CPU, and input-/output (I/O) means having ports for communicating digital data to and from the controller logic means;

(c) interface means responsive to a command from said CPU for interfacing said local control means data signal in digital form to at least one of said I/O means ports; said interfacing means including an input bus to which said at least one local control switching element is connected;

(d) said CPU periodically requesting said local control means data signals from said I/O means in accordance with instructions contained in said ROM means program data;

(e) said RAM means receiving and storing the local control means data from said interfacing means until such data is requested by said CPU;

(f) said CPU producing digital data at least in part dependent upon the content of said local control means data signals;

(g) said RAM means receiving and storing said digital data; and (h) means responsive to said digital data signals stored in said RAM means for producing said variable-characteristic signal with the magnitude of the variable characteristic being established responsive to said digital data obtained from said RAM means and for providing said variable-characteristic signal for controlling the condition of at least one associated load to a selected one of a plurality of at least three levels of operation.

2. The apparatus of claim 1, wherein said variable-characteristic signal is a variable amplitude signal.

3. The apparatus of claim 1, wherein said interface means further comprises a source of switch operating potential; and a first resistance elements connected between said switch operating potential source and said input bus to cause said input bus to have a voltage thereon of first and second magnitudes responsive to said local control means switching element being in said open and closed contact conditions, respectively; said at least one I/O means port having at least one input line for receiving said local control means data from said interfacing means.

4. The apparatus of claim 3, wherein said at least one I/O means port has at least one output line for providing a signal when said local control means data is to be input to said controller logic means; and further including logic gating means receiving the voltage across said at least one local control means switching element for providing said controller logic means input with a digital signal, responsive to receipt of the signal at said controller logic means output line, of magnitude responsive to said first and second switch bus voltage magnitudes.

5. The apparatus of claim 4, further comprising a resistive voltage divider coupled between said input bus and said logic gating means to reduce the magnitude of voltage to a level compatible with said logic means.

6. The apparatus of claim 3, further comprising a resistive voltage divider coupled between said bus and said at least one I/O means port.

7. The apparatus of claim 1, wherein said local control means comprises a plurality of single-pole, double-throw switching elements, each having first and second switching portions actuatable to a closed condition in mutual-exclusive manner; said at least one of said I/O means ports has a pair of data inputs, each associated with one of the first and second switching portions; all of said first switching portions being connected in parallel to a first line of said local control means data bus; all of said second switching portions being connected in parallel to a second line of said local control means data bus; and a resistance element connected between said source of switch operating potential and each of said first and second data bus lines.

8. The apparatus of claim 7, further comprising first and second logic gating means each responsive to the signals on an associated one of said first and second data bus lines and to enablement of said output line, for providing a signal to the associated one of said first and second data inputs, indicative of the open or closed condition of any of the paralleled switch portions connected to the associated data bus line.

9. The apparatus of claim 8, further comprising first and second resistive voltage dividers coupled between an associated one of said first and second bus lines and the associated one of said first and second logic gating means to reduce the magnitude of the bus signals to a level compatible with said logic gating means.

10. The apparatus of claim 1, wherein said apparatus is also responsive to command data from a remote controller; said apparatus including data bus means for enabling said apparatus to receive command data from said remote controller at another one of said I/O means ports.

11. The apparatus of claim 10, further comprising means for buffering command data received from said remote controller into data signals having levels compatible with said another one of said I/O means ports.

12. The apparatus of claim 11, wherein said buffering means includes an emitter follower circuit having an input connected to said bus and an output connected to said another one of said I/O means ports.

13. The apparatus of claim 10, wherein said remote controller bus is a bidirectional bus also allowing said apparatus to communicate digital data to said remote controller.

14. The apparatus of claim 13, further comprising means for buffering data signals from said another one of said I/O means ports into data signals having levels compatible with said data bus and said remote controller.

15. The apparatus of claim 10, further comprising means for designating a unique local address for said apparatus.

16. The apparatus of claim 15, wherein yet another one of said I/O means ports provides at least one signal for interrogation of said address designating means, responsive to a command from said CPU; a portion of said RAM means being predeterminately established for storing the unique address data provided from said address-designating means responsive to the interrogation thereof; said CPU comparing the address data stored in said RAM means portion to address data received from said remote controller as part of the command data therefrom and enabling said apparatus to respond to said remote controller command data only if the address data comparison is favorable.

17. The apparatus of claim 16, wherein said controller logic means is adapted for also storing data designating at least one of a universal address and at least one logical address and for comparing address data received from said remote controller for response thereto if said address data favorably compares to said at least one of said universal and logical address.

18. The apparatus of claim 16, wherein said load condition is the energy consumption/output of said load and said address designating means also includes means for designating a percent of maximum load consumption/output to which said load is to be set responsive to a load-on closure of said local control means.

19. The apparatus of claim 15, further including means for multiplexing the outputs of at least said address-designating means and said local control interfacing means to the same I/O means port.

20. The apparatus of claim 10, wherein said apparatus is also responsive to at least one analog-output sensing element external to said apparatus; said apparatus further comprising ADC means for converting sensing element analog-output information to digital data for presentation to still another one of said I/O means ports, responsive to a command from said CPU.

21. The apparatus of claim 20, wherein at least one sensing elements includes at least one of ambient-light and ambient-temperature sensors.

22. The apparatus of claim 20, wherein said ADC means includes: an integrating element; a source of operating potential; a resistance element in series with said integrating element across said operating potential source; means for preventing said integrating element from operating unless an enabling command is received via said I/O means from said CPU; and at least one comparator subcircuit having a first input receiving the voltage across said integrating element, a second input receiving the output of an associated one of said sensing elements, and an output enabled when a voltage across said integrating element is equal to the sensing element analog-magnitude; the output of each of said sensing elements being associated with one of said comparator subcircuits.

23. The apparatus of claim 22, wherein said integrating element is a capacitor.

24. The apparatus of claim 22, wherein said switching means is a transistor.

25. The apparatus of claim 22, wherein each of said comparator subcircuits includes: an operational amplifier having an inverting input, a non-inverting input and an output; an input resistance element connected between said integrating element and a first one of said operational amplifier inputs; a feedback resistance element connected between said operational amplifier output and the junction between said input resistance element and the associated operational amplifier input; first and second resistance elements connected in series between said operating potential source and the remaining one of said operational amplifier inputs; third and fourth resistance elements connected in series between ground potential and the junction of said first and second resistance elements; said sensor being connected between ground potential and the junction between said third and fourth resistance elements; a switching device having an input coupled to said operational amplifier output and an output circuit having a current flow therethrough controlled by the magnitude of the signal at said switching device input; and a load resistance element coupled between said operating potential source and the output circuit of said switching device; said comparator subcircuit output being obtained at the junction between said switching device and said load resistance element.

26. The apparatus of claim 1, wherein said apparatus is also responsive to at least one analog-output sensing element external to said apparatus; said apparatus further comprising ADC means for converting sensing element analog-output information to digital data for presentation to still another one of said I/O means ports, responsive to a command from said CPU.

27. The apparatus of claim 26, wherein said at least one sensing element includes at least one of ambient-light and ambient-temperature sensors.

28. The apparatus of claim 26, wherein said ADC means includes: an integrating element; a source of operating potential; a resistance element in series with said integrating element across said operating potential source; means for preventing said integrating element from operating unless an enabling command is received via said I/O means from said CPU; and at least one comparator subcircuit haviing a first input receiving the voltage across said integrating element, a second input receiving the output of an associated one of said sensing elements, and an output enabled when a voltage across said integrating element is equal to the sensing element analog-magnitude output; each of said sensing elements being associated with one of said comparator subcircuits.

29. The apparatus of claim 28, wherein said integrating element is a capacitor.

30. The apparatus of claim 28, wherein said switching means is a transistor.

31. The apparatus of claim 28, wherein each of said comparator subcircuits includes: an operational amplifier having an inverting input, a non-inverting input and an output; an input resistance element connected between said integrating element and a first one of said operational amplifier inputs; a feedback resistance element between said operational amplifier output and the junction between said input resistance element and the associated operational amplifier input; first and second resistance elements connected in series between said operating potential source and the remaining one of said operational amplifier inputs; third and fourth resistance elements connected in series between ground potential and the junction of said first and second resistance elements; said sensor being connected between ground potential and the junction between said third and fourth resistance elements; a switching device having an input coupled to said operational amplifier output and an output circuit having a current flow therethrough controlled by the magnitude of the signal at said switching device input; and a load resistance element coupled between said operating potential source and output circuit of said switching device; said comparator subcircuit output being obtained at the junction between said switching device and said load resistance element.

32. The apparatus of claim 1, wherein the controlled load condition is the energy consumption/output of said load.

33. The apparatus of claim 1, wherein each of said at least one load is a fluorescent lamp and activating ballast combination, and wherein the controllable load condition is the light energy output of said lamp.

34. A mehod for controlling the condition of at least one load to a selected one of multiple conditions, responsive to adjusting the magnitude of a load input control signal by actuation of a local control switch having selectable first and second closed positions and a normally open position, comprising the steps of:

(a) changing the magnitude of the load input control signal in a first direction responsive to any one of the at least one local control switch being in the first closed position;

(b) changing the magnitude of the load input control signal in a second direction, opposite to said first direction, responsive to any one of the at least one local control switch being in the second closed position;

(c) maintaining the magnitude of the load input control signal at a previously set magnitude responsive to all of the at least one local control switch being in the open position;

(d) sensing the load consumption/output level; and (e) adjusting the magnitude of the load input control signal to maintain said load level substantially constant when said at least one local control switch is in the normally-open position.

35. The method of claim 34, wherein a control module is utilized for performing the steps of generating said control input signal responsive to the state of at least one local control switch.

36. The method of claim 35, wherein the controlled load condition is the energy consumption/output level of said load.

37. The method of claim 36, wherein the load energy consumption/output level of the load is increased responsive to an increase in said load input control signal.

38. The method of claim 37, further comprising the steps of: specifying a maximum allowable load consumption/output level; and limiting the magnitude of said load input control signal to never be greater than that load input control signal magnitude corresponding to the maximum allowable load output level.

39. The method of claims 37 or 38, further comprising the steps of: specifying a minimum allowable load output level; and limiting the magnitude of said load input control signal to never be less than that load input control signal magnitude corresponding to the minimum allowable load output level.

40. The method of claim 36, wherein the load energy consumption/output level of the load is decreased responsive to an increase in said load input control signal.

41. The method of claim 40, further comprising the steps of: specifying a maximum allowable load consumption/output level; and limiting the magnitude of said load input control signal to never be less than that load input control signal magnitude corresponding to the maximum allowable load output level.

42. The method of claims 40 or 41, further comprising the steps of: specifying a minimum allowable load output level; and limiting the magnitude of said load input control signal to never be greater than that load input control signal magnitude corresponding to the minimum allowable load output level.

43. The method of claim 36, further comprising the steps of: positioning the at least one local control switch in the vicinity of the at least one load to be controlled; and also controlling the increase and decrease of load output level from a central location, remote from said at least one load and at least one local control switch.

44. The method of claim 43, further comprising the step of inhibiting central-location-originated control if the at least one load is not previously energized.

45. The method of claim 43, further comprising the steps of: receiving control information from the central location to set a maximum load output level; and controlling the load output level to not exceed the maximum level set from the central location.

46. The method of claim 45, further comprising the step of allowing operation of the at least one load control switches to override the maximum level set from the central location.

47. The method of claim 43, further including the steps of: providing the control module with a unique address; transmitting the unique address from the central location whenever the control module is to respond to information originating at the central location; and inhibiting the control module from responding to central-location-originated information unless the information is transmitted with the unique address previously assigned to the control module.

48. The method of claim 47, further comprising the steps of: also providing the control module with at least one of a logical address and a universal address; transmitting control information and logical or universal address data from the central location; and enabling the control module to respond to data transmitted from the central location only if such data includes a logical address assigned to the control module or the universal address.

49. The method of claim 43, further comprising the steps of: requesting information from the control module via a command from the central location; and causing said control module to transmit the requested data to said central location.

50. The method of claim 36, further comprising the step of waiting, after each local control switch actuation for completion of that commanded change before accepting new load control information.

51. The method of claim 35, further comprising the step of gradually changing said load input control signal magnitude during, and in the direction of, the closure of any one of said at least one load control switch, to cause said load output level to gradually change in a corresponding manner.

52. The method of claim 35, including the step of resetting the control module to preselected initial conditions upon each application of operating power thereto.

53. The method of claim 34, wherein step (a) also includes the step of immediately changing the magnitude of the load input control signal to a preset level if the load was previously off and as soon thereafter as any one of the at least one local control switch is placed in the first closed position.

54. The method of claim 53, wherein step (a) further includes the step of increasing the magnitude of the load input control signal above said preset level, responsive to the continued presence at the first closed position of any one of the at least one local control switch.

55. A programmable system for controlling the energy output of plural electrically energized loads to ones of a plurality of discrete levels wherein a programmable central controller is coupled to distributed plural programmable control modules whose output means are respectively coupled to at least one subset of the loads, the combination comprising:

(a) the subset of electrically energized loads for producing a discrete level of energy output representative of the value of a control signal;

(b) the central controller for providing to the programmable control modules command digital data comprising commanded address data identifying the programmable control modules to be controlled by the central controller, and remotely commanded level data from the central controller representative of a selected one of a plurality of at least three discrete levels of load energization, including a turn-off level;

(c) the programmable control modules comprising means for internally storing address data, address recognition means for comparing commanded address data from said central controller with internally stored address data and means responsive to correspondence thereof for decoding the remotely commanded level data;

(d) local control switching means for connection to at least one of said programmable control modules to permit control of load energization from locations displaced from the central controller, said local control means comprising manually actuable switching means for locally commanding load energization to a selected one of a plurality of at least three discrete levels of energization, including a turn-off level;

(e) said at least one of said programmable control modules comprising means responsive to actuation of said local control switching means for generating and for storing locally commanded level data representative of the selected one of the plurality of at least three discrete levels of the load energization; and (f) said at least one programmable control module comprising means for producing at its output means a load control signal of variable characteristic having a value representative of the last commanded one of remotely commanded level data and of locally commanded level data and for modifying the value of the control signal responsive to subsequent changes of either the locally commanded or the remotely commanded level data.

56. The arrangement of claim 55 for controlling the light-intensity of lighting loads, wherein the programmable control means comprises initiation means activated upon initial power turn-on for initially producing at the output means a control signal of a turn-on value representative of a predetermined level of light excitation intermediate light turn-off and of the maximum available lighting level.

57. The arrangement of claim 56 wherein said initiation means comprises means for presetting the magnitude of the turn-on value within a predetermined range of levels.

58. The combination of claim 55 comprising condition sensing means for providing a condition signal representative of the actual level of load energization, and wherein said programmable control modules comprise comparison means responsive to variations between the commanded level data and the condition signal for modifying the value of the control signal at the output means to provide coincidence between the commanded and actual levels of load energy output.

59. The combination of claim 58 comprising means for disabling said comparison means during intervals when the value of said output signal is varied responsive to modifications of commanded level data.

60. The combination of claim 58 wherein said condition sensing means is detachably coupled to the programmable control modules and the programmable control modules comprise means automatically responsive to removal of said condition sensing means for disabling said comparison means.

61. The arrangement of claim 58 wherein said programmable control modules comprise means for disabling said comparison means of a module during intervals when the subset of loads coupled to such module is turned off.

62. The arrangement of claim 58, wherein the condition sensing means provides an analog signal and said programmable control modules comprise means for producing a digital condition signal of a value corresponding to the value of the analog signal.

63. The arrangement of claim 62 comprising means for comparing the digital condition signal with the last commanded level data, means responsive to the value of said condition signal being representative of a level other than the commanded level for gradually modifying the value of said control signal until the level of load energy output corresponds to the commanded level.

64. The control system of claim 58 wherein the central controller can provide command digital data comprising a sensor read function code representative of a request for the value of the load energy output as sensed by the condition sensing means, and the programmable control modules comprise means for transmission of a digital sensor signal of a value corresponding to the value sensed by the condition sensing means coupled to the addressed one of the programmable control modules.

65. The arrangement according to claims 58, 59, 60, 61, 62, 63 or 64 for controlling the energy output of lighting loads, wherein said condition sensing means comprises light sensing means to provide a condition signal representative of the level of ambient light intensity.

66. The control system of claim 55 wherein the central controller can provide command digital data comprising a function code representative of a command to be performed by programmable control modules identified by the address portion of the digital command data, and said programmable control modules comprise means providing for execution of such command by addressed ones of the programmable control modules.

67. The arrangement of claim 66 wherein the function code is representative of a command to provide load excitation of a level specified by the remotely commanded level data provided by the central controller.

68. The arrangement of claim 67 wherein said programmable control modules comprise means for storing maximum level data representative of a selected maximum level of load excitation attainable by the associated subset of loads, and means for comparing commanded levels of load energization therewith and means for preventing the value of the control signal from attaining values representative of load excitation levels greater than the selected maximum value.

69. The arrangement of claim 67 for controlling the light intensity of lighting loads wherein the function code is representative of a command to slowly modify the level of light intensity, and said programmable control modules comprise means responsive thereto for slowly modifying the level of light intensity to the newly commanded value at a rate selected to minimize perception of the variation of light intensity.

70. The arrangement of claim 69 wherein said programmable control modules comprise means for storing data representative of a selected minimum level of light intensity, and means for limiting the value of the control signal to assure that the energy output of controlled loads is not decreased below this minimum level during slow modification of levels.

71. The arrangement of claim 69 wherein said programmable control means comprise means for gradually modifying the value of the output signal to provide for a gradual variation between two adjacent levels of light intensity, and responsive to commands for slow changes in excess of one level to consecutively provide for such gradual variation between consecutive adjacent levels until the newly commanded level is attained.

72. The arrangement of claim 66 wherein the function code is representative of a command to set a maximum level of load excitation to a value specified by the remotely commanded level data provided by the central controller, and said programmable control modules comprise means responsive thereto for storing maximum level data representative of the specified maximum level of load excitation and means responsive to comparing the values of commanded levels of load excitation and of stored maximum level data for preventing the value of the control signal from attaining values representative of load excitation levels greater than that of the specified maximum level.

73. The system of claim 72 wherein said programmable control modules comprise means responsive to a commanded reduction of the maximum level to a turn off level for modifying the value of the output signal to a value representative of turn off of the associated subset of loads.

74. The system of claim 72 for controlling the light intensity of lighting loads wherein said programmable control modules comprise means responsive to a commanded reduction of the maximum level to a level below the currently commanded level of load energization for gradually modifying the value of the control signal to provide for reduction of the light intensity produced by the respective subset of lighting loads at a rate selected to minimize perception of the variation of light intensity.

75. The arrangement of claim 66 wherein the central controller can provide command digital data comprising an interrogation function code representative of the value of specified parameters to be transmitted by addressed ones of said programmable control modules and said programmable control modules comprise means providing for the addressed ones of said programmable control modules to transmit the value of the specified parameter in conjunction with a predetermined module function code identifying the specified type of parameter.

76. The arrangement of claim 75 wherein the interrogation function code is representative of a request for the value of the maximum level data stored in the addressed ones of the programmable control modules.

77. The arrangement of claim 75 wherein the interrogation function code is representative of a request for the value of the currently commanded level stored in the addressed ones of the programmable control module.

78. The system of claim 66 wherein said programmable control modules comprise means for storing a first predetermined address adapted to uniquely identify said programmable control modules to permit said central controller to address selected individual ones of said programmable control modules.

79. The system of claim 78 wherein said programmable control modules comprise adjustable means for setting said first predetermined address to desired values.

80. The system of claim 79 wherein said programmable control modules comprise means for storing a second predetermined address common to each of said modules to permit said central controller to simultaneously address all of said modules.

81. The arrangement of claim 78 wherein said programmable control modules comprise means for storing an addtitional address of value commanded by said central controller, to permit the central controller to store additional addresses of common value in designated groups of programmable control modules and to thus simultaneously command such designated groups of modules.

82. The arrangement of claim 66 wherein the function code is representative of a command to store an additional address in addressed ones of the programmable control modules of a value specified by remotely commanded data provided by the central controller.

83. The arrangement of claim 82 wherein each of said programmable control modules also comprises means for storing a predetermined common address to permit said central controller to simultaneously address all of said modules, and further comprising means for comparing the commanded address data provided by the central controller with each of said stored addresses, and responsive to correlation thereof, to execute the function commanded by the central controller.

84. The system of claim 66 wherein said programmable control modules comprise means for storing an address common to plural ones of said control modules, and wherein the function code is representative of a load shed command to simultaneously reduce the level of energy output of subsets of loads coupled to plural ones of the programmable control modules that are simultaneously addressed by the central controller.

85. The system of claim 84 wherein the load shed function code is representative of a command to reduce load excitation to a load shed level specified by the remotely commanded level data provided by the central controller and the programmable control modules comprise means responsive to such load shed level being lower than the currently commanded level for modifying the control signal to a value representative of the load shed level.

86. A programmable lighting control system for controlling the light energy output of gaseous discharge tubes to selected ones of a plurality of discrete levels, the combination comprising:

(a) ballast means having an input, and an output adapted to energize a subset of gaseous discharge tube means to a level of intensity representative of the value of a signal applied to the input of the ballast means;

(b) programmable control means comprising:

(b1) output means, (b2) input means for entering a command signal representative of a selected one of a plurality of discrete levels of light excitation;

(b3) means for producing a digital command signal of a value representative of the selected level;

(b4) means for converting said digital command signal to a corresponding variable characteristics signal;

(b5) means for generating and supplying at the output means a carrier signal modulated with the variable characteristic signal;

(c) coupling means coupled between the programmable control means and the ballast means comprising isolation means for coupling the variable characteristic output signal and for isolating d-c voltages occurring at the ballast means from the programmable control means, and (d) detecting means coupled between the isolating means and the ballast means for providing to the ballast a unipolar signal of magnitude representative of the selected level of light intensity.

87. In a programmable lighting system wherein a plurality of ballast control modules located at dispersed locations are coupled to ballast means connected to gaseous discharge tube means, and wherein the ballast control means provides a control signal to the ballast means of a value representative of the desired one of a plurality of light excitation levels, said ballast control means comprising:

(a) first input means adapted to be coupled to a central controller for receiving therefrom digital data comprising address data and controller level data representative of a selected one of a plurality of at least three levels of light excitation to be produced by gaseous discharge tube means coupled to the ballast control modules;

(b) means for storing at least one preselected address;

(c) address recognition means responsive to reception of said digital data to compare the address data from the central controller with said at least one preselected address;

(d) means responsive to correspondence of address data with said at least one preselected address for storing the controller level data;

(e) second input means adapted for connection to local control switching means providing for local selection of one of a plurality of at least three discrete excitation levels;

(f) digital data means responsive to the local control switching means for producing local level data of a value representative of the locally selected level of light excitation; and (g) output means for generating and producing a control signal of value representative of the level of the most recently received one of said controller level data and of said local level data, and for updating the value of said control signal responsive to the next subsequent receipt of either of centrally commanded or of locally commanded level data.

88. The arrangement of claim 87 wherein the local control switching means comprises at least one on/off electrical switch adapted to controllably close an electrical circuit coupled to said second input means, and wherein said digital data means produces local level data of a value representative of the time duration the electrical switch is actuated.

89. The arrangement of claim 88 wherein said second input means comprises first terminal means adapted for connection to incrementing switching means for increasing the current level of excitation, said ballast control means being responsive to actuation of the incrementing switching means to increment the level value of the locally commanded level data.

90. The arrangement of claim 88 wherein said second input means comprises second terminal means adapted for connection to decrementing switching means for decrementing the level of excitation, said ballast control means being responsive to actuation of the decrementing switching means to decrement the level value of the locally commanded level data.

91. A programmable system for controlling light excitation of gaseous discharge tube means to selected ones of a plurality of discrete levels of light excitation, the combination comprising:

(a) ballast means comprising an input adapted to receive a control signal, means for exciting gaseous discharge tube means to light excitation values inversely related to the value of the control signal and limited to a predetermined maximum excitation value in the absence of a control signal, and means for terminating excitation of the tube means during the presence of a control signal of a predetermined maximum value;

(b) ballast control means comprising output means for serial transmission of the control signal to the input of the ballast means, input means to receive a level command signal representative of a commanded one of a plurality of at least three discrete levels of excitation including a turn off level representative of a command to extinguish excitation of the gaseous discharge tube means;

(c) said ballast control means comprising means for providing at said output means a continuous control signal having a variable characteristic of a predetermined value that is representative of the commanded one of the plurality of levels and is inversely related to the ratio of the commanded level of excitation to the maximum excitation value producible by the ballast means.

92. In a system for controlling the light intensity of gaseous discharge tube means to a selected one of a plurality of at least three levels of discrete excitation, the combination comprising:

(a) ballast means comprising an input and means for energizing the discharge tube means to a level of intensity representative of the value of a control signal applied to said input;

(b) digital control means responsive to an externally commanded level of intensity to produce a digital control signal of value representative of the externally commanded level of intensity;

(c) modulation means for generating continuous waves modulated responsive to the value of said control signal;

(d) isolation means coupled between said modulation means and the input of said ballast means for isolating electrical potentials occuring at said ballast means from said modulating means; and (e) detection means coupled in circuit between said isolation means and the input of said ballast means to provide to said input means a unipolar control signal of a magnitude representative of the commanded one of a plurality of discrete levels of light intensity.

* * * * *